US006904412B1

(12) United States Patent
Broadbent et al.

(10) Patent No.: US 6,904,412 B1
(45) Date of Patent: Jun. 7, 2005

(54) METHOD AND APPARATUS FOR A MORTGAGE LOAN ORIGINATOR COMPLIANCE ENGINE

(75) Inventors: David F. Broadbent, Salt Lake City, UT (US); Redge L. Cook, Sandy, UT (US); Paul B. Coleman, Draper, UT (US); William S. Harten, Woods Cross, UT (US)

(73) Assignee: EverBank, Jacksonville, FL (US)

( * ) Notice: Subject to any disclaimer, the term of this patent is extended or adjusted under 35 U.S.C. 154(b) by 559 days.

(21) Appl. No.: 09/645,217

(22) Filed: Aug. 24, 2000

Related U.S. Application Data

(60) Provisional application No. 60/189,635, filed on Mar. 14, 2000.

(51) Int. Cl.[7] .................................... G06F 17/60

(52) U.S. Cl. .................................... 705/38; 707/1

(58) Field of Search .................................... 705/7–11, 30, 705/35–39, 44, 70; 707/1–6

(56) References Cited

U.S. PATENT DOCUMENTS

| | | | | | |
|---|---|---|---|---|---|
| 4,774,664 | A | | 9/1988 | Campbell et al. | |
| 4,876,648 | A | | 10/1989 | Lloyd | |
| 5,272,623 | A | | 12/1993 | Grubb et al. | |
| 5,611,052 | A | | 3/1997 | Dykstra et al. | |
| 5,623,403 | A | * | 4/1997 | Highbloom | 705/28 |
| 5,644,726 | A | | 7/1997 | Oppenheimer | |
| 5,689,650 | A | | 11/1997 | McClelland et al. | |
| 5,692,206 | A | | 11/1997 | Shirley et al. | |
| 5,734,890 | A | | 3/1998 | Case et al. | |
| 5,809,478 | A | | 9/1998 | Greco et al. | |
| 5,819,230 | A | | 10/1998 | Christie et al. | |
| 5,819,249 | A | | 10/1998 | Dohanich et al. | |
| 5,870,721 | A | | 2/1999 | Norris | |
| 5,873,066 | A | | 2/1999 | Underwood et al. | |
| 5,893,079 | A | * | 4/1999 | Cwenar | 705/36 |
| 5,907,828 | A | | 5/1999 | Meyer et al. | |
| 5,930,775 | A | | 7/1999 | McCauley et al. | |
| 5,930,776 | A | | 7/1999 | Dykstra et al. | |
| 5,940,812 | A | | 8/1999 | Tengel et al. | |
| 5,966,699 | A | | 10/1999 | Zandi | |
| 5,966,700 | A | | 10/1999 | Gould et al. | |

(Continued)

FOREIGN PATENT DOCUMENTS

JP 06301706 A * 10/1994 .......... G06F/15/30

OTHER PUBLICATIONS

PMI's pmiAQI (SM) Score First Accepted by All Four Wall Street Rating Agencies, PR Newswire, Dec. 11, 1996.*

(Continued)

*Primary Examiner*—James R. Trammell
*Assistant Examiner*—Mary Cheung
(74) *Attorney, Agent, or Firm*—Kirkpatrick & Lockhart LLP

(57) ABSTRACT

The automated compliance engine of the present invention uses the Federal, State, local and professional regulations and requirements and implementing instructions to generate a plurality of tasks which can be used to control and drive the process of handling a mortgage loan application to completion and to monitor the completion of the tasks in order to generate a Completion Certificate. Mortgage loan requesters may specify that the system will generate the plurality of required tasks, provide the plurality of required tasks to the requestor for his execution, and monitor the completion of all required tasks so as to provide a completion certificate to the requestor. Alternatively, loan requesters may specify that the automated compliance engine will generate the plurality of required tasks, will transfer the required tasks to other systems qualified to manage and control the execution of the required tasks, and the compliance engine will monitor the completion of all required tasks so as to provide a completion certificate to the requester.

17 Claims, 44 Drawing Sheets

U.S. PATENT DOCUMENTS

| | | | | |
|---|---|---|---|---|
| 5,983,206 | A | | 11/1999 | Oppenheimer |
| 5,991,745 | A | | 11/1999 | Kiritz |
| 5,995,947 | A | | 11/1999 | Fraser et al. |
| 6,018,722 | A | | 1/2000 | Ray et al. |
| 6,029,144 | A | | 2/2000 | Barrett et al. |
| 6,029,149 | A | | 2/2000 | Dykstra et al. |
| 6,208,979 | B1 | * | 3/2001 | Sinclair ....................... 705/38 |
| 6,209,095 | B1 | * | 3/2001 | Anderson et al. ........... 713/176 |
| 6,505,176 | B2 | * | 1/2003 | DeFrancesco, Jr. et al. .. 705/38 |
| 6,567,791 | B2 | * | 5/2003 | Lent et al. .................... 705/38 |

OTHER PUBLICATIONS

M. Arend, "New automated experts ready for lenders", ABA Banking Journal vol. 84, No. 1, (1992), pp. 61–62.

"New software available for commercial loan underwriting", America's Community Banker vol. 5, No. 9, (1996), p. 42.

D. Baker et al., "Providing Customized Process and Situation Awareness in the Collaboration management Infrastructure", IEEE 1999, pp. 79–91.

P. Britt, "Automated Underwriting Expedites Appraisals" America's Community Banker, (1997), pp. 17–20.

P. Coleman, "Flexibility key to Web–enabling mortgage origination business", SunServer (2000) www.pcinews.com/sun/sun0500/mortgage.htm. 8 pgs.

J. Day, "New Freddie Mac Mortgage System Means Less Time, More Links", Bank Systems Technology (1994), pp. 31–32.

Easy Soft, Inc., HUD software products, www.easysoft–usa.com/hud.htm, Apr. 14, 2000, 2 pgs.

D. L. Edwards et al., "Toward Knowledge Management Systems in the Legal Domain", Int. ACM SIGGROUP Conference on Supporting Group Work Nov. 16–19, 1997, Arizona, pp. 158–166.

"Fannie Mae: Home Loans In 60 Minutes", Bank Systems & Technology vol. 32, No. 6, (Jun. 1995) pp. 14–16.

"Fannie Mae Releases Upgraded Automated Underwriting Software", America's Community Banker, Jun. 1997, pp. 46–47.

A. Foekens et al., "Facilitating International Electronic Commerce by Formalizing the Incoterms", IEEE Computer Society (1997), pp. 459–467.

Framework, Inc. Unveils Industry's First Internet Mortgage Processing System (1999), Press Release, www.lendware.com/Pr0303a99.htm, 4 pgs.

"HudworX for Windows", Marzanne Computers, Inc., Legal Real Estate HUD RESPA closing software, www.easysoft–usa.com/hud.htm, Apr. 14, 2000, 2 pgs.

R. M. Lee, "A Messenger Model for Navigating Among Bureaucratic Requirements"IEEE Comp. Soc. 1997, pp. 468–477.

S. Marlin, "Residential lender homes loan processes", Bank Systems & Technology vol. 34, No. 5, (1997), p. 42.

M. McGann, "Mortgage solution eases application process via World Wide Web", Bank Systems & Technology vol. 34, No. 5, (1997), p. 22.

V. Moss, "A thumbnail sketch of RESPA", Credit Union Magazine vol. 66, No. 1, (Jan. 2000), pp. 38–39.

R. Roberson et al., "Software" Mortgage Banking vol. 52, No. 5, (1992), pp. 81–84.

H. Schneider, "Great strides in industry automation", Mortgage Banking vol. 55, No. 2, (1994), pp. 10–16.

G. E. Mitchel et al., "A twentysomething does online lending", Mortgage Banking vol. 60, No. 6, (Mar. 2000), pp. 84–92.

J. E. Pitkow et al., "Towards an intelligent publishing environment", Computer Networks and ISDN Systems, 27, (1995) pp. 729–737.

Reesa™ Real Estate Closing Software, Overview, www.reesa.com/reesa.htm, Apr. 14, 2000, 2 pgs.

RESPA Regulations, Real Estate Settlement Procedures Act, Fed. Reg. Jun. 7, 1996, vol. 61, No. 111, 8 pgs.

S. Paul et al., "RainMan: A Workflow System for the Internet", USENIX Symposium on Internet Technologies and Systems, Dec. 8–11, 1997, pp. 159–170.

* cited by examiner

200 Typical General Purpose Computer/

| Need to ask a question? | Click here for help. | Member Login |
|---|---|---|
| | | |

"The OnePipeline.com system is simple, fast and profitable."

Instructions: Welcome to the OnePipeline Loan Origination System. Please sign in.

New Users

- Sign Up Now

Members

User Name [                    ]

Password [                    ]

- [Login]

- I Forgot My Password.

◀ Return to HomePage

| Need to ask a question? | Click here for help. | Main Menu |
|---|---|---|
| | | |

"We created a better way to originate a loan."

Welcome Joe Realtor

| Enter the Loan Origination System |
|---|

Start a loan
    Task List
    Check Loan Status

| Get More Info |
|---|

Tools and Resources
    OnePipeline University
    Benefits
    Marketing Support Tools

| Modify My Account |
|---|

Log Out

| | ◄ Return to HomePage |
|---|---|

| Loan Product Shopper - Netscape | |
|---|---|

Loan Product Finder

| | |
|---|---|
| I am Interested in: | Purchasing a Property ▼ |
| How will the property be used? | Primary Residence ▼ |
| What is the property type? | Single Family ▼ |
| How long do you plan to keep this property? | 1 - 5 years ▼ |
| Property State: | AL ▼ |
| Estimated Property Value: | 100000 ▼ |
| If Purchase or Cash out, what percentage of the home value do you wish to borrow? (e.g. 80, 95, etc). If Refinance, balance owed on mortgage(s): | 80 ▼ % |
| Would you prefer Current Market Rate ( 7.875 %) or would you prefer to buy down the rate with discount points? | ◉ current market rate<br>○ buy down with points |
| What is your estimated combined monthly income? | 3000 |
| What are your estimated combined monthly debts? | 250 |

Calculate     Close Window

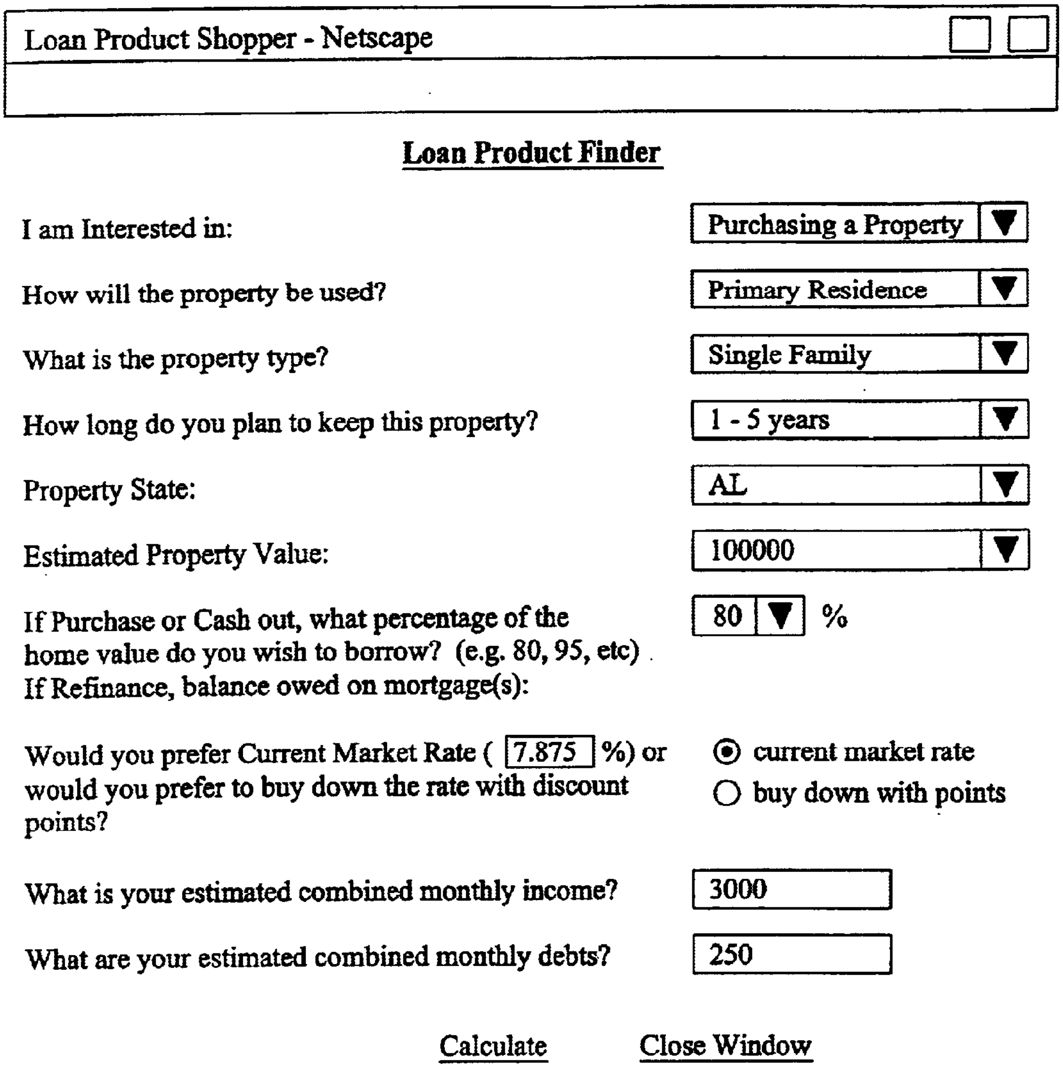

FIGURE 9

Affordability Analysis Tool - Netscape

Affordability Calculator

Affordability Information  Instructions

| Field | Value | |
|---|---|---|
| Debt/Income Ratio to use. | 36 | % |
| Today's Interest Rate | 7.875 | % |
| Cash Available for Down Payment | 10000 | |
| Borrower Gross Income | 7000 | |
| Co-Borrower Gross Income | 0 | |
| Other Income | 0 | |
| Total Automobile Payments | 234 | |
| Total Revolving Accounts Payments | 200 | |
| Other Monthly Payments | 200 | |
| Property Taxes (/Yr) | 2000 | |
| Homeowner's Insurance (/Yr) | 600 | |

Complete the information below to find out how much home can be afforded. No comma please.

Calculate   Close Window

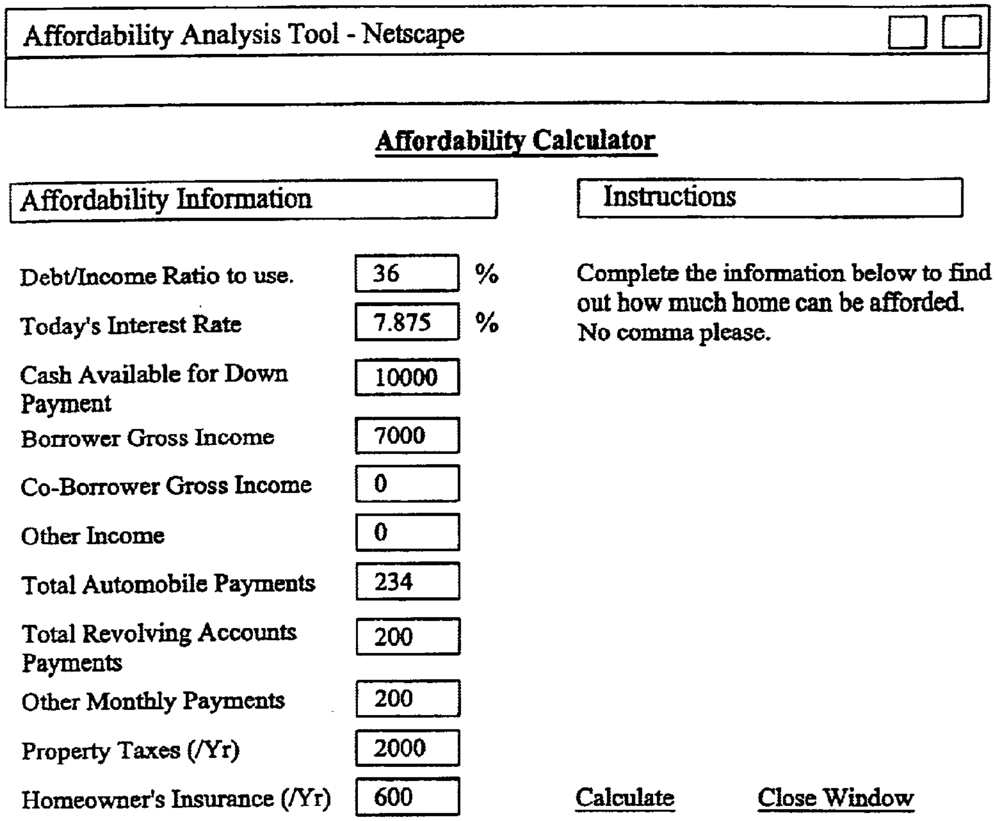

FIGURE 10

| OnePipeline.com 5 Step Rapid Response Sytem - Netscape | | |
|---|---|---|
| Need to ask a question? | Click here for help. | **Loan Origination Process Overview** |

Insturctions: As a part of compliance, the loan originator is required to review and discuss the entire loan origination process with the borrower. To do so, simply click through the five-steps below. You will be asked to confirm that you have reviewed the process with your borrower.

1. Loan Shopper
   *Getting started*

Step 1: Loan Shopper
   *Getting PreQualified*

- Complete the Loan Shopper with your borrower. Providing this information will determine the:
     - Best loan program for your borrower
     - Lender that has the right loan program and the best rate
     - Loan amount your borrower will qualify for
   - Select your preferred lender or the best rate of the day.

2. eXpress Application
   *Apply for your loan*

3. Auto Underwriting
   *Loan Decision*

4. FastTrak Processing
   *Loan Approved*

5. Final Approval
   *Time to close your loan*

◁ Cancel                                    Next ▷

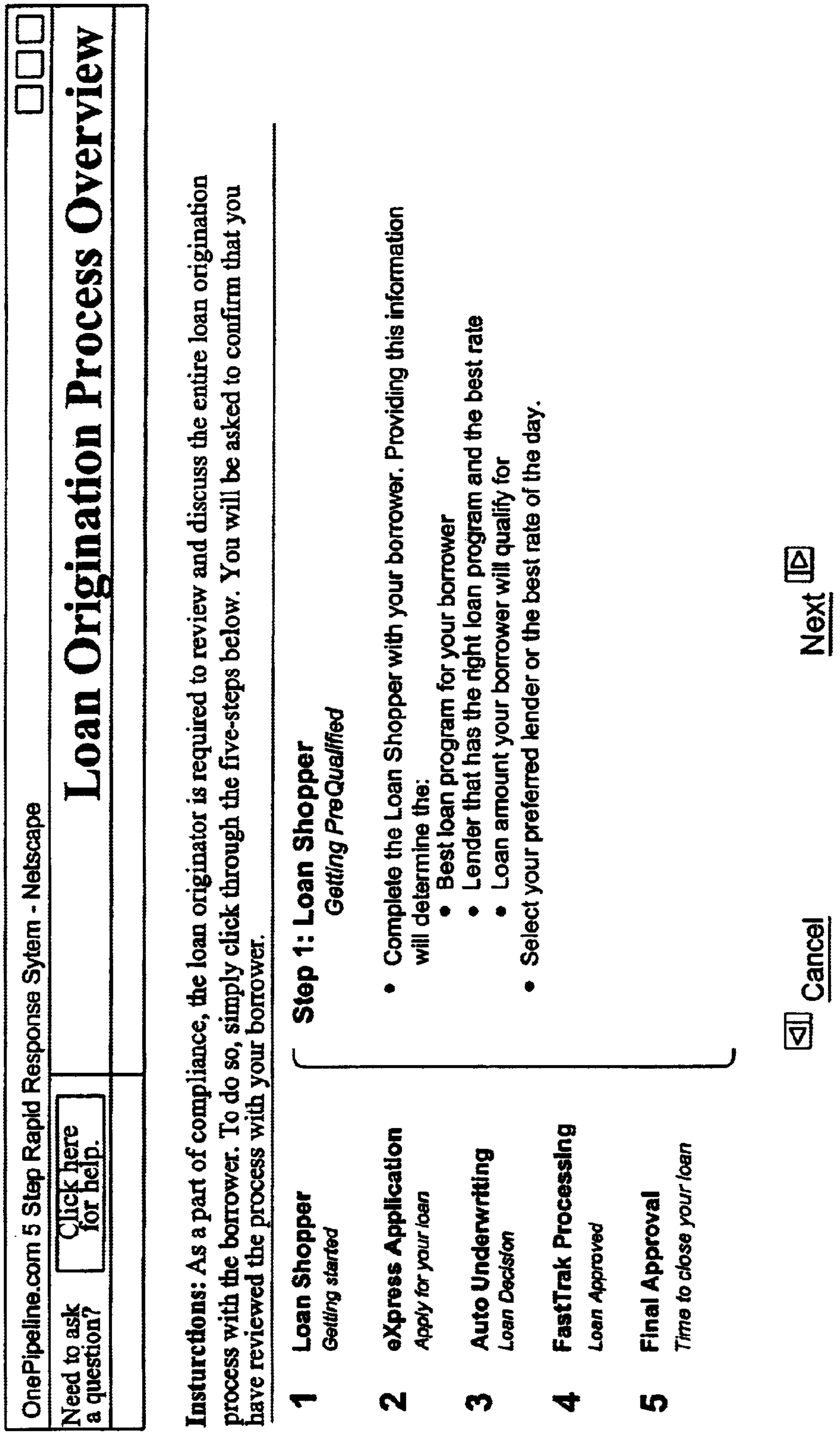

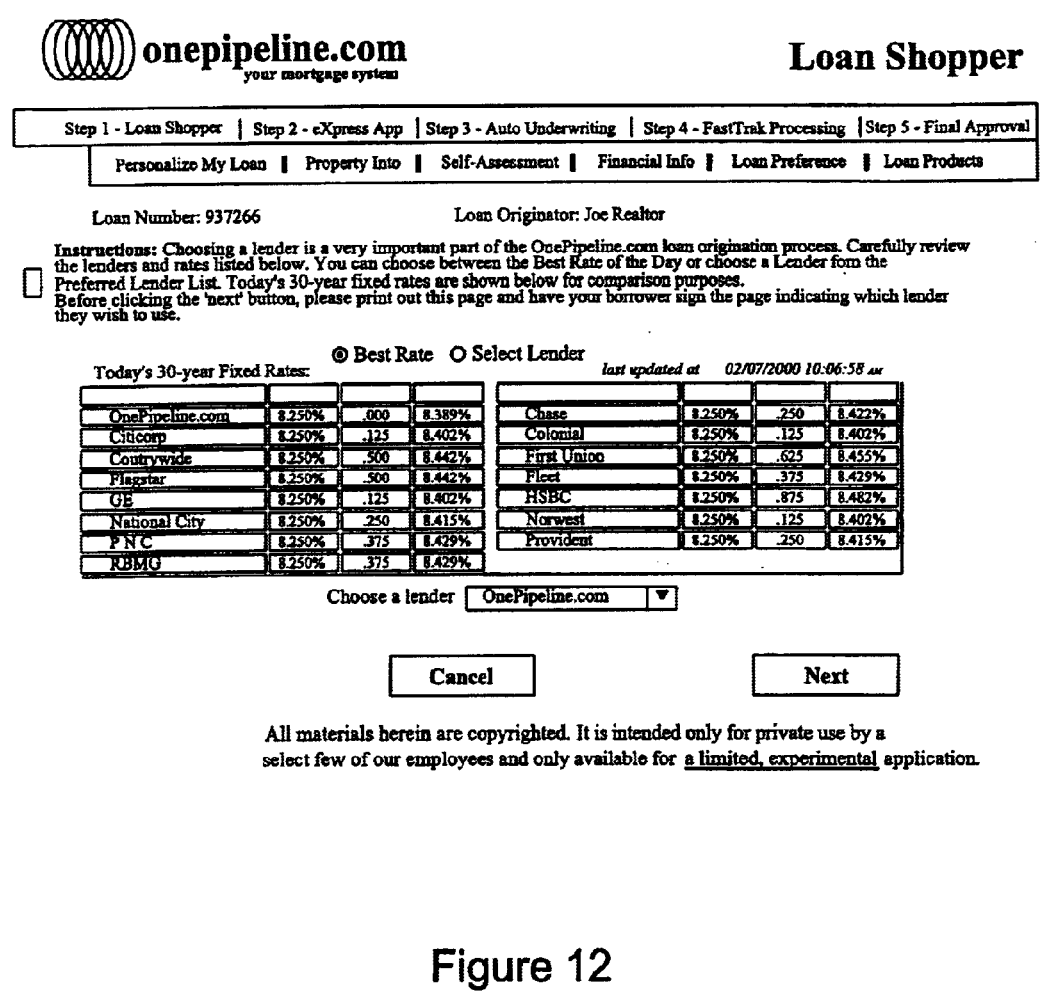

Figure 11 onepipeline.com
your mortgage system

Loan Shopper

Step 1 - Loan Shopper | Step 2 - eXpress App | Step 3 - Auto Underwriting | Step 4 - FastTrak Processing | Step 5 - Final Approval Personalize My Loan | Property Info | Self-Assessment | Financial Info | Loan Preference | Loan Products Loan Number: 937266 Loan Originator: Joe Realtor

Instructions: Choosing a lender is a very important part of the OnePipeline.com loan origination process. Carefully review the lenders and rates listed below. You can choose between the Best Rate of the Day or choose a Lender fom the Preferred Lender List. Today's 30-year fixed rates are shown below for comparison purposes.
Before clicking the 'next' button, please print out this page and have your borrower sign the page indicating which lender they wish to use.

◉ Best Rate ○ Select Lender

Today's 30-year Fixed Rates: *last updated at 02/07/2000 10:06:58 AM*

| | | | | | | | |
|---|---|---|---|---|---|---|---|
| OnePipeline.com | 8.250% | .000 | 8.389% | Chase | 8.250% | .250 | 8.422% |
| Citicorp | 8.250% | .125 | 8.402% | Colonial | 8.250% | .125 | 8.402% |
| Coutrywide | 8.250% | .500 | 8.442% | First Union | 8.250% | .625 | 8.455% |
| Flagstar | 8.250% | .500 | 8.442% | Fleet | 8.250% | .375 | 8.429% |
| GE | 8.250% | .125 | 8.402% | HSBC | 8.250% | .875 | 8.482% |
| National City | 8.250% | .250 | 8.415% | Norwest | 8.250% | .125 | 8.402% |
| P N C | 8.250% | .375 | 8.429% | Provident | 8.250% | .250 | 8.415% |
| RBMG | 8.250% | .375 | 8.429% | | | | |

Choose a lender [OnePipeline.com ▼]

[Cancel] [Next]

All materials herein are copyrighted. It is intended only for private use by a select few of our employees and only available for a limited, experimental application.

Figure 12

| OnePipeline.com - Loan Shopper - Netscape | ☐☐☐ |
|---|---|
| Need to ask a question? | Click here for help. | Personalize My Loan |

"Shopping for a mortgage has never been so convenient."

Instructions: Please answer a few questions on the following pages and we will find a loan that best fits your requirements and situation. The highlighted fields (**) are required.

Please enter the primary borrower's name

First Name: [            ] Last Name:
[                    ] **

How many borrowers will be part of this loan?  [- ▼] **

What is the purpose of this loan?

[Purchase        ▼] **

◁ Cancel                                          ▷ Go Forward

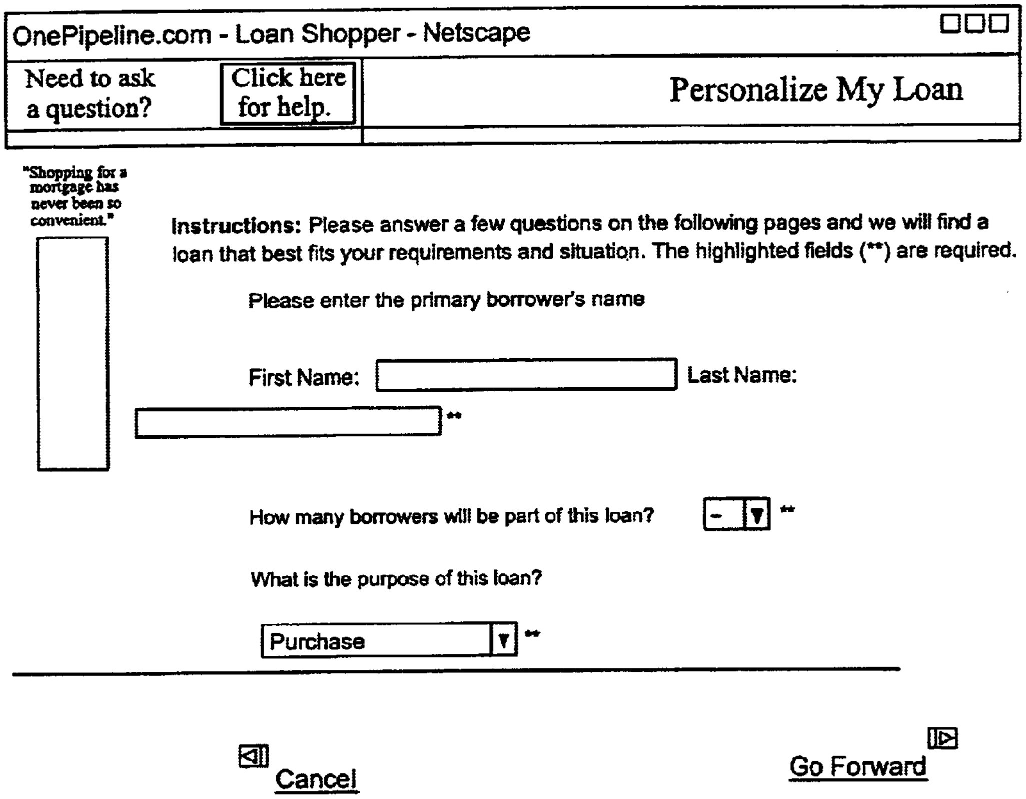

Figure 13

| OnePipeline.com - Loan Shopper - Microsoft Internet Explorer provided by Millenial Star Network Inc. |||
|---|---|---|
| Need to ask a question? [Click here for help.] | **Property Information** | **Loan Shopper** |
| | Property Information   Lender Consultation   Self-Assessment   Financial Information   Loan Prefs   Results ||

"Relax. Once you've found the home, the hard part is over."

● Cancel

Instructions: Complete the following information about the property you intend to buy. The highlighted fields (**) are required. Enter numbers without commas. (100000 not 100,000)

Page 1 of 5

Loan number: 129775   Loan Originator: Joe Realtor   Borrower: Frank Schmuk
Total Borrowers: 1   Loan Purpose: Purchase Approximate price of home (if refinance, enter market value of home)
$[15000] **

Subject property address (leave blank if not known)
[1234 Any Street]

Subject property city
[Any Towne]

Subject property State and Zip
[AK ▼] [    ]

Number of units
[1 ▼]

Occupancy Type
[Owner Occupied ▼] **

Property Type
[Single Family Detached ▼] **

Building Status
[Existing ▼]

If a condo or PUD - what are estimated HOA fees/month
$[0] **

Cancel      Go Forward

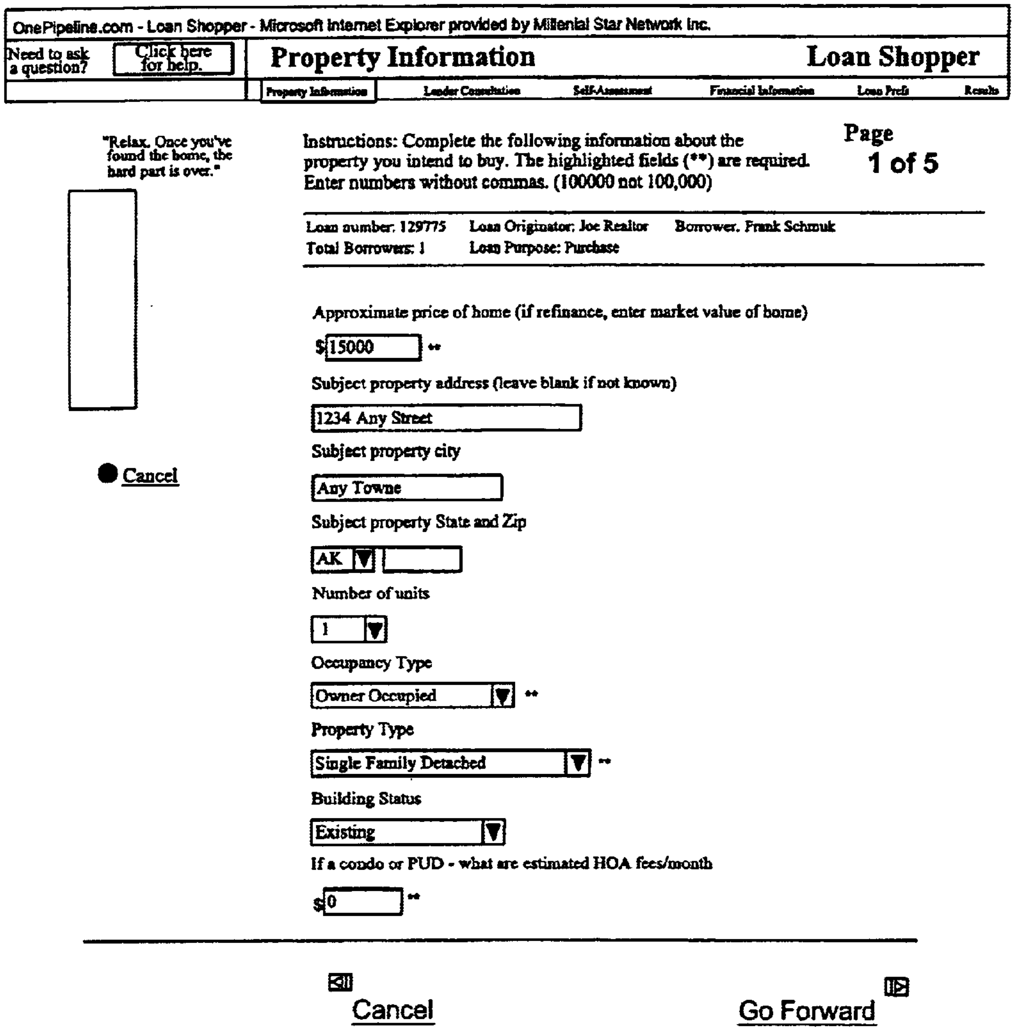

Figure 14

| OnePipeline.com - Loan Shopper - Microsoft Internet Explorer provided by Millenial Star Network Inc. | | |
|---|---|---|
| Need to ask a question? / Click here for help. | Property Information | Loan Shopper |
| | Property Information / Lender Consultation / Self-Assessment / Financial Information / Loan Prefs / Results | |

"Just a few more questions and we're ready to apply for the loan."

● Cancel

Instructions: You are required to answer all questions on this page to assess your credit situation. If any of the questions are answered 'yes' you may want to got to the Credit Repair Kit Page 3 of 5

Loan number: 129775  Loan Originator: Joe Realtor  Borrower: Frank Schmuk
Total Borrowers: 1  Loan Purpose: Purchase Have you declared bankruptcy in the last 7 years?
○ yes ○ no If so what kind of bankruptcy was filed?
[ 7 ▼]

If yes, what year and month was the bankruptcy filed?
Year: [_____] Month: [Jan ▼]

Was bankruptcy due to financial mismanagement?
○ yes ○ no

Have you had a home foreclosed or given a deed in lieu in the last 7 years?
○ yes ○ no If yes, what year?
Year: [_____] Month: [Jan ▼]

Do you have any outstanding liens or judgements?
○ yes ○ no

How many times have you been past due on any mortgage in the last 24 months?
[0 ▼]

How many times have you been past due on any other debt in the last 24 months?
[0 ▼]

How many times have you been past due on any mortgage in the last 12 months?
[0 ▼]

How many times have you been past due on any other debt in the last 12 months?
[0 ▼]

How long do you expect to be in the home?
[ - ▼]

Citizenship Status
[ - ▼]

Cancel                                                    Go Forward

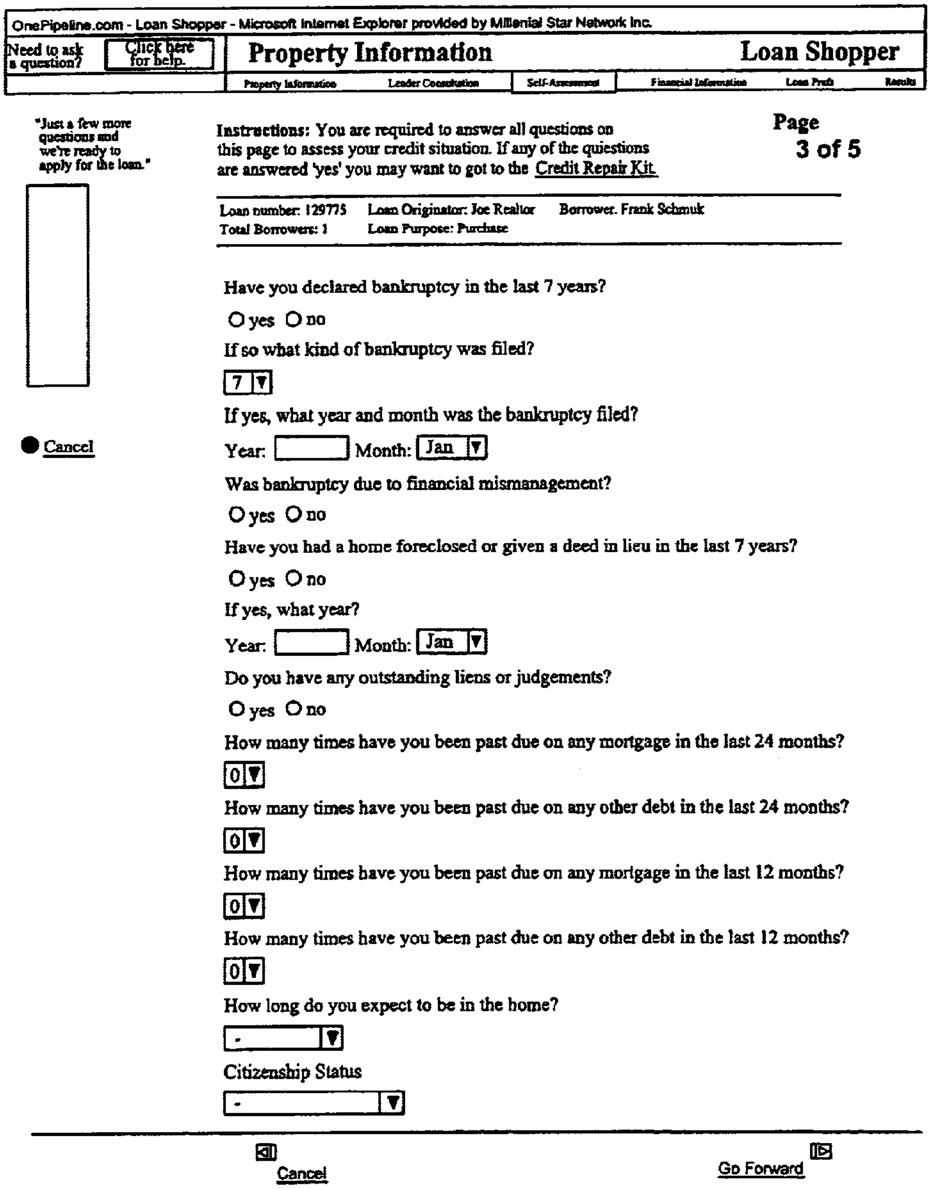

Figure 15

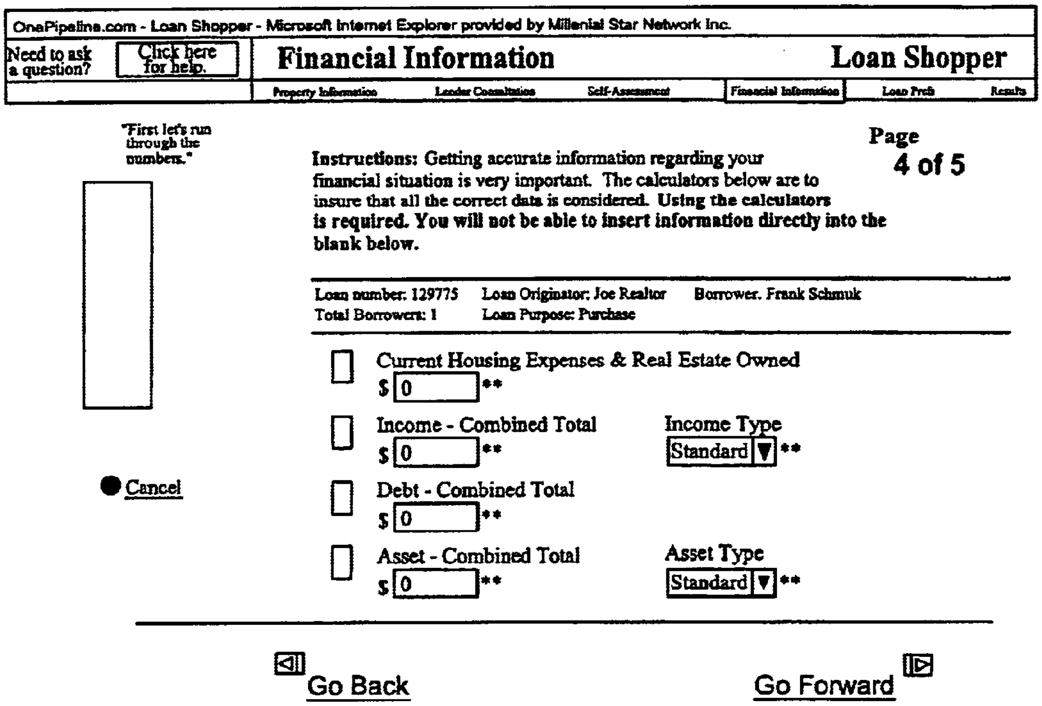

Figure 16

| | | | | |
|---|---|---|---|---|
| OnePipeline.com - Loan Shopper - Microsoft Internet Explorer provided by Millenial Star Network Inc. | | | | |
| Need to ask a question? | Click here for help. | **Financial Information** | | **Loan Shopper** |
| | | Property Information   Lender Consultation   Self-Assessment   **Financial Information**   Loan Prefs   Results | | |

"First let's run through the numbers."

Instructions: Getting accurate information regarding your financial situation is very important. The calculators below are to insure that all the correct data is considered. Using the calculators is required. You will not be able to insert information directly into the blank below.

Page 4 of 5

Loan number: 129775    Loan Originator: Joe Realtor    Borrower: Frank Schmuk
Total Borrowers: 1    Loan Purpose: Purchase ● Cancel ☐ Current Housing Expenses & Real Estate Owned
$ [0] **

☐ Income - Combined Total     Income Type
$ [0]      [Standard ▼]

☐ Debt - Combined Total
$ [0] **

☐ Asset - Combined Total     Asset Type
$ [0]      [Standard ▼]

◁ Go Back            Go Forward ▷

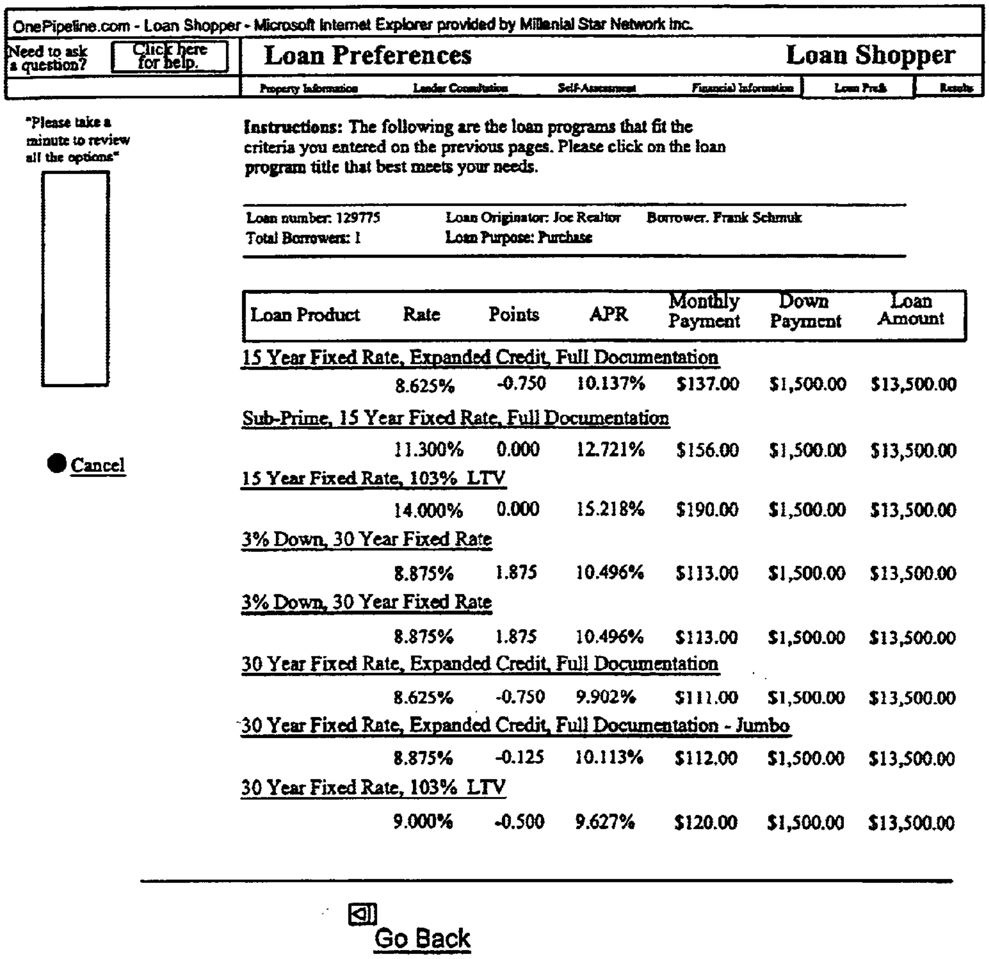

OnePipeline.com - Loan Shopper - Microsoft Internet Explorer provided by Millenial Star Network Inc.

Need to ask a question? Click here for help.

Loan Preferences Loan Shopper

Property Information | Lender Consultation | Self-Assessment | Financial Information | Loan Pref. | Results "Please take a minute to review all the options"

Instructions: The following are the loan programs that fit the criteria you entered on the previous pages. Please click on the loan program title that best meets your needs.

Loan number: 129775 Loan Originator: Joe Realtor Borrower: Frank Schmuk
Total Borrowers: 1 Loan Purpose: Purchase

| Loan Product | Rate | Points | APR | Monthly Payment | Down Payment | Loan Amount |
|---|---|---|---|---|---|---|
| 15 Year Fixed Rate, Expanded Credit, Full Documentation | | | | | | |
| | 8.625% | -0.750 | 10.137% | $137.00 | $1,500.00 | $13,500.00 |
| Sub-Prime, 15 Year Fixed Rate, Full Documentation | | | | | | |
| | 11.300% | 0.000 | 12.721% | $156.00 | $1,500.00 | $13,500.00 |
| 15 Year Fixed Rate, 103% LTV | | | | | | |
| | 14.000% | 0.000 | 15.218% | $190.00 | $1,500.00 | $13,500.00 |
| 3% Down, 30 Year Fixed Rate | | | | | | |
| | 8.875% | 1.875 | 10.496% | $113.00 | $1,500.00 | $13,500.00 |
| 3% Down, 30 Year Fixed Rate | | | | | | |
| | 8.875% | 1.875 | 10.496% | $113.00 | $1,500.00 | $13,500.00 |
| 30 Year Fixed Rate, Expanded Credit, Full Documentation | | | | | | |
| | 8.625% | -0.750 | 9.902% | $111.00 | $1,500.00 | $13,500.00 |
| 30 Year Fixed Rate, Expanded Credit, Full Documentation - Jumbo | | | | | | |
| | 8.875% | -0.125 | 10.113% | $112.00 | $1,500.00 | $13,500.00 |
| 30 Year Fixed Rate, 103% LTV | | | | | | |
| | 9.000% | -0.500 | 9.627% | $120.00 | $1,500.00 | $13,500.00 |

Cancel

Go Back

Figure 18

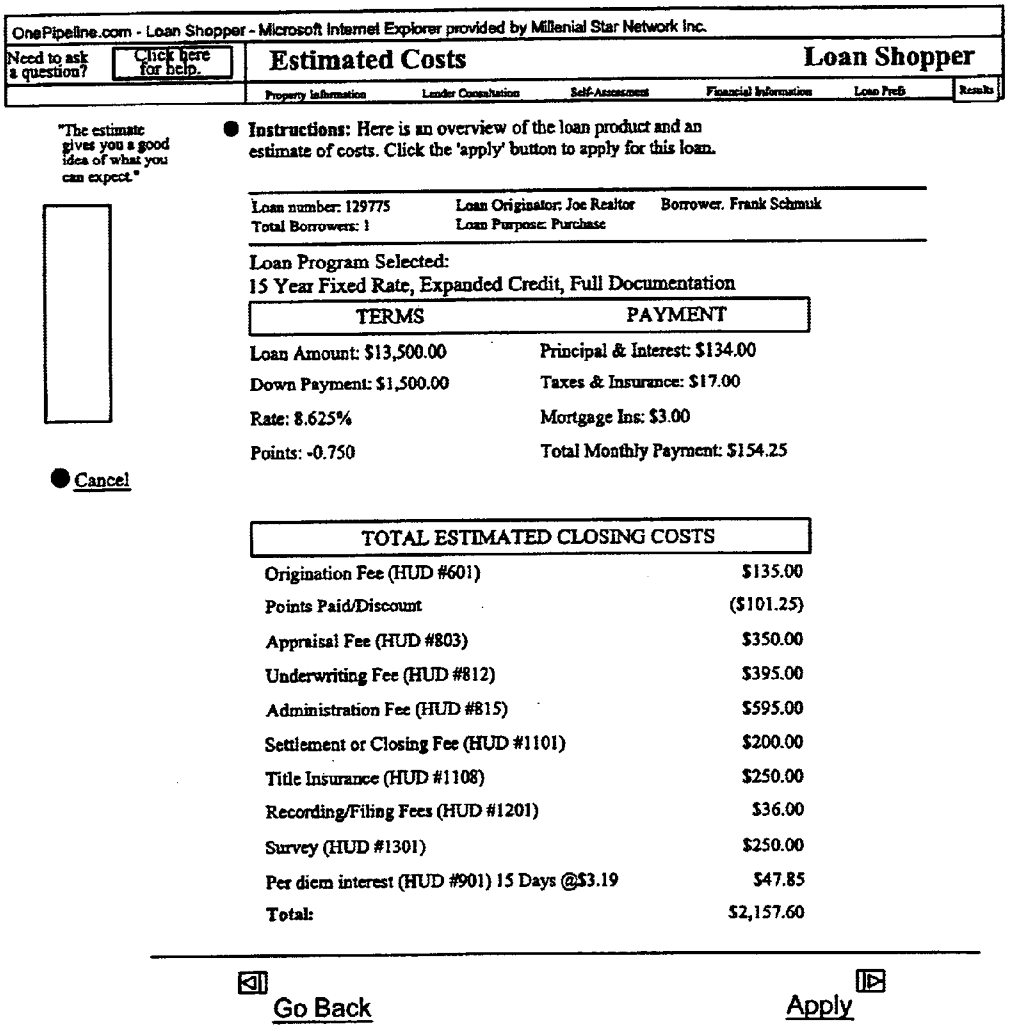

Figure 19

| OnePipeline.com - Loan Shopper - Microsoft Internet Explorer provided by Millenial Star Network Inc. | | |
|---|---|---|
| Need to ask a question? **Click here for help.** | **Estimated Costs** | **Loan Shopper** |
| | Property Information  Lender Consultation  Self-Assessment  Financial Information  Loan PreB | Results |

"The estimate gives you a good idea of what you can expect."

● Instructions: Here is an overview of the loan product and an estimate of costs. Click the 'apply' button to apply for this loan.

| Loan number: 129775 | Loan Originator: Joe Realtor | Borrower: Frank Schmuk |
|---|---|---|
| Total Borrowers: 1 | Loan Purpose: Purchase | |

Loan Program Selected:
15 Year Fixed Rate, Expanded Credit, Full Documentation

| TERMS | PAYMENT |
|---|---|
| Loan Amount: $13,500.00 | Principal & Interest: $134.00 |
| Down Payment: $1,500.00 | Taxes & Insurance: $17.00 |
| Rate: 8.625% | Mortgage Ins: $3.00 |
| Points: -0.750 | Total Monthly Payment: $154.25 |

● Cancel

| TOTAL ESTIMATED CLOSING COSTS | |
|---|---|
| Origination Fee (HUD #601) | $135.00 |
| Points Paid/Discount | ($101.25) |
| Appraisal Fee (HUD #803) | $350.00 |
| Underwriting Fee (HUD #812) | $395.00 |
| Administration Fee (HUD #815) | $595.00 |
| Settlement or Closing Fee (HUD #1101) | $200.00 |
| Title Insurance (HUD #1108) | $250.00 |
| Recording/Filing Fees (HUD #1201) | $36.00 |
| Survey (HUD #1301) | $250.00 |
| Per diem interest (HUD #901) 15 Days @$3.19 | $47.85 |
| Total: | $2,157.60 |

◁ Go Back                ▷ Apply

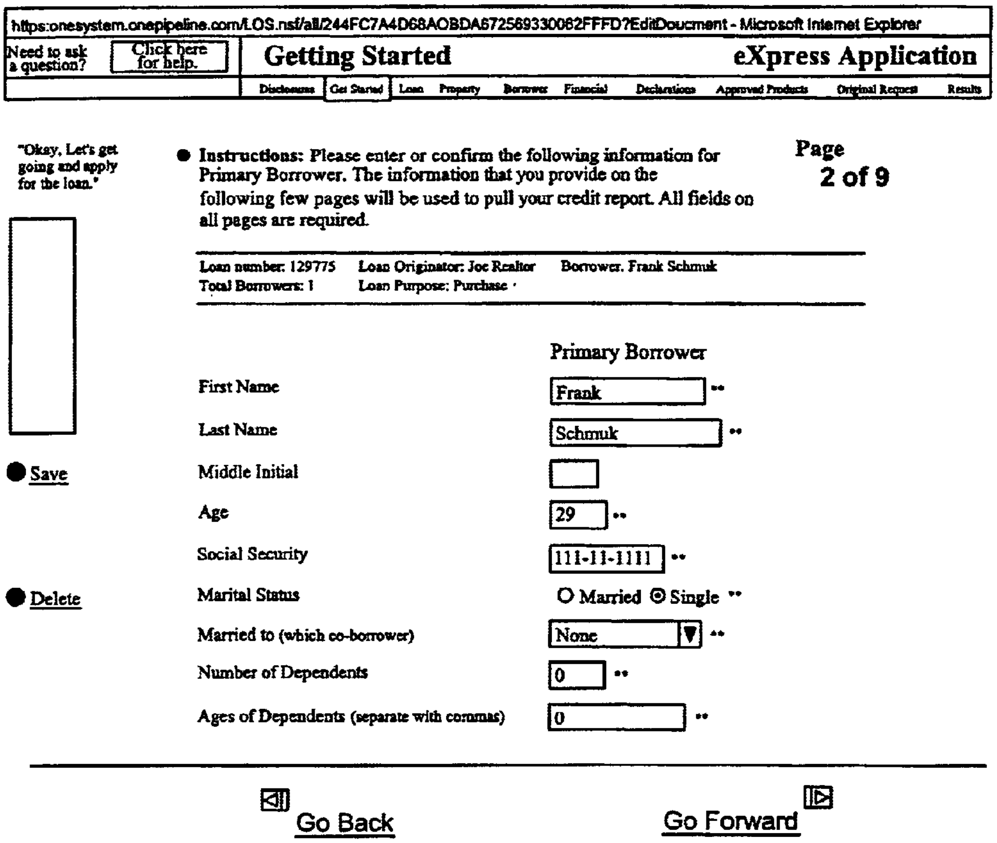

Figure 22

| https:onesystem.onepipeline.com/LOS.nsf/all/244FC7A4D68A0BDA672569330062FFFD?EditDocument - Microsoft Internet Explorer |||
|---|---|---|
| Need to ask a question? [Click here for help.] | **Getting Started** | **eXpress Application** |
| | Disclosures \| Get Started \| Loan \| Property \| Borrower \| Financial \| Declarations \| Approved Products \| Original Request \| Results ||

"Okay. Let's get going and apply for the loan."

- Instructions: Please enter or confirm the following information for Primary Borrower. The information that you provide on the following few pages will be used to pull your credit report. All fields on all pages are required.

Page 2 of 9

Loan number: 129775    Loan Originator: Joe Realtor    Borrower: Frank Schmuk
Total Borrowers: 1    Loan Purpose: Purchase ● Save ● Delete Primary Borrower

| | |
|---|---|
| First Name | [Frank] ** |
| Last Name | [Schmuk] ** |
| Middle Initial | [ ] |
| Age | [29] ** |
| Social Security | [111-11-1111] ** |
| Marital Status | ○ Married ● Single ** |
| Married to (which co-borrower) | [None ▼] ** |
| Number of Dependents | [0] ** |
| Ages of Dependents (separate with commas) | [0] ** |

◁ Go Back        Go Forward ▷

| | | |
|---|---|---|
| Need to ask a question? Click here for help. | **Declarations** | **eXpress Application** |

Disclosures | Get Started | Loan | Property | Borrower | Financial | Declarations | Approved Products | Original Request | Results "Now a few simple questions to finalize the application."

● Instructions: Please answer All of these questions. If you answer 'yes', to any questions "a" through "i", please explain in the field below.

Loan number: 129775   Loan Originator: Joe Realtor   Borrower: Frank Schmuk
Total Borrowers: 1   Loan Purpose: Purchase ● Save ● Delete

|  |  | Borrower |
|---|---|---|
| a. | Are there any outstanding judgements against you? | ○ yes ⦿ no |
| b. | Have you been declared bankrupt within the past 7 years? | ○ yes ○ no |
| c. | Have you had property foreclosed upon or given title or deed in lieu thereof in the last 7 years? | ○ yes ⦿ no |
| d. | Are you a party to a lawsuit? | ○ yes ○ no |
| e. | Have you directly or indirectly been obligated on any loan which resulted in forclosure, transfer of title in lieu of foreclosure of judgement? | ○ yes ○ no |
| f. | Are you presently delinquint or in default on any Federal debt or other loan, mortgage, financial obligation, bond or loan guarantee? | ○ yes ○ no |
| g. | Are you obligated to pay alimony, child support, or separate maintenance? | ○ yes ○ no |
| h. | Is any part of the down payment borrowed? | ○ yes ○ no |
| i. | Are you a co-maker or endorser on a note? | ○ yes ○ no |

Please explain any "yes" answers in questions "a" through "i".

|  |  |  |
|---|---|---|
| j. | Are you a US citizen? | ○ yes ○ no |
| k. | If not, are you a permanent resident alien? | ○ yes ○ no |
| l. | Do you intend to occupy the property as your primary residence? (if "yes", complete "m" below) | ○ yes ○ no |
| m. | Have you had ownership interest in property in the last three years? | ○ yes ○ no |

(1). What type of property did you own?
  Property 1
  Property 2
  Property 3

(2). How do you hold title to the home?
  Property 1

Go Back                    Go Forward

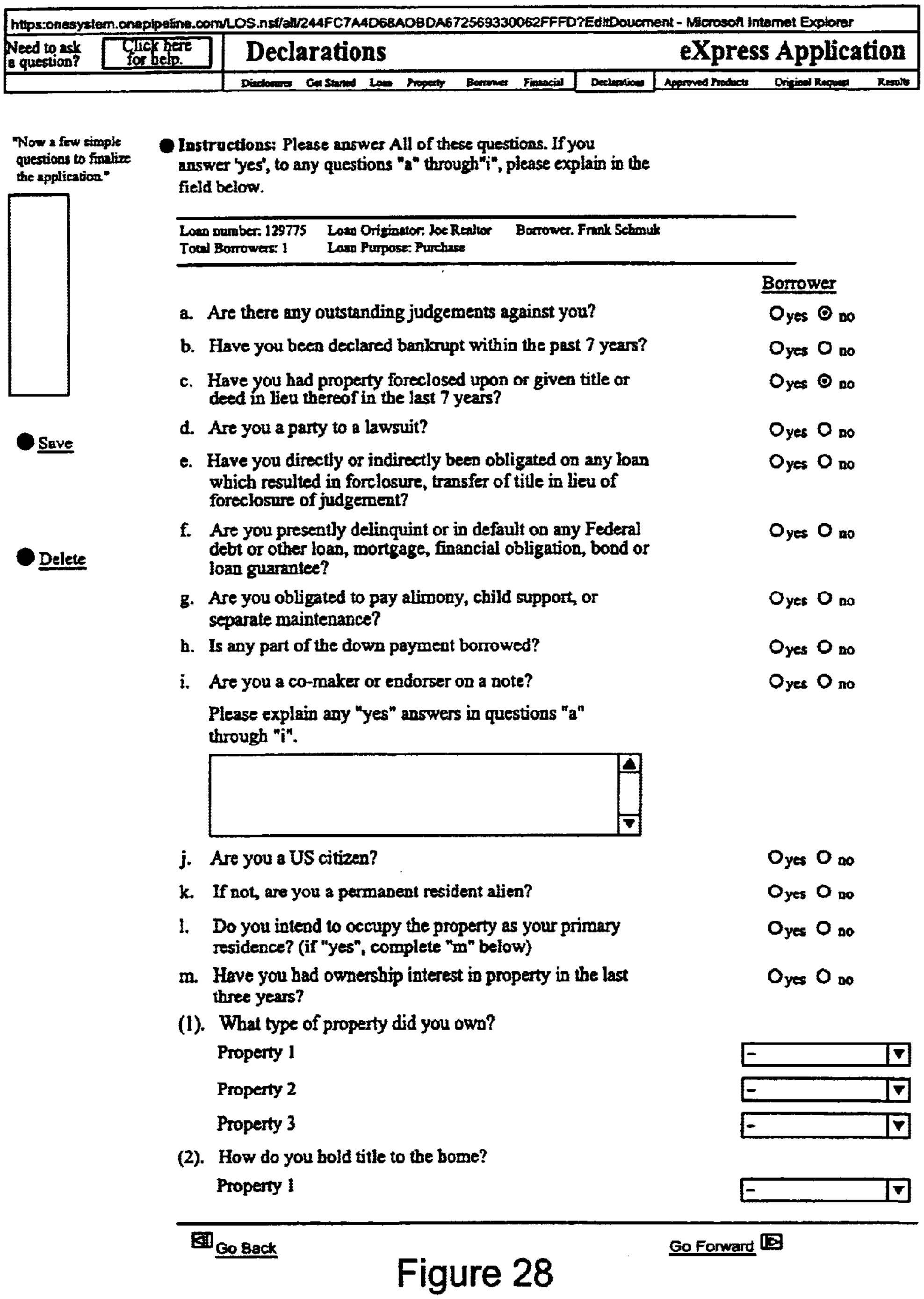

Task Maintenance & Status Reporting Gateway https:onesystem.onepipeline.com/LOS.nsf/all/244FC7A4D68AOBDA872589330062FFFD?EditDocument - Microsoft Internet Explorer https://onesystem.onepipeline.com/LOS.nsf/allLoansWeb/4B9A064E8AA7ABDB8725693E006367F4

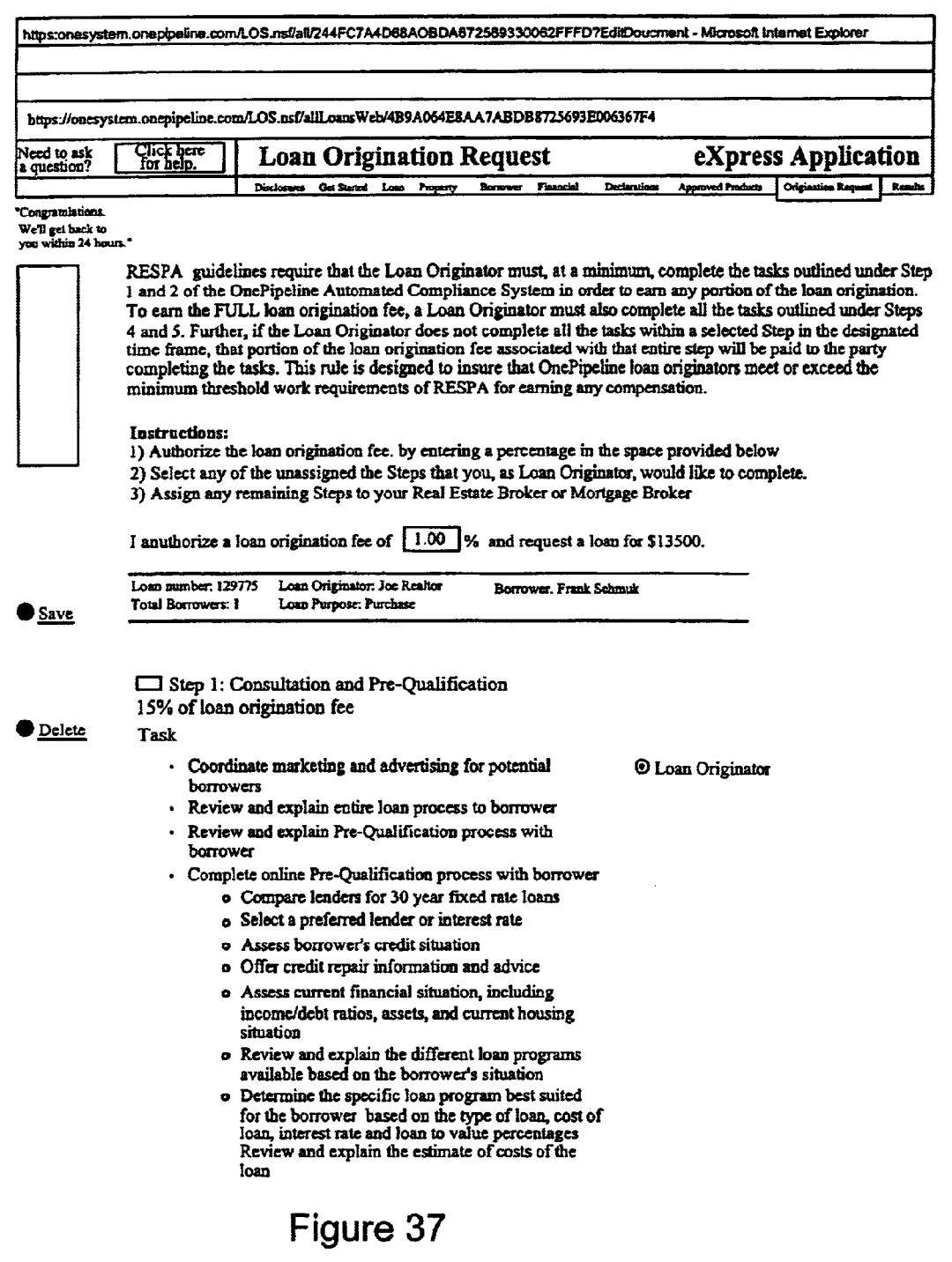

Need to ask a question? Click here for help.

Loan Origination Request eXpress Application

Disclosures | Get Started | Loan | Property | Borrower | Financial | Declarations | Approved Products | Origination Request | Results "Congratulations. We'll get back to you within 24 hours."

RESPA guidelines require that the Loan Originator must, at a minimum, complete the tasks outlined under Step 1 and 2 of the OnePipeline Automated Compliance System in order to earn any portion of the loan origination. To earn the FULL loan origination fee, a Loan Originator must also complete all the tasks outlined under Steps 4 and 5. Further, if the Loan Originator does not complete all the tasks within a selected Step in the designated time frame, that portion of the loan origination fee associated with that entire step will be paid to the party completing the tasks. This rule is designed to insure that OnePipeline loan originators meet or exceed the minimum threshold work requirements of RESPA for earning any compensation.

Instructions:
1) Authorize the loan origination fee. by entering a percentage in the space provided below
2) Select any of the unassigned the Steps that you, as Loan Originator, would like to complete.
3) Assign any remaining Steps to your Real Estate Broker or Mortgage Broker I anuthorize a loan origination fee of [1.00] % and request a loan for $13500.

Loan number: 129775 Loan Originator: Joe Realtor Borrower. Frank Schmuk
Total Borrowers: 1 Loan Purpose: Purchase ● Save ☐ Step 1: Consultation and Pre-Qualification
15% of loan origination fee ● Delete Task

- Coordinate marketing and advertising for potential borrowers ⦿ Loan Originator
- Review and explain entire loan process to borrower
- Review and explain Pre-Qualification process with borrower
- Complete online Pre-Qualification process with borrower
  - Compare lenders for 30 year fixed rate loans
  - Select a preferred lender or interest rate
  - Assess borrower's credit situation
  - Offer credit repair information and advice
  - Assess current financial situation, including income/debt ratios, assets, and current housing situation
  - Review and explain the different loan programs available based on the borrower's situation
  - Determine the specific loan program best suited for the borrower based on the type of loan, cost of loan, interest rate and loan to value percentages Review and explain the estimate of costs of the loan

Figure 37

☐ Step 2: Loan Application
20% of loan origination fee

Task

◉ Loan Originator

- Collect basic financial information from borrower
- Review and explain the Authorization to Verify Information to the borrower
- Have the borrower sign the Authorization to Verify Information
- Review and explain the Business Disclosure Statement to the borrower
- Have the borrower sign the Business Disclosure Statement
- Complete the online Loan Application
    - Estimate property value of new property purchase
    - Determining down payment and loan to value for the new property purchase
    - Review new property purchase information and status
    - Review and correct current financial situation from Pre-Qualification
    - Collect borrower information including declarations
- Determine loan origination fee
- Select any of the unassigned Steps that you, as the loan originator, want to complete. Assign remaining Steps to your Real Estate Broker or Mortgage Broker as appropriate.
- Schedule closing with borrower
- Order Title Report
- Order Appraisal

Figure 38

☐ Step 3: Loan Review and Administrative Tasks
15% of loan origination fee

Task

- Provide quality control for and file/store copies of Authorization to Verify Form, Business Disclosure Form, Good Faith Estimate, Truth In Lending Statement and other Disclosures
- Review loan file for accuracy with the borrower
- Review and explain underwriting process and conditions with borrower
  - Review and explain underwriting process with borrower
  - Review and explain the financial information needed from the borrower
  - Review and explain the reason for the Homeowner's Insurance Binder with the borrower
  - Review and explain the reason for Title Report to the borrower
  - Review and explain the reason for the Appraisal to the borrower
  - Review and explain the reason for Flood Certification to the borrower
  - Review and explain the reason for the Survey (as required)
- Review of the underwriting conditions
- Submit file for underwriting approval ⦿ Loan Originator
○ Real Estate Broker
○ Mortgage Processing Center

Figure 39

Figure 40:
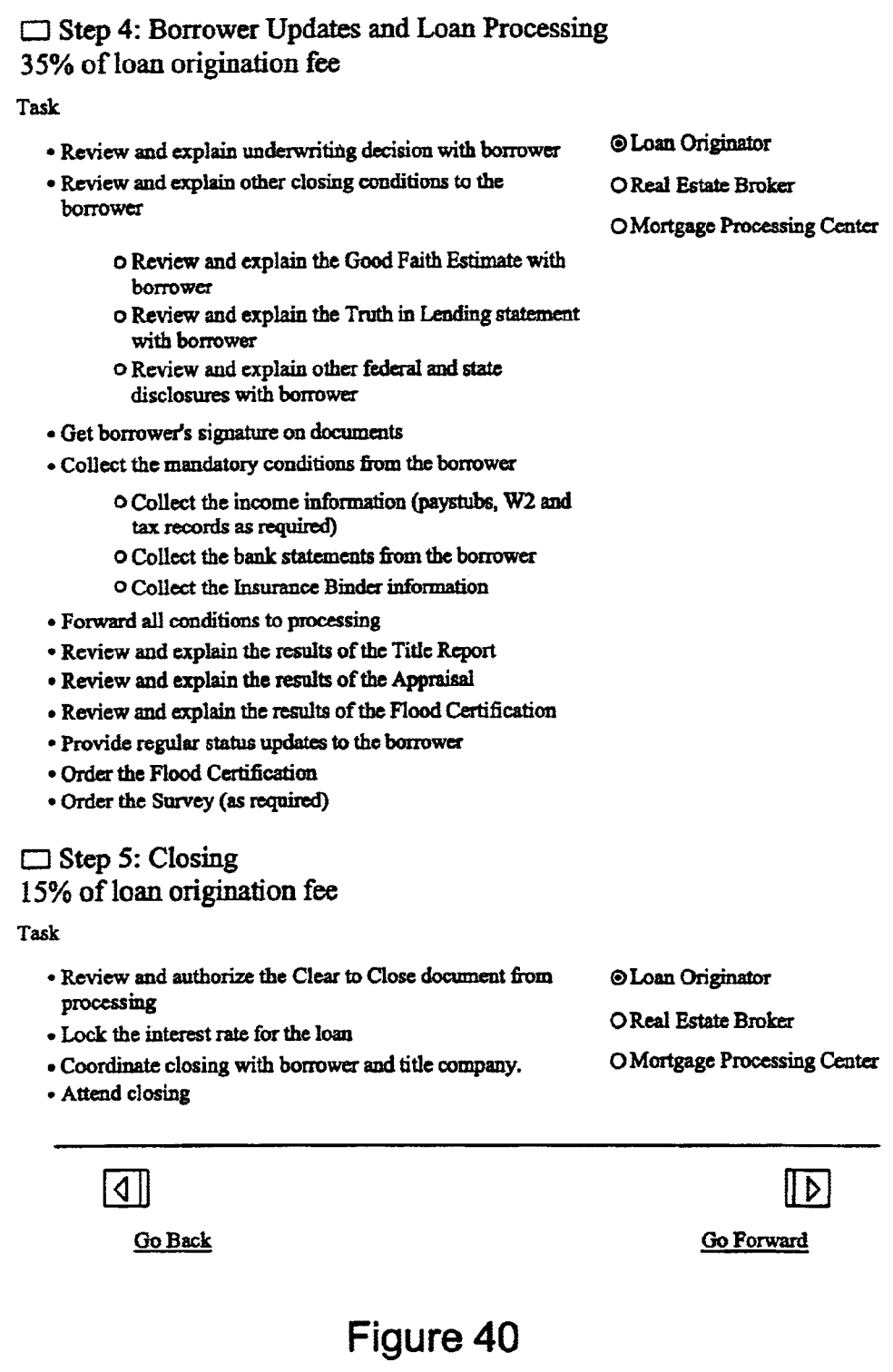

☐ Step 4: Borrower Updates and Loan Processing
35% of loan origination fee

Task

- Review and explain underwriting decision with borrower
- Review and explain other closing conditions to the borrower
    - Review and explain the Good Faith Estimate with borrower
    - Review and explain the Truth in Lending statement with borrower
    - Review and explain other federal and state disclosures with borrower
- Get borrower's signature on documents
- Collect the mandatory conditions from the borrower
    - Collect the income information (paystubs, W2 and tax records as required)
    - Collect the bank statements from the borrower
    - Collect the Insurance Binder information
- Forward all conditions to processing
- Review and explain the results of the Title Report
- Review and explain the results of the Appraisal
- Review and explain the results of the Flood Certification
- Provide regular status updates to the borrower
- Order the Flood Certification
- Order the Survey (as required)

◉ Loan Originator
○ Real Estate Broker
○ Mortgage Processing Center

☐ Step 5: Closing
15% of loan origination fee

Task

- Review and authorize the Clear to Close document from processing
- Lock the interest rate for the loan
- Coordinate closing with borrower and title company.
- Attend closing ◉ Loan Originator
○ Real Estate Broker
○ Mortgage Processing Center

---

Go Back    Go Forward

Figure 40 https://onesystem.onepipeline.com https://onesystem.onepipeline.com/LOS.nsf/tasklist Need to ask a question? Click here for help.

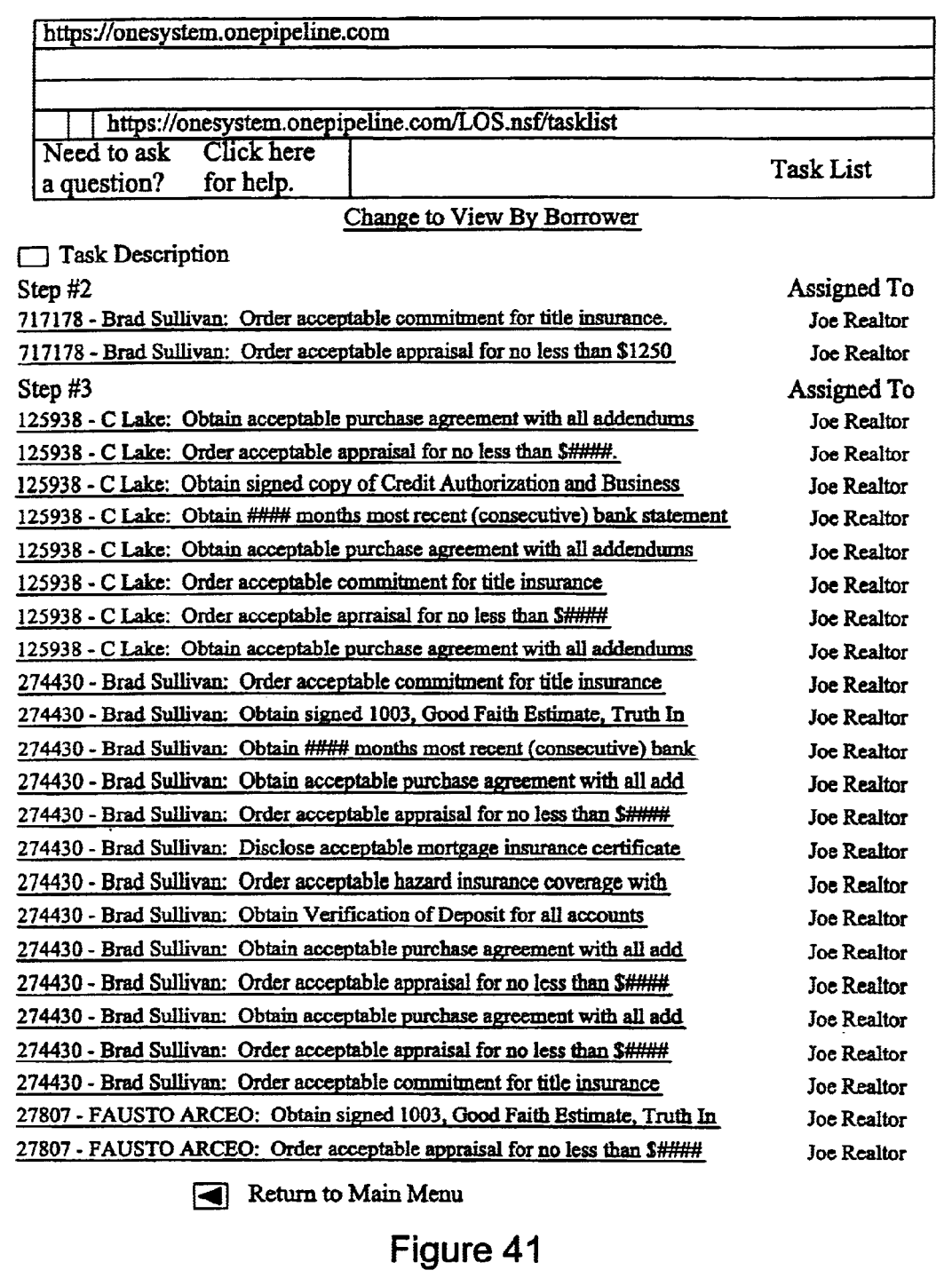

Task List

Change to View By Borrower

Task Description

| Step #2 | Assigned To |
|---|---|
| 717178 - Brad Sullivan: Order acceptable commitment for title insurance. | Joe Realtor |
| 717178 - Brad Sullivan: Order acceptable appraisal for no less than $1250 | Joe Realtor |
| **Step #3** | **Assigned To** |
| 125938 - C Lake: Obtain acceptable purchase agreement with all addendums | Joe Realtor |
| 125938 - C Lake: Order acceptable appraisal for no less than $####. | Joe Realtor |
| 125938 - C Lake: Obtain signed copy of Credit Authorization and Business | Joe Realtor |
| 125938 - C Lake: Obtain #### months most recent (consecutive) bank statement | Joe Realtor |
| 125938 - C Lake: Obtain acceptable purchase agreement with all addendums | Joe Realtor |
| 125938 - C Lake: Order acceptable commitment for title insurance | Joe Realtor |
| 125938 - C Lake: Order acceptable aprraisal for no less than $#### | Joe Realtor |
| 125938 - C Lake: Obtain acceptable purchase agreement with all addendums | Joe Realtor |
| 274430 - Brad Sullivan: Order acceptable commitment for title insurance | Joe Realtor |
| 274430 - Brad Sullivan: Obtain signed 1003, Good Faith Estimate, Truth In | Joe Realtor |
| 274430 - Brad Sullivan: Obtain #### months most recent (consecutive) bank | Joe Realtor |
| 274430 - Brad Sullivan: Obtain acceptable purchase agreement with all add | Joe Realtor |
| 274430 - Brad Sullivan: Order acceptable appraisal for no less than $#### | Joe Realtor |
| 274430 - Brad Sullivan: Disclose acceptable mortgage insurance certificate | Joe Realtor |
| 274430 - Brad Sullivan: Order acceptable hazard insurance coverage with | Joe Realtor |
| 274430 - Brad Sullivan: Obtain Verification of Deposit for all accounts | Joe Realtor |
| 274430 - Brad Sullivan: Obtain acceptable purchase agreement with all add | Joe Realtor |
| 274430 - Brad Sullivan: Order acceptable appraisal for no less than $#### | Joe Realtor |
| 274430 - Brad Sullivan: Obtain acceptable purchase agreement with all add | Joe Realtor |
| 274430 - Brad Sullivan: Order acceptable appraisal for no less than $#### | Joe Realtor |
| 274430 - Brad Sullivan: Order acceptable commitment for title insurance | Joe Realtor |
| 27807 - FAUSTO ARCEO: Obtain signed 1003, Good Faith Estimate, Truth In | Joe Realtor |
| 27807 - FAUSTO ARCEO: Order acceptable appraisal for no less than $#### | Joe Realtor |

Return to Main Menu

Figure 41

METHOD AND APPARATUS FOR A MORTGAGE LOAN ORIGINATOR COMPLIANCE ENGINE

RELATED APPLICATIONS

This application claims the benefit of U.S. Provisional Application No. 60/189,635 filed Mar. 14, 2000. This application is also related to the following utility applications which are filed on the same day as this application:

- Ser. No. 09/645,775 Filed Aug. 24, 2000, titled "A method and apparatus for a mortgage loan origination gateway";
- Ser. No. 09/645,796 Filed Aug. 24, 2000, titled "A method and apparatus for verification of a qualified mortgage loan originator";
- Ser. No. 09/645,799 Filed Aug. 24, 2000, titled "Method and Apparatus for a Mortgage Loan Management System";
- Ser. No. 09/645,800 Filed Aug. 24, 2000, titled "A method and apparatus for a mortgage loan task flow process";
- Ser. No. 09/645,798 Filed Aug. 24, 2000, titled "A method and apparatus for a mortgage loan process interaction gateway";
- Ser. No. 09/645,801 Filed Aug. 24, 2000, titled "A method and apparatus for a mortgage loan transaction service provider gateway";
- Ser. No. 09/645,774 Filed Aug. 24, 2000, titled "A method and apparatus for worker compensation & task performance reporting in a mortgage loan transaction system".

COPYRIGHT NOTICE

A portion of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to the general field of computers, telecommunications, and computer and Internet related systems. More specifically the invention relates to systems and processes to be used in the mortgage industry for generating and monitoring a set of required procedures involved in moving a mortgage loan through the steps of 'originate', 'approve', 'close', 'fund', and 'ship'.

BACKGROUND

There is a need for an automated system for managing the processing of mortgage loan applications, wherein the identification of the loan originator, his/her location and the location of the property which is the subject of the loan, determine the Federal and State mortgage loan laws and regulations as well as the professional guidelines which govern the loan transaction, and wherein the automated system uses the specific loan regulations to determine the tasks required to complete a loan transaction, including tasks required by applicably federal or state law, provide the set of required tasks to lenders and other interested parties, record the completion of the set of tasks, and if requested by a lender, to use the set of tasks internally to drive the flow of the automated mortgage loan process to completion.

The Federal laws and regulations in question are basically those outlined in the Real Estate Settlement Procedures Act (RESPA) and the Federal Housing and Urban Development's (HUD's) implementing Regulation X. The State regulations in question are those State specific regulations and implementing instructions that serve a similar purpose, relating to Lender payments to Mortgage Brokers and other settlement service providers. RESPA is the federal law implemented by HUD's Regulation X, to protect home buyers from excess costs and confusion when securing a home mortgage loan. Among other federal laws, the Truth in Lending Act ("TILA") and the Equal Credit Opportunity Act ("ECOA") impact the mortgage loan process. Under the TILA, certain credit related disclosures are required to be made to the borrower prior to the consummation of a mortgage loan transaction, so that the borrower understands the total cost of the loan.

The ECOA, and its implementing regulation, Regulation B, were enacted and promulgated to require that lenders make credit equally available to all creditworthy borrowers without regard to race, color, religion, national origin, sex, marital status, age, receipt of public assistance or the fact that the borrower in good faith exercised any right under the Federal Consumer Credit Protection Act. In addition to the prohibition against discrimination, the ECOA and Regulation B also contain, among others, requirements regarding the provision of appraisal reports, evaluation of applications, spousal signatures, and the provision of adverse action notices.

Regarding state laws, most jurisdictions have enacted licensing statutes that may require real estate sales professionals, builders, financial institutions/lenders and mortgage brokers to obtain a license and satisfy various other financial, educational and operational requirements. Most jurisdictions also have enacted laws that impose, among others, requirements regarding the types of fees that may be charged to a consumer in connection with a mortgage loan transaction and the persons entitled to receive such fees, as well as certain jurisdiction-specific disclosures that must be provided to the consumer.

There is a need for a system to facilitate the application of all of these laws and regulations ("regulations") in an efficient and systematic manner during the course of a mortgage loan transaction by using the telecommunications and computing facilities available to the market today.

While some state laws are more restrictive, RESPA allows a licensed real estate professional to receive compensation for originating a mortgage loan only if that real estate professional provides goods or facilities or performs services that are necessary for the origination of the loan and that are separate and distinct from any services the real estate professional provides incident to the sale of the property that secures the mortgage loan. Moreover the mortgage loan process is labor intensive, error prone and time consuming for all parties concerned, making it difficult for a real estate professional to track the services he or she provided to satisfy RESPA and state requirements to justify receiving compensation.

Since the inception of the mortgage process wherein a borrower and lender associated themselves to enact a mutually beneficial and agreeable relationship, the lending process has become increasingly complex. In prior times, a lender, typically a small bank, negotiated directly with a potential home, commercial, or business owner to purchase real property. The borrower presented him- or herself directly to the president of the bank, or to a designated lending officer, and petitioned that bank officer for money to accomplish the purchase of, or improvement to a piece of property. The deal was sometimes affirmed in the form of a handshake, but by definition, a mortgage loan is a loan secured by a mortgage on the subject property. In all, the process was very subjective, and great weight was given to the friendship (or lack of it) between the borrower and lender, as well as other factors which, in today's lending environment, are discouraged or are illegal. The demand for fairness and equity, as well as an increasingly competitive lending environment, was the reason why RESPA was passed and now requires a greater level of sophistication on the part of the lending community. Furthermore as indicated above, increasing oversight on the part of governments and regulatory agencies have required increased levels of sophistication in the traditional borrower-lender relationship. While these oversight demands are generally considered to be a benefit to the borrower-lender relationship, it is, nonetheless a burden to all parties, and significant increases in both time and cost are accrued to the process. As well, protective regulations added by the lending community under whose umbrella the industry operates, further protract the process of 'doing business'. As indicated above, these regulations and 'rules' governing the mortgage process permit those in the loan origination role to receive a fee for services rendered when the applicable rules are followed, as well as penalties and loss of fees for non-compliance. For example, RESPA has criminal penalties wherein a violator can go to jail for up to a year.

The impacts from this increased burden are manifold. The process of obtaining a property-secured loan is protracted by regulation and disjointed, because the participating agents, workers, institutions, and individuals are linked throughout the transaction by archaic means, that is to say, via face-to-face meeting, telephone conversation, fax, postal mail, private delivery contractors, e-mail, and electronic file transmittal. While in some instances, these means are considered by some to be state-of-the-art, they are not. Inherent in all of these transactive mechanisms is the human element. It is typical that time is consumed from the loan application, underwriting, and issuance process because a person is involved at virtually every step of the process. Typically, individuals process information serially, that is, one requirement after another, whereas other means exist to process information and service requests in parallel, where multiple requests are handled or processed simultaneously.

In current methodologies, the loan approval can occur only after the lender has obtained and processed all relevant borrower information, including financial, credit, and employment information. A further disabling of the process exists when errors are made, an event more common when persons are involved in simple, repetitive data handling and manipulation tasks.

In present implementations, the mortgage underwriting process generally follows the following pattern: A borrower, wishing to purchase or improve real property, and usually without the help of experienced advisors, makes a personal determination of the amount of available money generally required for a down payment and his or her ability to repay a loan for the balance. With this personal estimate in mind, a borrower (or buyer) begins a search for property and attends carefully to the costs of said property, making sure that the scope of the search is within the individual's envisioned cash flow constraints and acceptable debt ratios. Generally, individuals seek the professional services of a skilled Real estate sales professional or other agent to aid in the search for suitable property. Concurrent with this search, the individual will often, at the advice of a Real estate sales professional, seek to obtain a pre-approval for an envisioned loan amount, or at least a pre-qualification for a loan. In certain lending models envisioned by the present invention, loan approvals are accompanied with a 'rate-lock', or an indication by the lending institution of the available interest rate. Until such a commitment is obtained, it is generally not possible for the individual to faithfully commit to the purchase of property. In the current practice, the pre-approval process occurs outside of the Real estate sales professional's control. However, when a loan pre-approval is obtained, the buyer may, in good faith, negotiate with a seller for the purchase of property. Such negotiations are almost always facilitated by the attending Real estate sales professional(s) who represent the buyer and/or seller in the negotiation. When a mutually agreeable price is determined, and terms of the agreement specific to the buyer and seller are negotiated, appropriate documents are signed, such documents constituting a formally offered and accepted 'offer to purchase'. At this time, the lending institution originally issuing the loan pre-approval is contacted to proceed with the loan application. It is at this step that the aforementioned 'burdens' come to bear on the transaction.

In the past, attempts have been made to automate some parts of this process. For example, U.S. Pat. No. 5,995,947 issued Nov. 30, 1999 to IMX Mortgage Exchange titled "Interactive Mortgage and loan information and real-time trading system" provides a system and method for trading loans wherein a transaction server maintains a database of pending loan applications and their statuses, and wherein each party to the loan (broker, lender) can search and modify the database consistent with their role in the transaction. However this system focuses on only one facet of the loan process itself. Other parts of the loan process are addressed in U.S. Pat. No. 5,966,700 issued Oct. 12, 1999 to Federal Home Loan Bank of Chicago, titled "Management System for Risk Sharing of Mortgage Pools" is a system wherein a mortgage originator (bank, savings & loan, etc.) and a funding institution (Federal Home Loan Bank, etc.) agree to assume certain risks for the mortgage by entering into a credit agreement having an overall credit enhancement value, and wherein the system calculates and records the allocation of mortgage interest and credit risk between them. This system functions after a mortgage has been issued which is outside of applicants' present system. Another recently issued patent related to mortgage loans is U.S. Pat. No. 5,991,745 issued Nov. 23, 1999 to Fannie Mae, titled "Reverse Mortgage Loan Calculation System and Process", which is a payment calculation system related to loans that the borrower is generally not required to repay until the security property is sold. Still another is U.S. Pat. No. 5,940,812 issued Aug. 17, 1999 to LoanMarket Resources, LLC titled "Apparatus & Method for Automatically Matching a Best Available Loan to a Potential Borrower via Global Telecommunications Network" teaches a system for matching loan requests (and related credit data) to lenders (with related eligibility criteria) in order to facilitate such loans whether they be for automobile purchases or whatever. Similarly, other U.S. Patents teach methods for real time loan approval (U.S. Pat. No. 5,870,721), methods for Lender direct credit evaluation and loan processing(U.S. Pat. Nos. 6,029,149; 5,930,776; and 5,611,052); and methods for keeping track of loans, loan histories, leases and pertinent data related thereto (U.S. Pat. No. 4,774,664).

Inherent in most property transactions, especially those involving a mortgage, are other elements which, as suggested before, serve to protect the interests of all concerned parties, but which unnecessarily protract the underwriting process. These generally include at least the following: a processing procedure and fee to originate the loan application, a title search to discover any encumbrances on the property such as liens, overdue taxes, etc., a credit check on the borrower of record to determine the credit-worthiness of the individual, a verification of employment which speaks to the individual's ability to repay the loan, a property survey, where such is dictated by local laws, an appraisal to determine if the property value secures the lender's investment, application for various insurances such as flood, earthquake, or other insurance as local law and custom requires, the loan application itself, and other such applications, searches, and discoveries, as local laws dictate. In addition to the aforementioned, an income to debt ratio is established to help select the most appropriate loan program (s) consistent with the lender's policy and the borrower's requirements.

Of equal importance in the process is the distribution of service fees and commissions associated with real estate mortgage transactions. The timeliness and accuracy of transactions can adversely affect the payment of various agents or workers involved in the process. Furthermore, because of the almost casual connection between the parties to the transaction, coupled with heretofore rigid definitions of each worker's responsibility, creative solutions to the aforementioned problems were not forthcoming, and little could be done to remedy these problems. Personal intervention on the part of agents or other workers could help, but weren't part of the scope of the transaction, were unreliable, and were differentially applied, often in consideration of such elements as the wealth or prestige of the borrower, the value of the property, personal friendships, or other less tangible factors.

Many of the agents or workers participating in the transaction bear a limited portion of the responsibility for the transaction. Employment verification, title searches, and the like, are often of fixed duration and required effort with mortgages falling within a broad value range. As such, these workers enjoy a steady, regulated income flow. It falls however, to the real estate agent to invest time on an open-ended basis to accomplish a sale. In this instance, the commission is often fixed by industry convention or statute, and the Real estate sales professional typically doesn't enjoy the benefit of serving as both listing and buying agent, which might net a full commission. More typically, the agent must make a 50/50 split with another agent or agency. Adding injury to this significant commission reduction is the typical requirement that the remaining commission balance be split, usually 60/40, with the Real estate sales professional's parent agency. It is common for a Real estate sales professional, having invested many hours over a period or weeks or months, to realize a modest 1–2% of the selling price of the property. Given this scenario, it is expected that a Real estate sales professional will focus on opportunities which will bear fruit faster, and leave the longer-term prospects alone, even though they have a similar reward and are of equal value in the eyes of the respective buyers and sellers.

The current state of the art simply does not provide a means whereby the real estate sales professional, or any other agent or worker, may participate in the other portions of the monetary flow, beyond that which is historically common to their respective industries.

While there are a number of developing systems, as mentioned above, for automated lender selection and loan tracking, it is clear that a need exists for an automated system based upon a database of federal, state and local rules and regulations, which can be used to identify, for a given loan transaction, the set of tasks required to process and complete the loan transaction, including tasks required by applicably federal or state law, and to track the set of tasks during the process itself to reasonably assure that compliance with these rules and regulations can be reported, or alternatively, that compliance task completion may be traced to the entity reporting completion. There is a further need to automatically attach the regulatory compliance information with a task management system required to process loans and to provide methods for integrating the Compliance Engine technology with any third party loan processing software.

SUMMARY OF THE INVENTION

The present invention provides a solution to the needs described above through a system and method for automatically generating a set of required tasks for use in managing the mortgage loan process by use of a compliance engine, including tasks required by applicably federal or state law. The automated system of the present invention automatically attaches the regulatory compliance information and a task management system required to process loans and provides methods for integrating the Automate Compliance Engine technology with any third party's loan processing software.

The automated system of the present invention uses the Federal, State, local and professional regulations and requirements and implementing instructions to generate a plurality of tasks which can be used to control and drive the process of handling a mortgage loan application to completion and settlement in accordance with these regulations. Mortgage loan requesters may specify that the system will generate the plurality of required tasks, including tasks required by applicably federal or state law, provide the plurality of required tasks to the requestor for his execution, including tasks required by applicably federal or state law, and monitor the completion of all required tasks so as to provide a completion certificate to the requester. Alternatively, mortgage loan requesters may specify that the automated system will generate the plurality of required tasks, including tasks required by applicably federal or state law, will manage and control the execution of the required tasks, and monitor the completion of all required tasks so as to provide a completion certificate to the requester.

The invention allows loan originators to enter loan applications and comprises a platform to allow other entities to underwrite the loan (that is, this invention is not a loan approval system, but can use any lender's loan approval system) but which provides the means to control and drive the mortgage transaction to closing by means of a compliance system which contains a rules engine built around the required Federal and State regulations and which tracks and records every step in the process to provide a record of completion for Federal and State regulators. The invention was designed to provide mechanisms for use to assure that loan originators meet and exceed federal, state, local and professional laws governing the relations between real estate sales and mortgage lending activities.

A computer implemented method is disclosed for facilitating processing of a mortgage loan application wherein the system receives a request to process a mortgage loan; generates a plurality of tasks, the tasks comprising actions required to process the mortgage loan, and including tasks required by applicable federal and/or state law; and distributes one or more of the required tasks to one or more systems capable of performing one or more of the tasks. The method further provides an act of monitoring the completion of the plurality of tasks whereby a report of completion of all required tasks can be generated.

A compliance engine is disclosed for automated processing of mortgage loans which has a computer system with communications devices for receiving a request to process a mortgage loan; the computer system having logic devices programmed to generate a plurality of tasks required to process the loan, wherein the tasks are made up of actions which are required for a specific mortgage loan by various legal rules and regulations; and wherein the computer system has logic devices programmed to distribute the plurality of tasks to various systems who can carry out the tasks.

Also disclosed is a server node in a network which is responsive to a request to process a loan by generating a plurality of tasks which are required to process the requested loan, including tasks required by applicably federal or state law, and for distributing the plurality of tasks to persons who are qualified to perform the tasks. Also disclosed are mechanisms in the server node for monitoring the completion of the plurality of tasks related to a given loan and for generating reports and completion certificates associated with the actions related to the given loan.

Also, a computer program stored on a computer readable medium or carrier wave is disclosed having computer code mechanisms for receiving a loan request; for generating a plurality of tasks required to process the loan, including tasks required by applicably federal or state law, and distributing the plurality of tasks to persons capable of performing those tasks. Additional code mechanisms are disclosed which monitor the completion of the plurality of tasks and when all tasks are completed can issue various reports and completion certificates.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

DESCRIPTION OF THE DRAWINGS

The features and advantages of the system and method of the present invention will be apparent from the following description in which:

FIGS. 7–30 illustrate exemplary screenshots for the system embodying the present invention.

FIGS. 37–41 depict additional screen shots of the system embodying the invention, showing an exemplary set of tasks required to complete a loan.

DETAILED DESCRIPTION

Figure 1:
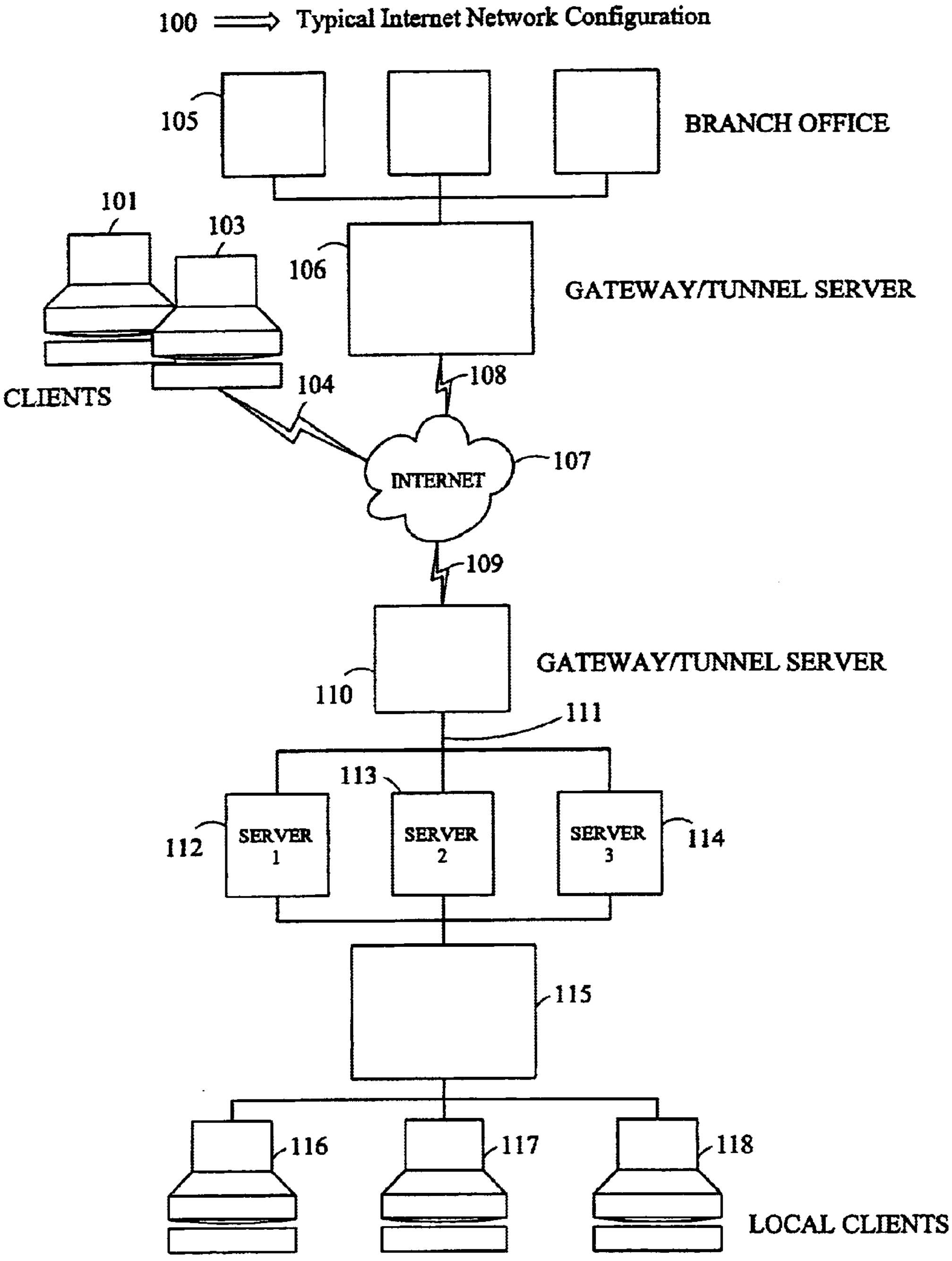
FIG. 1 illustrates a typical configuration of Internet connected systems representative of the preferred embodiment of the present invention.

The present invention provides a solution to the needs described above through a system and method for managing the mortgage loan process. The automated system of the present invention uses the Federal, State, local and professional regulations and requirements and implementing instructions to identify the set of tasks required to process a specific loan application, including tasks required by applicable federal and state law, to use, or provide this set of tasks to a lender to use, to drive the process of handling the specific mortgage loan application, and to monitor and report the completion of the specified tasks as required by these regulations, or alternatively, that the required task completion may be traced to the completing entity.

The heart of various embodiments of the present invention is a module designated an Automated Compliance Engine (the "Compliance Engine") which is designed to maintain and use a rules-based loan compliance database to generate the set of tasks required to be performed to complete and close a specific mortgage loan transaction. This Compliance Engine is described in more detail below. However, we now describe a general overview of a preferred embodiment of the invention.

(1) General Overview

All mortgage loans will be originated through the applicants (OnePipeline.com) website. In the future, websites other than OnePipeline.com's will be used to originate loans that will interface with the compliance engine. The technology used as part of the system currently is, and will be, able to interface with many other industry standard software programs to make the exchange and flow of data easy and accurate.

The system is predominantly web-enabled, which extends its use to all industry professionals connected to the Internet. The system contains the Compliance Engine that applies Federal, State, Local, and profession based filters to each loan application and each Loan Originator to create a combined task list that defines a custom workflow process for every transaction originated through the System and Program, which forms the basis for monitoring the steps and procedures required for a specific loan transaction in order to provide a completion report for the specific mortgage loan. The rules applied to each new mortgage loan application will determine who is permitted or required to perform which services in the loan origination process under the Program and who will receive fair market compensation for services actually performed. The System then creates a record of the actual workflow. The list, as a composite of compensation or origination tasks and required tasks, is represented as a 'task list', and may optionally be presented to a subscriber client through an API.

(2) Detailed Description

In an embodiment of the System, the Borrower and Loan Originator work together throughout the loan origination process. Once a Borrower decides to work with a Loan Originator on the System, the System will have the Borrower and Loan Originator answer typical financial and property questions concerning the Borrower. The answers to these questions will allow the System to pre-qualify the Borrower for a loan and offer appropriate loan program options to the Borrower. Once the System makes this information available to the Borrower and Loan Originator, the Borrower will be able to choose to make a formal mortgage loan application on-line through the Loan Originator.

After a consultation between the Borrower and Loan Originator, the Borrower will then be able to select a loan program -or request the System to find the most advantageous interest rate available from the various lender options. The System and staff will select a loan product and submit the application to the appropriate lender for approval and distribute on-line results back to the Borrower and Loan Originator, together with a complete set of underwriting conditions.

An exemplary sequence of events is as follows:

The Loan Originator consults with the borrower about the property and loan products generally available, After entering the required data, including a self-declared credit profile, the application is programmatically compared to available products, typicallying using a service and program of the type provided by GHR's PremierPricer™ software, If a list of suitable products is returned by a GHR-like system, the Loan Originator assists the Borrower in selecting the preferred loan product, The Application is then re-submitted to the GHR-like product selection system and the credit rating of the Borrower is programmatically obtained, With the 'official' credit rating available, the GHR-like system returns a list of one or more loan products, If the desired loan product is on the list, then the application process proceeds to underwriting, If the desired product is not available, but there are other loan products, then the Loan Originator and the Borrower will select and apply for another suitable loan product, If no loan products are available, then the system returns an appropriate notification, and the loan application is forwarded to the lender, with the initial desired loan product, for human review, adjustment, and probable selection of a suitable loan product for underwriting.

Making either selection will notify the System of the Borrower's intent to proceed with the mortgage loan origination process and will initiate the rules evaluation process, coincident with underwriting of the loan, as described in the next paragraph.

The System's Compliance Engine will apply a set of rules appropriate to each mortgage loan transaction, including property and borrower profile, originator's professional guidelines, state and federal regulations and other relevant rules. The final filtered task list will then apply to each mortgage loan transaction in an attempt to assure that the mortgage loan is originated in accordance with applicable federal and state laws. This will include, making sure that qualified Loan Originators, Independent Contractors and Local Loan Processors are permitted to perform services associated with the loan origination process and that all services required to be performed in order for the Loan Originator, Independent Contractor and/or Local Loan Processor to receive compensation in connection with the mortgage loan transaction are actually performed.

Based on the mortgage loan origination process requirements defined by the Compliance Engine, the Loan Originator will make decisions about each of the service providers (e.g., inspection companies, surveyors, appraisers, title companies, etc.) the Loan Originator wishes to have involved in the mortgage loan transaction. Any qualified service provider will be able to be selected by the Loan Originator and entered into the System at this point. Some nationwide service providers may, in the future, have a direct online ordering system available inside the System. Others may still require the typing in of the name and contact information. OnePipeline.com, Inc. expects that it will be most common for Borrowers to select local service providers with whom they are familiar.

After the Borrower selects the service providers, the Loan Processor will confirm to the system which services have been provided by the Loan Originator. As described in more detail below, the services actually performed by the Loan Originator, Independent Contractor and/or Local Loan Processors will serve as the basis for the fees earned as fair market compensation for performing settlement services in connection with the mortgage loan origination process under the Program.

After each of the above steps are completed, the System will automatically create a workflow process based on the applicable rules and appropriate tasks will be eventually assigned to each of the service providers for the mortgage loan transaction. In a preferred embodiment, the mortgage loan data and applicable tasks will be passed to a workflow generation system, either implemented as an integral part of the system of the invention, or as a service provided by a remote application service provider (ASP), which will generate an automated workflow process which can notify each service provider of his task(s) and allowing each service provider to interact in completing needed tasks. All task assignments will be distributed by the System and tracked. At this point, many people will be working on the loan simultaneously though the System. For example, the Loan Originator may be obtaining financial information from the Borrower, the Independent Contractor may be ordering an appraisal, the Local Loan Processor may be verifying Borrower information, and various service providers may be performing services and adding information to the mortgage loan file through the System. Hard copy data will be input by either OnePipeline's staff, an Independent Contractor (to the extent permitted under state law) or the Local Loan Processor, and added to the physical mortgage loan file. Work notices and status communications may be generated automatically by the System to keep the process moving and to ensure that all appropriate parties perform their assigned tasks in the proper order to meet all rules requirements applicable to the mortgage loan transaction.

c. Products Available

Borrowers may obtain a loan using the facilities of the lender organization, in which mode the system of the invention merely determines which tasks are required and tracks the completion of the required tasks. By obtaining a loan through the Program, Borrowers will be given access to a wide variety of first lien, fixed and variable rate, closed-end mortgage products (both purchase money and refinancings) at competitive rates and pricing, and in a timely and efficient manner. For example, as noted above, OnePipeline.com, Inc. will make available to the Borrower, loan products and interest rates that are available from its participating lenders. OnePipeline's System and Program also will make available and support secondary lien, fixed and variable rate, closed-end loan products and interest rates available from its participating lenders. In the future, OnePipeline may give Borrowers access to first and second lien, fixed and variable rate, open-end mortgage products through the Program. OnePipeline's Program and System will not make available or support mortgage loans that constitute "High Cost" or Section 32 mortgage loans, which are covered by Section 32 of Regulation Z, 12 C.F.R § 226.3.

d. Funding Source

In a preferred embodiment, OnePipeline.com, Inc. will not fund any mortgage loans, and no mortgage loans will be closed in OnePipeline's name. OnePipeline will be acting exclusively in the capacity as mortgage broker. All mortgage loans will be funded by, and closed in the name of a participating lender. In an alternative embodiment, OnePipeline could fund certain mortgage loans and close loans in their name in those jurisdictions where qualified to do so.

e. Disclosures and Form Documents

In a preferred embodiment, the System will produce applicable Borrower disclosures (on a state specific basis) required under applicable law to be provided to the Borrower in connection with the mortgage loan origination process under the Program. The Loan Originator will be required to provide the disclosures to Borrowers at the appropriate times. Moreover, the Loan Originators will be required to provide the Borrower with a disclosure that informs the Borrower that the Loan Originator will receive compensation for services actually performed by the Loan Originator in connection with the mortgage loan transaction. This disclosure also will inform the Borrower that the Loan Originator is an exclusive part-time W-2 employee of OnePipeline, and that the Borrower is free to use another mortgage broker or lender other than OnePipeline.

The System also will allow a lender to elect to use a standard set of mortgage loan documents, which can be printed off of the System, in connection with a mortgage loan originated through OnePipeline's Program, or the Lender may use its own forms. The forms available off of the System will be provided to OnePipeline by a third-party document vendor.

f. Mortgage Loan Fees

Fees will generally include, among other permissible fees: (1) origination fee payable to the lender and passed through to the Loan Originator based on services performed; (2) underwriting fee payable to the lender and passed through to Local Loan Processor; (3) impound waiver fee payable to the lender and passed through to secondary market investor (only on loans without escrow accounts); (4) processing fee payable to the lender and passed through to Local Loan Processor; (5) document preparation fee payable to the lender and passed through to third-party vendor; (6) tax related service fee payable to the lender and passed through to third-party vendor; and (7) attorney fee payable to lender and passed through to closing attorney. OnePipeline.com, Inc. will charge a lender a membership fee to participate in OnePipeline's Program and a flat fee for each Completion Certificate issued to the lender.

g. Loan Originators

In a preferred embodiment, mortgage loans will be originated through the System and Program by licensed real estate sales professionals, such as real estate agents/salespersons and, in limited cases, real estate brokers. The individual real estate agents and individual real estate brokers (i.e., brokers that are not corporations or similar business entities) will enter into an employment agreement with OnePipeline, and become part-time W-2 employees of OnePipeline.com. The employment agreements will expressly require the Loan Originator to originate mortgage loans exclusively for OnePipeline.com, and prohibit the Loan Originators from receiving compensation for performing loan origination services for another mortgage lender or mortgage broker.

In the future, other non-traditional originators, such as investment advisors, financial advisors, accountants and other professionals may be added to the Program as Loan Originators, in each case to the extent permitted by applicable law. Loan Originators may also have an affiliation with a mortgage lender, which defines the selection of loan products the Loan Originator may offer.

i. Local Loan Processors

In a preferred embodiment, wherein the loan is being processed through the system of the invention, loan processing functions which would trigger mortgage broker or similar licensing requirements under applicable state law will be delegated to properly licensed Local Loan Processors who will receive compensation intended to be fair compensation for services actually rendered by them. The Local Loan Processors will be either mortgage brokers and mortgage bankers.

j. Services Performed

As noted above, in a preferred embodiment, a Loan Originator will initiate the mortgage loan process with a borrower using OnePipeline's System. The services that a Loan Originator will have to perform, in all cases, in order to be fully compensated include the following: (1) obtaining the applicant's signature on disclosures, (2) obtaining the applicant's signature on the credit authorization, (3) pre-qualifying applicants, (4) assisting applicants in selecting loan products, (5) taking the loan application or obtaining loan application information, (6) reviewing the credit decision with the applicant, (7) explaining the good faith estimate and other disclosures to the applicant, (8) collecting documentation from the applicant that is needed in connection with processing and underwriting the loans, (9) updating the applicant and responding to applicant inquiries, (10) locking the interest rate, and (11) scheduling and attending the closing.

If a Loan Originator does not perform all required services, the services will be performed by OnePipeline's staff, Lender's staff, an Independent Contractor (to the extent permitted under applicable state law) or by a Local Loan Processor, and the compensation received by the Loan Originator will be reduced accordingly.

By way of additional background, the basic of the rules and regulations which form the heart of the present invention are now described in more detail.

RESPA Compliance

The following is a brief summary of RESPA and its implementing regulation, Regulation X, and their requirements. It is not intended to be comprehensive. For example, RESPA and Regulation X may not apply in all situations, and their application is not discussed below. Users should consult RESPA, Regulation X and independent legal counsel for complete explanation of RESPA, Regulation X and their requirements.

The Real Estate Settlement Procedures Act ("RESPA") is a federal statute that was enacted by Congress in 1974. A federal regulation implementing RESPA ("Regulation X") also has been promulgated by the United States Department of Housing and Urban Development ("HUD"). HUD is the federal agency charged with administering and enforcing RESPA, Regulation X and their requirements.

RESPA was enacted to provide Borrowers with greater and more timely information on the nature and costs of the home buying/settlement process, and to protect Borrowers from unnecessarily high settlement charges caused by certain practices believed to be abusive. Among other requirements, RESPA and Regulation X prohibit the payment or receipt of "any fee, kickback or thing of value" (i.e., a referral fee) in exchange for the referral of settlement service business. Settlement service business includes, among other services, loan origination services such as taking applications, obtaining income verifications and communicating with a borrower or lender.

RESPA and Regulation X permit a lender to make reasonable payments to its agents and contractors for services actually performed in the origination, processing or funding of a loan. Based on interpretations of this provision in RESPA and Regulation X, real estate sales professionals and others may, in certain circumstances, provide loan origination services and receive fair market compensation for the services they actually perform.

The preferred embodiment of the invention in OnePipeline.com's program and system are designed around this provision. Applicant's loan originators are required to perform certain settlement services in connection with loans originated by OnePipeline.com, and the compensation received by these loan originators and regional loan processors is intended to be fair market compensation for the services they actually perform.

Other Federal and State Compliance

The following is a brief summary of other federal and state statutes, regulations and laws that impact OnePipeline.com's system and program, and a user's performance of services under this system and program. It is not intended to be comprehensive. Users should consult the statutes, regulations and laws, and independent legal counsel, for a complete explanation of other applicable federal and state statutes, regulations and laws.

Among other federal laws, the Truth in Lending Act ("TILA") and the Equal Credit Opportunity Act ("ECOA") impact OnePipeline.com's program and system, and the user's performance of services under applicant's system and program. The TILA, and its implementing regulation, Regulation Z, were enacted and promulgated to assure meaningful disclosure of credit terms so that the Borrower will be able to compare more readily the various terms available to the Borrower. Under the TILA, certain disclosures are required to be made to the Borrower prior to the consummation of a mortgage loan transaction.

The ECOA, and its implementing regulation, Regulation B, were enacted and promulgated to require that lenders engaged in the extension of credit make that credit equally available to all creditworthy Borrowers without regard to race, color, religion, national origin, sex, marital status, age, receipt of public assistance or the fact that the Borrower in good faith exercised any right under the Federal Consumer Credit Protection Act. In addition to the prohibition against discrimination, the ECOA and Regulation B also contain, among others, requirements regarding the provision of appraisal reports, evaluation of applications, spousal signatures, and the provision of adverse action notices.

Regarding state laws, most jurisdictions have enacted licensing statutes that may require real estate sales professionals, builders, financial institutions/lenders and mortgage brokers to obtain a license and satisfy various other financial, educational and operational requirements. Most jurisdictions also have enacted laws that impose, among others, requirements regarding the types of fees that may be charged to a Borrower in connection with a mortgage loan transaction and the persons entitled to receive such fees, as well as certain jurisdiction-specific disclosures that must be provided to the Borrower.

OPERATING ENVIRONMENT

The environment in which the present invention is used encompasses the use of general purpose computers as client or input machines for use by loan originators, lenders and other parties interested in the mortgage loan process. Such client or input machines may be coupled to the Internet (sometimes referred to as the "Web") through telecommunications channels which may include wireless devices and systems as well.

Some of the elements of a typical Internet network configuration are shown in FIG. 1, wherein a number of client machines 105 possibly in a branch office of an Real Estate Service, or financial institution, lender, etc., are shown connected to a Gateway/hub/tunnel-server/etc. 106 which is itself connected to the internet 107 via some internet service provider (ISP) connection 108. Also shown are other possible clients 101, 103 possibly used by other loan originators, or interested parties, similarly connected to the internet 107 via an ISP connection 104, with these units communicating to possibly a home office via an ISP connection 109 to a gateway/tunnel-server 110 which is connected 111 to various enterprise application servers 112, 113, 114 which could be connected through another hub/router 115 to various local clients 116, 117, 118. Any of these servers 112, 113, 114 could function as a server of the present invention, as more fully described below. Any user situated at any of these client machines would normally have to be an authorized user of the system as described more fully below.

Figure 2:
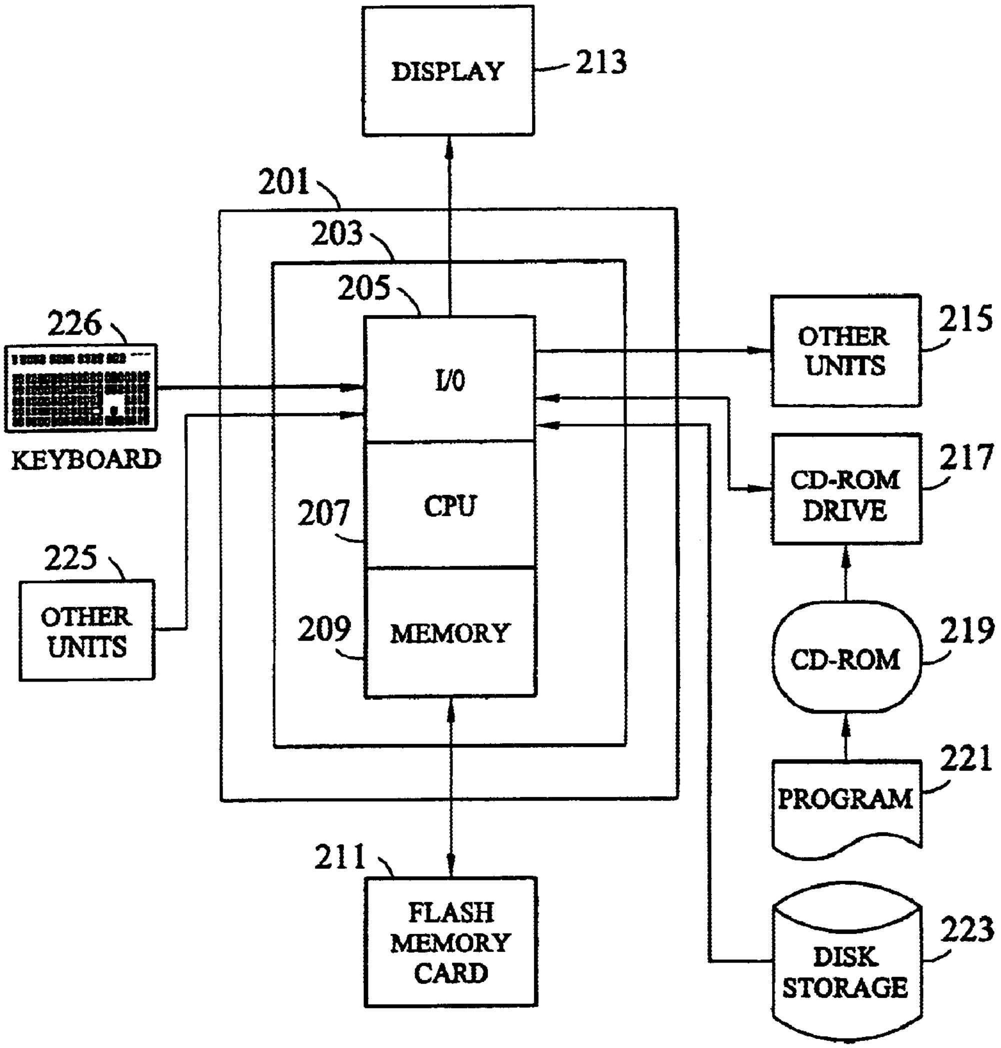
FIG. 2 illustrates a typical general purpose computer system of the type representative of the preferred embodiment.

An embodiment of the Mortgage Loan Management System of the present invention can operate on a general purpose computer unit which typically includes generally the elements shown in FIG. 2. The general purpose system 201 includes a motherboard 203 having thereon an input/output ("I/O") section 205, one or more central processing units ("CPU") 207, and a memory section 209 which may or may not have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

DETAILED DESCRIPTION OF THE INVENTION

In consideration of it's major aspects, the present invention is a system and methodology, comprising a 'container' concept, wherein the mechanics of real estate transactions beginning with loan origination and proceeding serially and in some instances in parallel through the closing, funding and disbursement and reporting of funds may be accomplished. The system also controls the timing of the process and the time allocated to the completion of each loan occurrence. When the time allocated to a process expires, the task is transferred as required by the rule base. The system, constituting the present invention, is designed to programmatically manage and document all attendant processes with compliance to applicable regulatory rule sets and requirements of participating workers. In a preferred embodiment, data exists within the executing programs as 'objects', the meaning of which as commonly understood by those skilled in the art of 'object-oriented programming'. In a preferred embodiment, the software programs comprising a portion of the present invention are also object-oriented. An integrated relational database management system is utilized to maintain persistent data and to permit and facilitate queries and reports against the persistent data. While the embodiment of the present invention embraces certain elements of a 'closed loop', or self-contained decision-making process, it's strength lies in the ability to orchestrate the workers or agents participating in the lending transaction with respect to responsibilities and financial compensation.

The system of the invention encompasses a means whereby the object-oriented 'instances' or discrete occurrences of data, may be stored and retrieved from the relational database management system. In the preferred embodiment, such storage and retrieval is accompanied by programmatic conversion of said data instances to 'formats', or preferred representations upon which the required program(s) may act. Such data storage occurrences and the accompanying manipulations of said data follow preferred programmatic documentation procedures such as sequentially 'nested' descriptors. An example of a sequentially 'nested' descriptor would be, 'borrower.occupation', where the nested descriptors are separated by a '.' or 'dot', and in such manner are understood to mean, 'the identified borrower's occupation'. Such 'dot' notation will hereafter be used to describe the higher level of programmatic functionality when such explanation is necessary. Those skilled in the art will understand JAVA™ programming, Object oriented Programming, and the use of automated "Agents" to perform programmed tasks whenever activated to do so, HTTP, XML and other communications protocols as described in more detail below.

An exemplary way to articulate the concept and embodiment of the present invention is the idea of a 'container', which brings together the loan originator, the subject real property attributes, and the lender, as well as means to validate transaction profitability and bundle said transactions for sale to lenders. Or in an alternative view, as a means for generating the required compliance tasks for a specific loan transaction, provide the tasks to a lender and monitor the completion of all required tasks by the lender's service providers. The present invention provides decision points wherein the loan originator makes selections from menu(s) generated by the compliance engine acting upon the original information supplied by the originator. The selection process introduces the refined data into an integrated 'workflow' process wherein rule-based engines and other workers or agents act toward a common goal of closing, finding, shipping, and collecting transaction fees on a loan.

Figure 3:
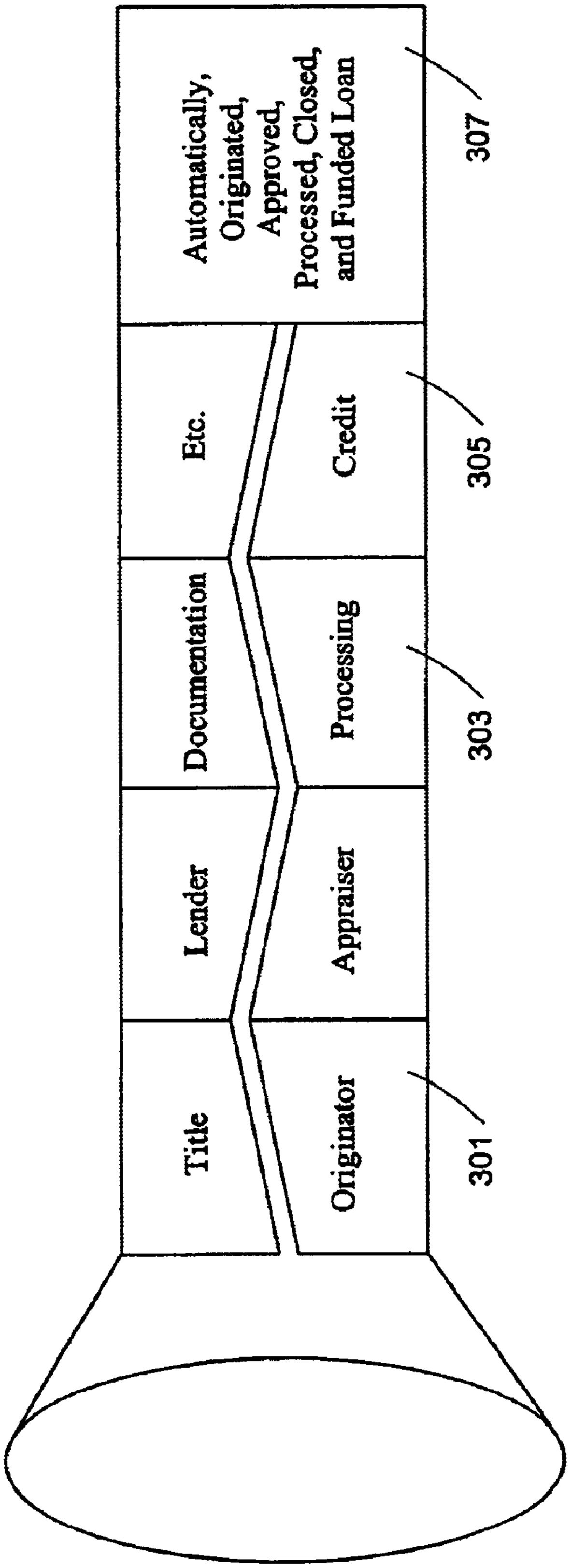
FIG. 3 illustrates the business model which encompasses the present invention.

Referring to FIG. 3 there is illustrated, in schematic form, a preferred embodiment of the present invention. The business model is comprised of several functional elements, including at the highest level, embodiments which effect loan origination 301, closing, processing 303, funding 305, and shipping 307, with transfer of funds. In concert, these elements may be referred to as the 'pipeline' or system which embodies the whole of the several elements comprising the present invention.

As indicated above, the present invention is a method and apparatus for automating the process of generating a set of tasks required for controlling, and regulating a mortgage loan application, underwriting the loan, and tracking the tasks through the closing process, wherein the tasks comply with all known Federal, State and local requirements for the specific loan. Elements of an alternative embodiment include loan origination, authenticating the loan originator, underwriting the loan, closing, processing, finding, and shipping, with transfer of funds, within the regulatory legal framework of funding and reporting, required for these processes. In a preferred embodiment, which is described in detail below, some or most of these functions may be performed by the lender or application service providers (ASPs) with the system of the invention providing the set of required tasks generated by a Compliance Engine and simply monitoring the completion of those tasks.

Referring now to FIGS. 4A, 4B, 4C and 4D, the principal elements of a preferred embodiment of the present invention are illustrated in more functional detail. Original inputs from a lender/loan originator come into the system 401 through the 'Loan Origination Gateway' (451 in FIG. 4C) or portal, which serves as an 'entry point' or gateway to the 'pipeline' or system for loan originator data and borrower data. The loan originator data 403 is used as input data to an authentication module (453 in FIG. 4C) to verify the lender/loan originator's ID and password. Those skilled in these arts will recognize that this authentication process for the client/user may include digital signature authentication as well as other types of cryptographic verification and authentication of users. If the lender/loan originator's ID and or password do not authenticate, a message is sent back to the originator indicating that fact and the system exits. If the loan originator is found to be qualified, the loan originator data and borrower data are passed to the Compliance Engine 405 (476 in FIG. 4D) for later use. The borrower-supplied credit data is then passed to a Loan Origination & Program Matching module 407 (456 in FIG. 4C). The Loan Origination & Program Matching module returns a list of loan products for which the borrower is qualified 409. In a preferred embodiment, this function is provided by a PremierPricer™ program supplied by GHR Systems™ Inc. The PremierPricer™ Component is described in more detail at the GHR Systems web site, which can be found at www.ghrsystems.com, which description is hereby incorporated fully herein by reference. Additional detail on the interface to this PremierPricer™ Component is provided below. In an alternative embodiment, the Loan Origination & Program Matching module is one which is supplied by applicants as an integral part of the pipeline system, wherein up-to-the-minute product and pricing information is provided when the module is supplied with basic transaction parameters (i.e., LTV, loan amount, property location, property type, etc.).

Figure 4A:
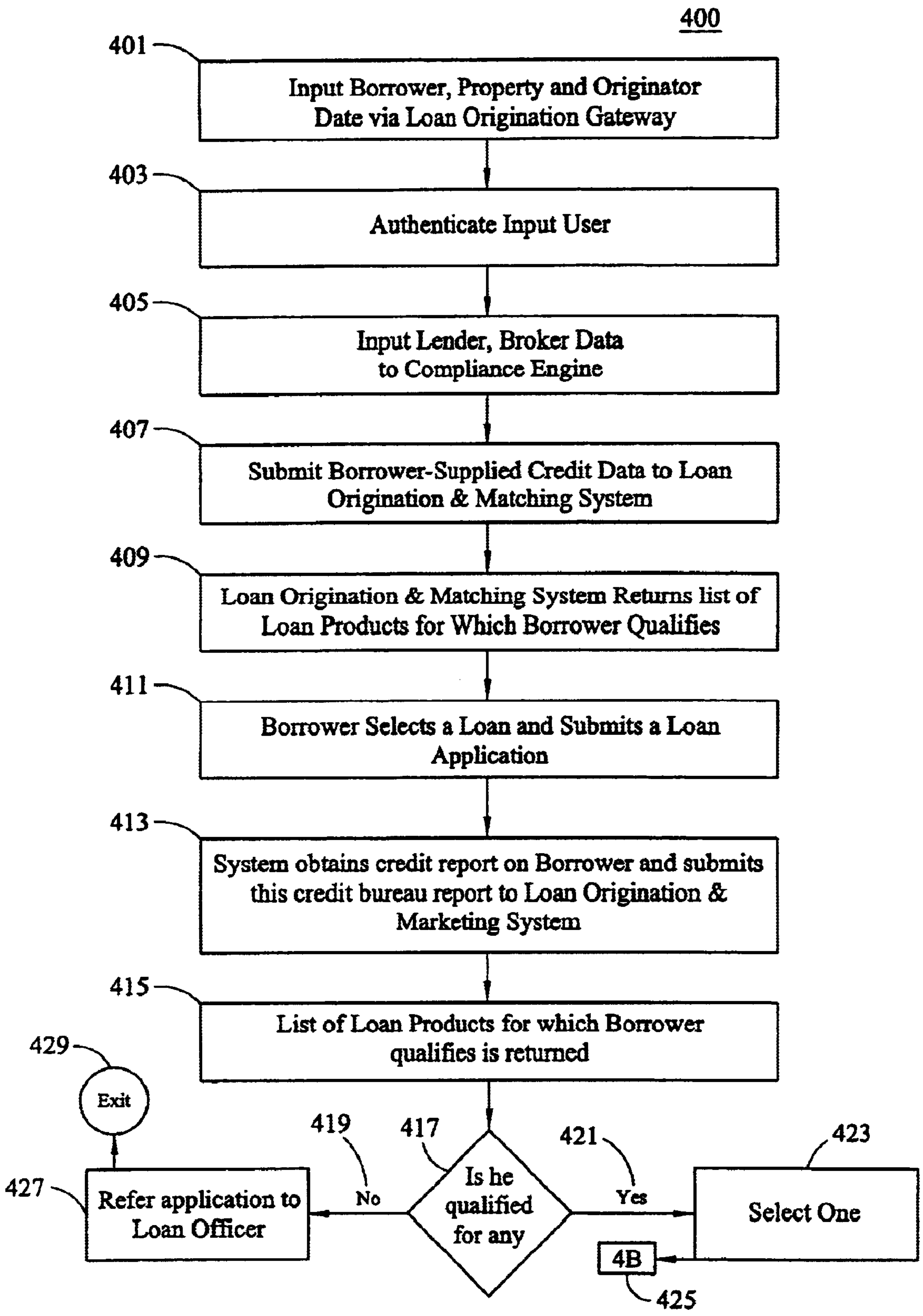
FIGS. 4A & 4B illustrate a functional flow chart of a preferred embodiment of the system.
Figure 4B:
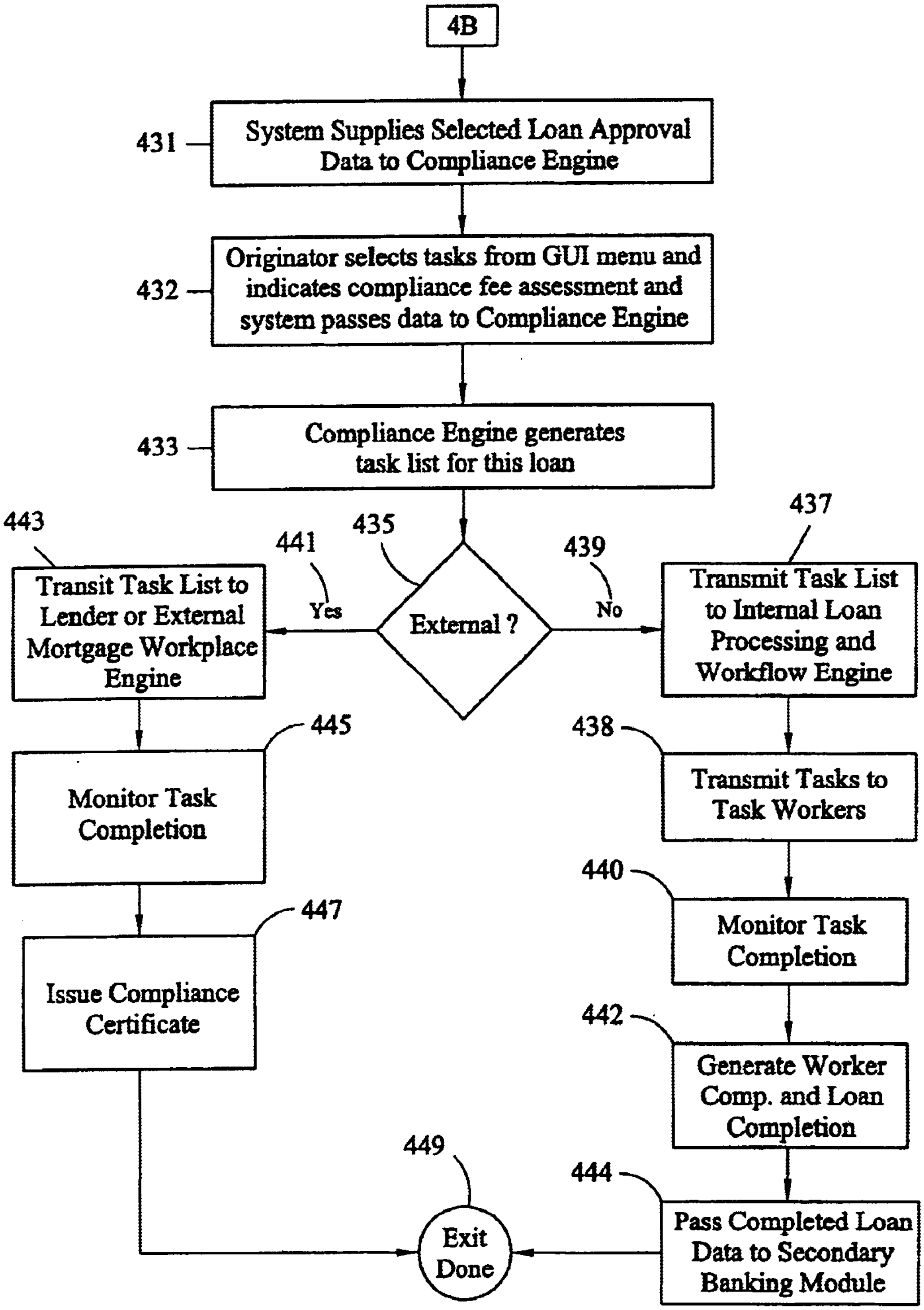

Continuing with reference to FIG. 4A, borrower then selects a loan from the list of loan products for which the borrower is qualified and submits a loan application 411. In a preferred embodiment, the system, recognizing the loan application selection, submits a credit report request to a credit bureau 413 and passes this data to the GHR Systems PremierPricer™ Component 413. A list of loan products for which the borrower is qualified are returned to the lender & borrower 415. If the borrower is not qualified for any loans, 419 the loan request is referred to a loan officer and the system exits 429. If the borrower is qualified, he selects one of the listed loans (his original selection may or may not be on this list) 421, 423. Referring now to FIG. 4B the lender uses this data to process the loan and inputs loan approval data to the system 431.

Figure 4C:
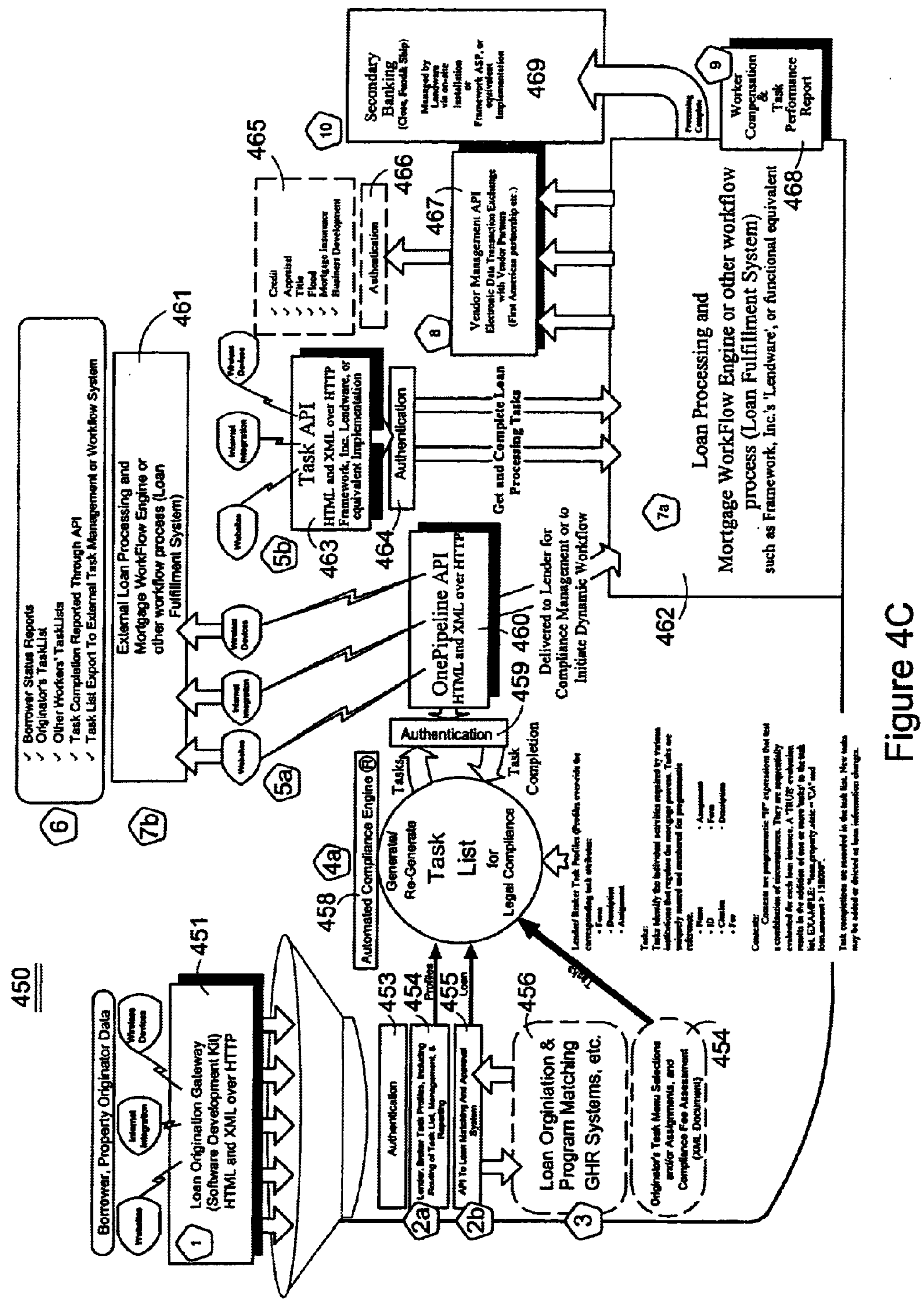
FIG. 4C illustrates a configuration of an embodiment of the system which contains the invention.
Figure 4D:
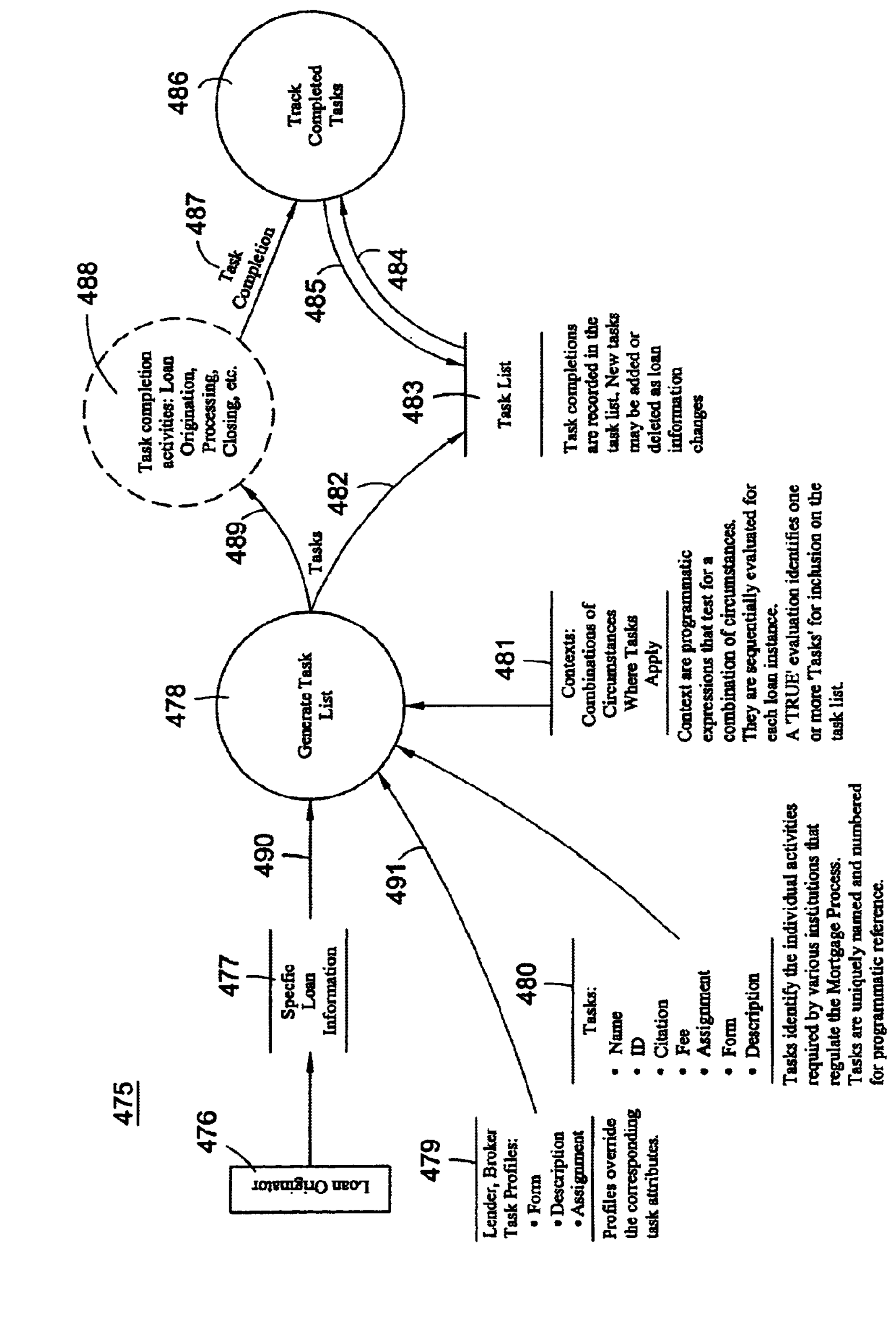
FIG. 4D illustrates exemplary functions of the Compliance Engine.

The loan data is passed to the Compliance Engine 431 (477 in FIG. 4D). As part of this set of input data the user/lender selects optional tasks for this loan and inputs his selections along with data indicative of his fee arrangement with the borrower 432. Referring now to FIG. 4D, this data is passed by the system to the Compliance Engine 479 and the Compliance Engine uses these data (the, loan data 477 and the user task selections 479) to generate a required set of tasks for this specific loan (433 in FIG. 4B). This required set of tasks is generated 478 by selecting the tasks from the task file 480 which are specifically required by the particular loan (i.e. loan type, location, value, etc.) and the contexts 481 (i.e. the combinations of circumstances where the tasks apply). The resultant set of tasks for the specific loan 483 is separately recorded 482 in a file which can be modified as new tasks may be added or deleted, and as task completions are identified 485.

In a preferred embodiment, the system can supply this required task list in its entirety to the lender if the lender wishes to manage the task completions himself through his own automated systems (see 441, 443 in FIG. 4B). In this case, the system would merely monitor task completion data 445 (see also 485, 486, 487 and 488 in FIG. 4D) and if required, issue a Completion Certificate 447 when the tasks are completed and the loan process closed. If the user/lender wants OnePipeline to handle the loan, the Compliance Engine can transfer the set of tasks for this loan to an internal Loan Processing & Workflow engine 437. This internal Loan Processing & Workflow engine (Forte Conductor™, Framework Lendware™, etc) (see also 462, 463, 464, 466 and 467 in FIG. 4C) will automatically transmit specific tasks to specific workers who have been previously identified as responsible for those kind of tasks 438, will supply task completion data to the Compliance Engine 440 when tasks are completed. The Compliance Engine will supply the completion data to the system so as to generate worker compensation and loan completion reports (see 468 in FIG. 4C), and Completion Certificates 442. The final process module in the system, the Banking & Loan Management process (469 in FIG. 4C), adds the loan, if it was provided by OnePipeline, and its related financial parameters to the inventory of loans managed by applicants. In a preferred embodiment, this Banking & Loan Management process 469 includes a secondary banking engine which manages the packaging and placing of loans with secondary financial institutions so as to optimize the financial returns on the loans handled by applicants. This process would be managed by Lendware™ via an on-site installation or by a Framework™ application service provider (ASP) or equivalent implementation.

In an alternative embodiment, this secondary banking engine which manages the packaging and placing of loans with secondary financial institutions so as to optimize the financial returns on the loans handled by applicants would be a package developed internally by applicants.

Figure 5:
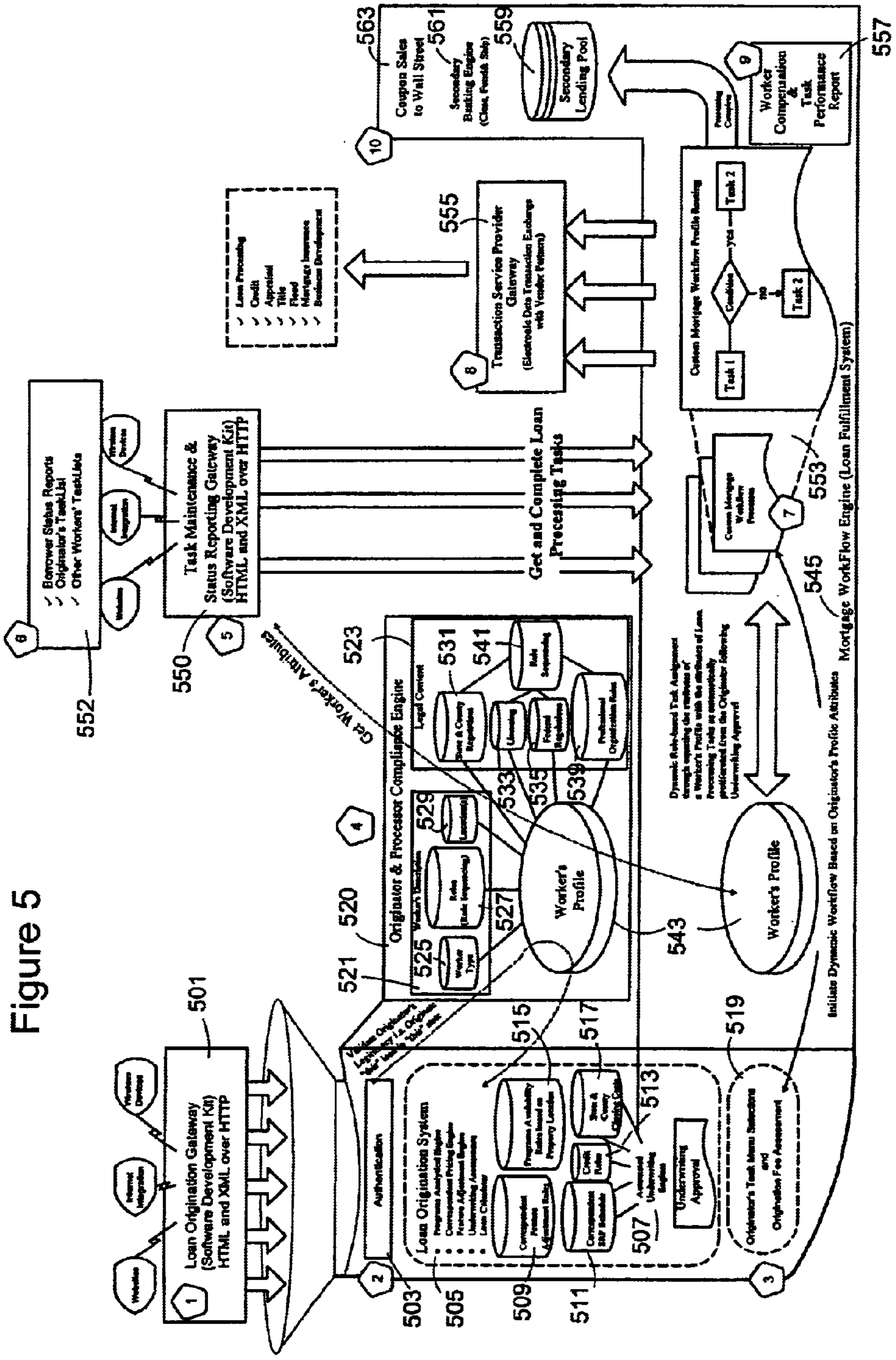
FIG. 5 illustrates a configuration of an alternative embodiment of the system which contains the invention.

A depiction of an alternative embodiment of the present invention is shown in FIG. 5 which describes the elements shown in FIGS. 4A, 4B and 4C in a different depiction. Each of these features is described in more detail below. The 'Loan Origination Gateway' 501 or portal, serves as an 'entry point' or gateway to the 'pipeline' or system. The loan originator enters data for both himself and for the borrower. This data is passed to the Authentication module 503 which uses these data as inputs to the Compliance Engine 520. The Compliance Engine 520 uses these data from its associated worker's description 521 and legal context 523 files to determine whether the loan originator can originate this loan for this property. If so, the Authentication module 503 "authenticates" the transaction and passes the information to the Loan Origination System 505 for analysis of corespondent pricing and for underwriter approval. As indicated above, this function could be performed by the system or through the interface to an equivalent service such as the PremierePricer™ product supplied by GHR Systems™ Inc. Then the loan originator is asked to indicate which tasks he will do (of the optional tasks available) 519. These optional task and fee data along with the original Loan Originator data and borrower data and underwriter data are then passed to the Compliance Engine 520 wherein the mandatory tasks identified based on the legal requirements for this loan originator and this location of the property, and the selected optional tasks are combined by the Compliance Engine 520 into a required set of tasks for this loan and passed as inputs to the Loan Fulfillment System 545. The Loan Fulfillment System 545 assembles the inputs and task requirements for input to the Mortgage Workflow Engine 553 which automatically manages the task execution by various responsible parties. In the process of managing the execution of the required tasks the Mortgage Workflow Engine 553 automatically communicates with parties having an interest in this loan via the Task Maintenance & Status Reporting Gateway 550 and communicates with various service providers via the Transaction Service Provider Gateway 555. When the loan is finally closed (i.e. all designated tasks completed) this status is communicated to the Compensation & Task Performance Report system 557 for the generation of these reports. The loan completion status is also communicated to the Secondary Banking & Loan Inventory Management system 563 which adds the completed loan data to the loan inventory and periodically, using a Secondary banking Engine 559, optimally packages certain loans for transfer to secondary finding sources.

Having described a preferred embodiment and an alternative embodiment of the applicants invention, we now describe the major components in more detail. FIGS. 7–11 indicate the basic original entry into the automated system and shows the kinds of data that is inputted. These data are then processed as follows.

The 'Loan Application Gateway'

Figure 33:
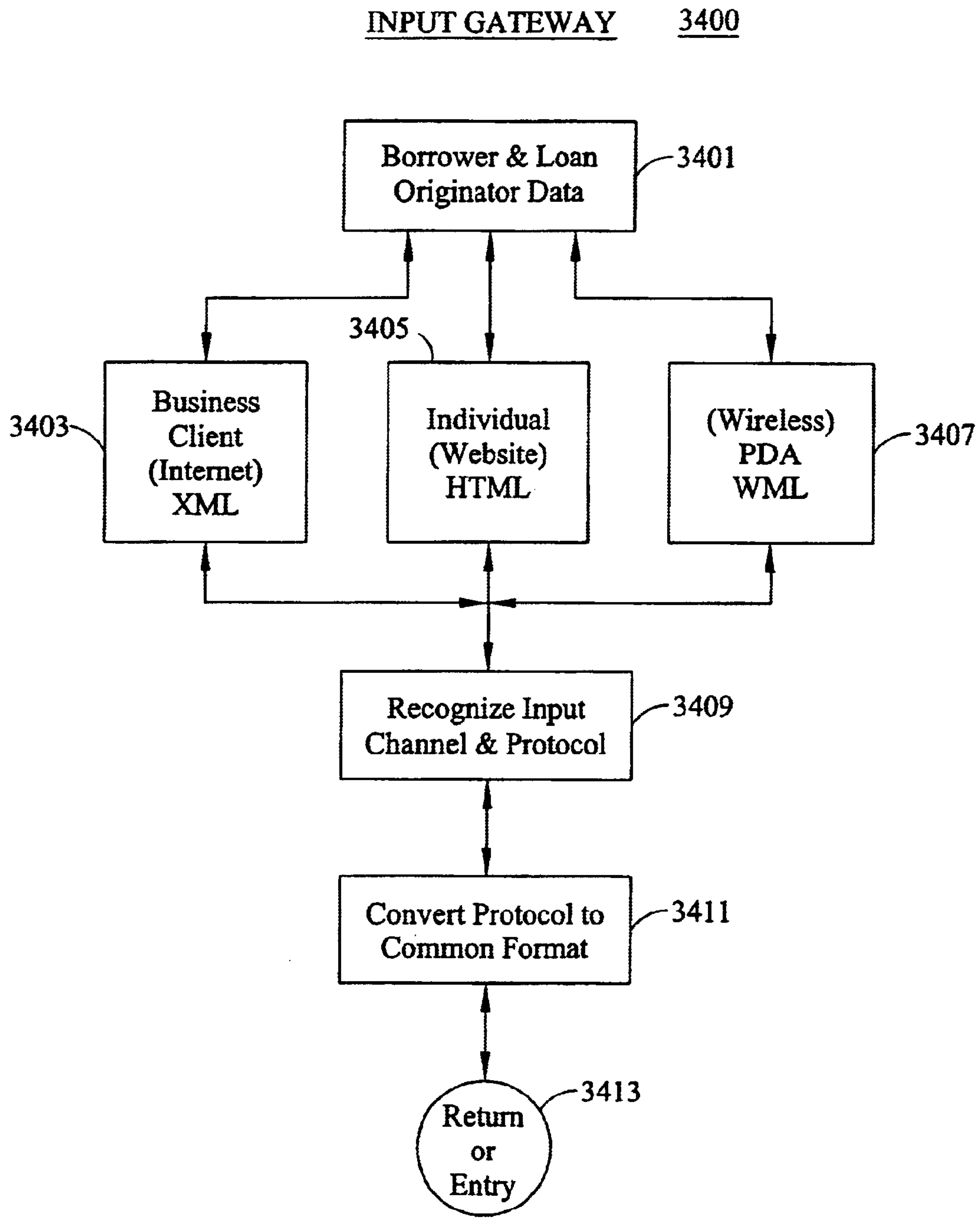
FIG. 33 illustrates an exemplary embodiment of the Input gateway module.

Referring to FIG. 33, A loan originator, in any of several manifestations, may originate a mortgage loan request on behalf of a client, a 'borrower'. The 'Loan Application Gateway' provides for the Lender/Loan Originator to enter his data and borrower data 3401 and envisions at a minimum, three (3) ways by which the system may be accessed by a loan originator; (1) via Internet website 3405 of the assignee of the present invention, the data typically being in HTML format; (2) via custom-written software 3403 which connects in a data transmission-enabled manner to the present invention and would typically be in XML format; and (3) via 'wireless' devices, including web-enabled cell phones, wireless, modem-equipped hand-held or laptop computing devices, satellite communication devices, and other such wireless data and communication methods and devices 3407 as may come into common use, these data typically being in the WML or WAP formats, or other formats as may come into common use. The principle purpose of the 'Loan Application Gateway' 3400, in serving as a portal, is to provide a way for the loan originator to exchange required data with to the "Loan Application System' without having to worry about what input method he is using and/or the related data formats and protocols. Consequently the major purpose of the input gateway is to perform the middleware tasks of—recognizing the input channel and data format and protocol used 3409 and convert the data to the standard Application Programming Interface (API) format 3411 which will be used by downstream modules. This standard Application Programming Interface (API) format 3411 is described in more detail below in the section covering the Compliance Engine.

The input data originates from the input screens provided by the system. Upon making the connection to the OnePipeline system, the loan originator is presented with introductory screen sets (FIGS. 7–12) and input screen sets (FIGS. 13–18) whereby the particular information which describes, to the OnePipeline system, the circumstances of the borrower, as well as the property under contemplation for purchase. Suitable reference and 'help' screens are made available to the loan originator to assist in the entry of required data. Notably, display information and on-screen prompts for data input are tailored to the nature and speed of the data link as well as the display limitations of the terminal device in use by the loan originator.

Figure 7:
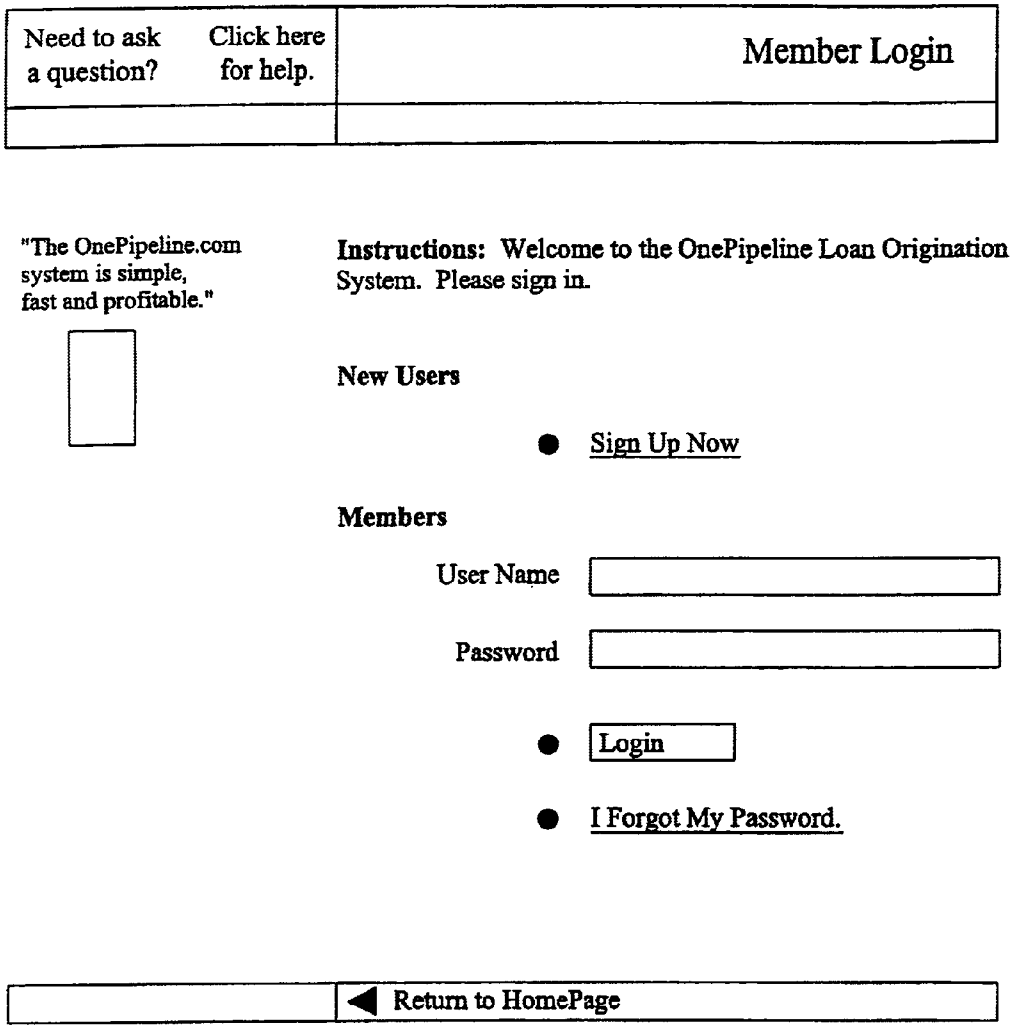
Figure 8:
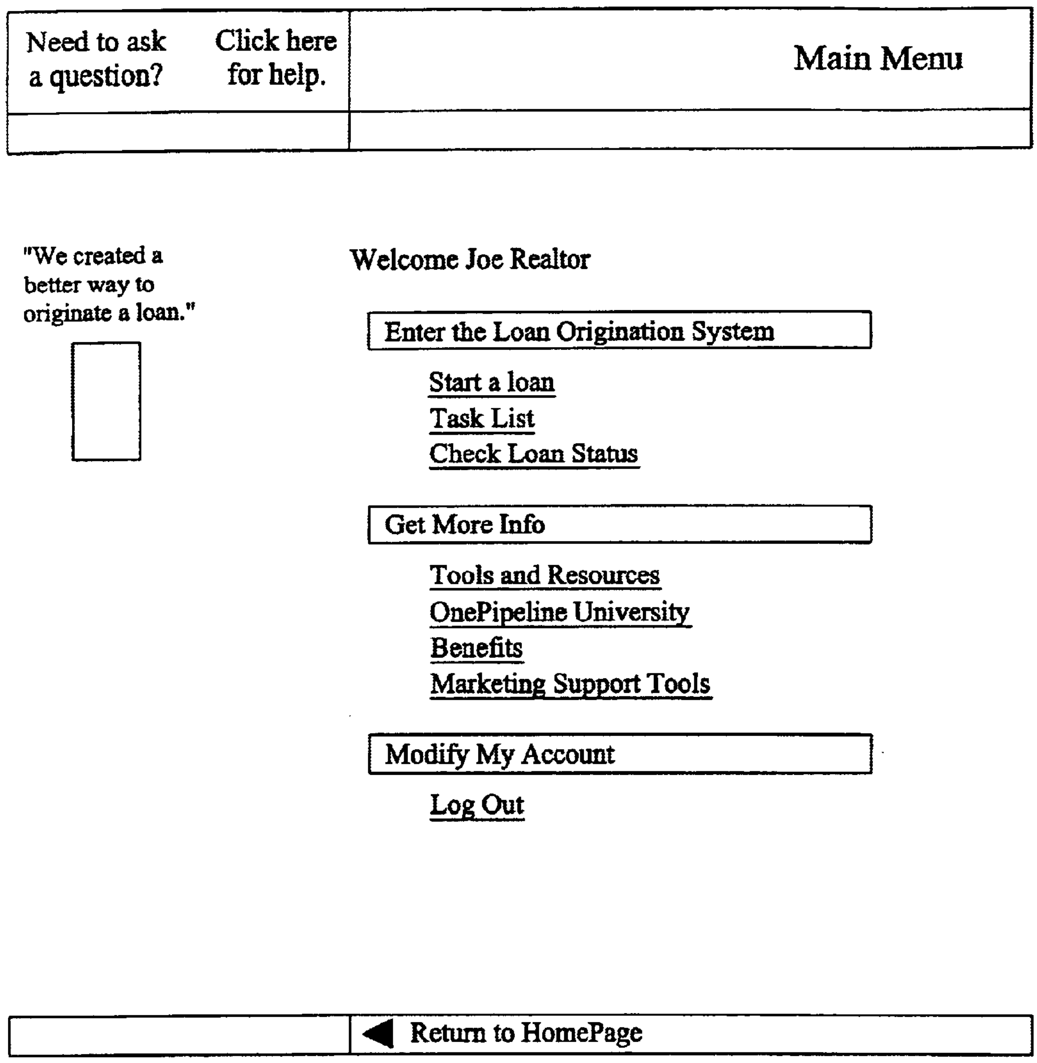
Figure 17:
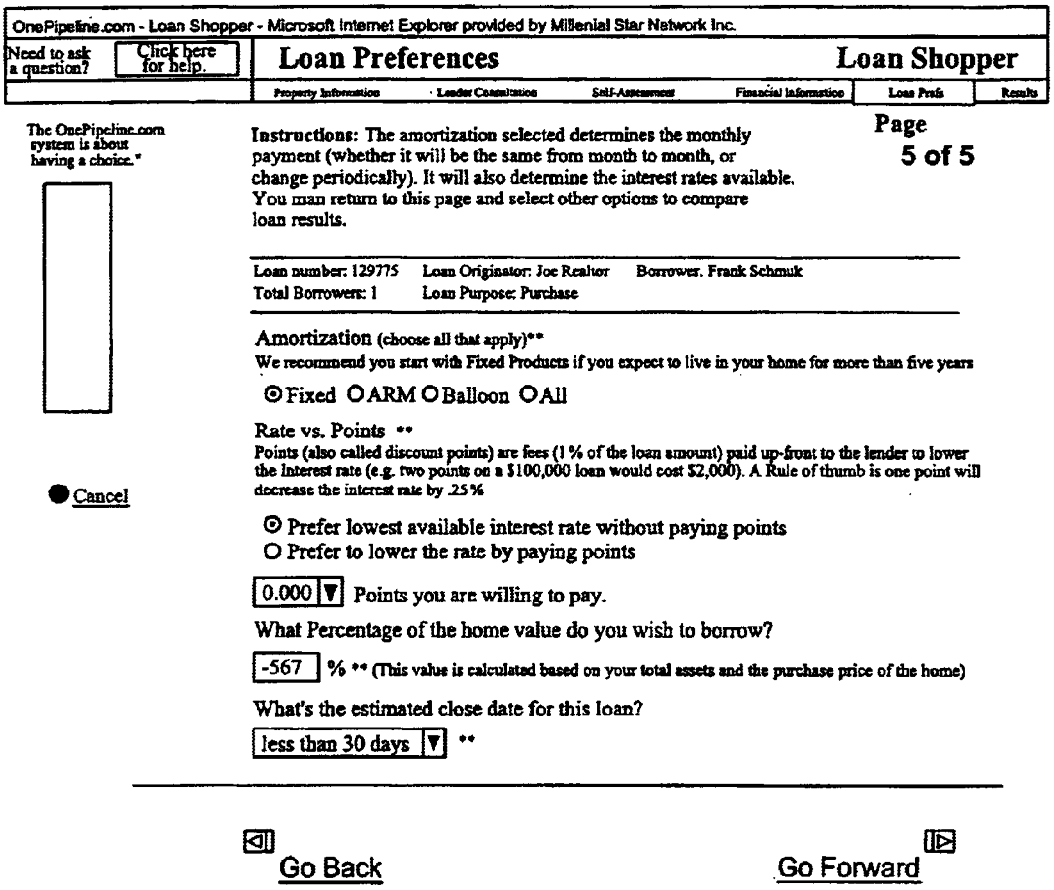
Figure 20:
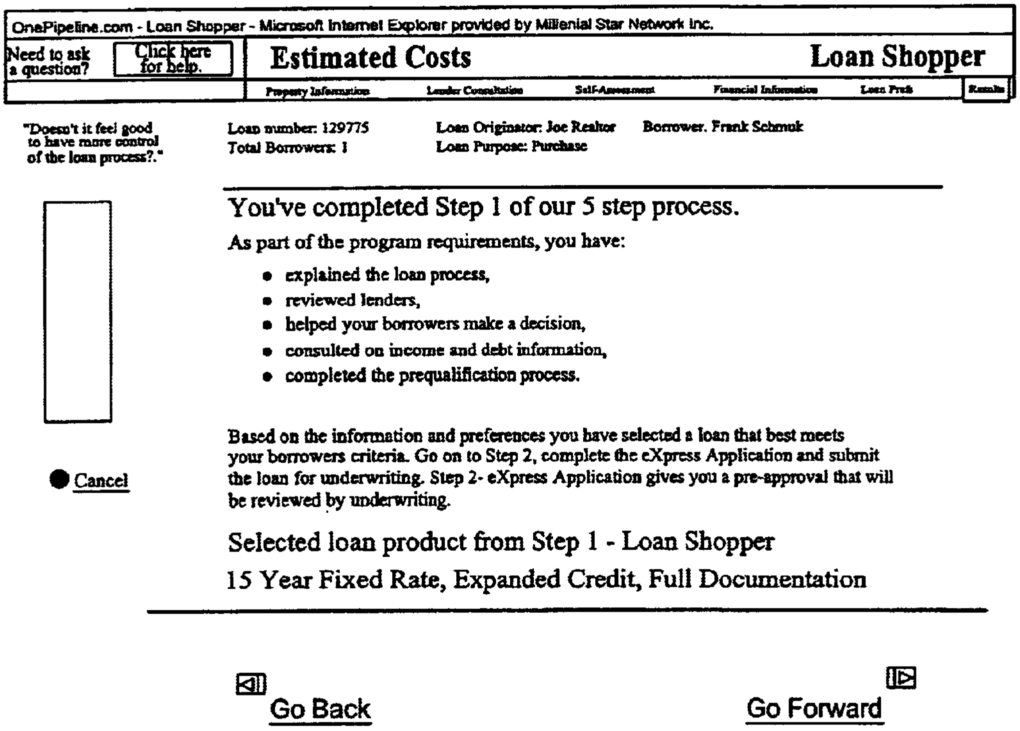
Figure 21:
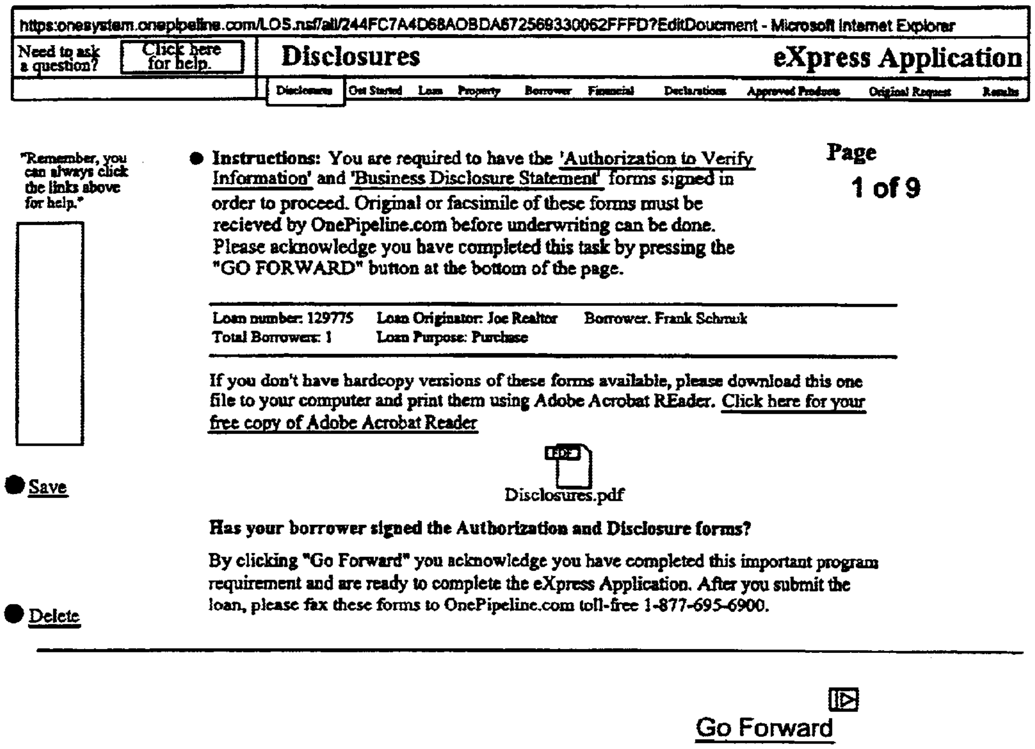
Figure 23:
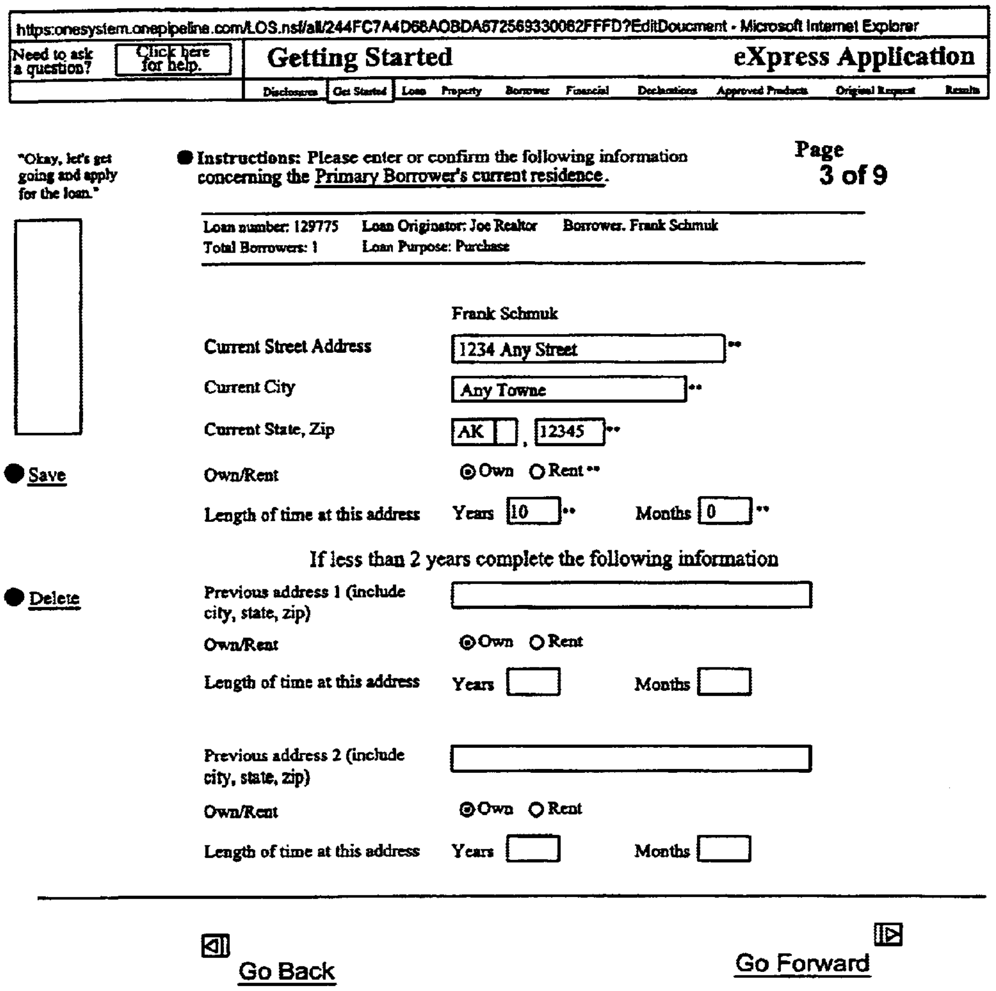
Figure 24:
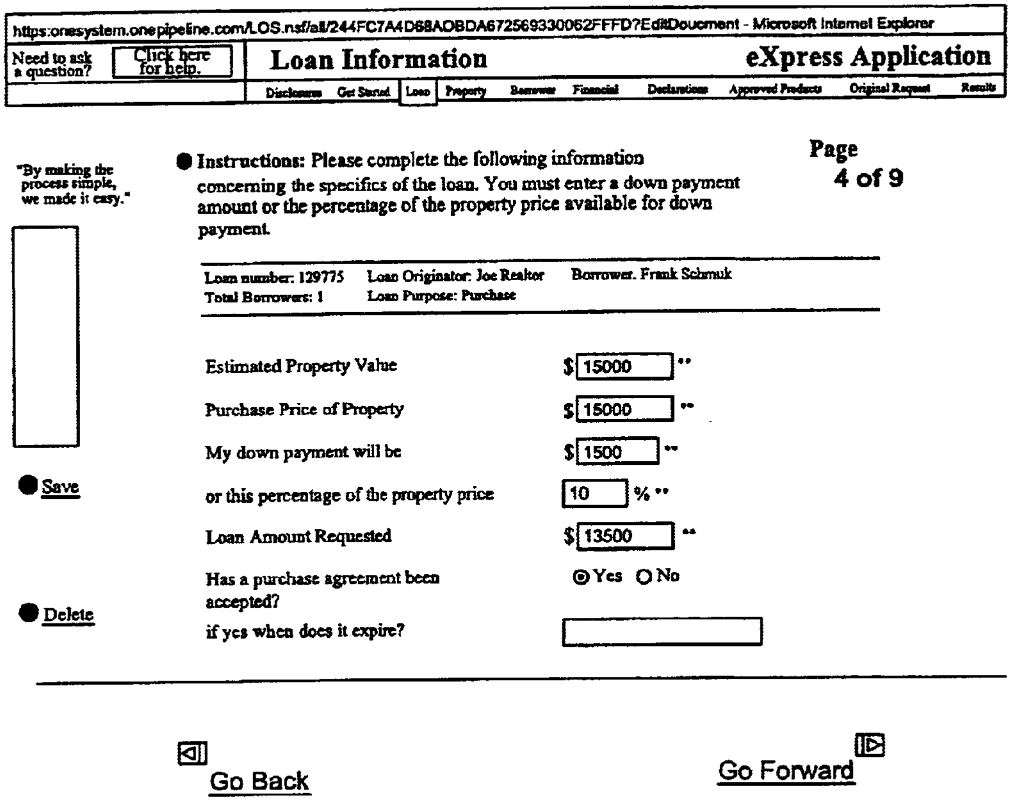
Figure 25:
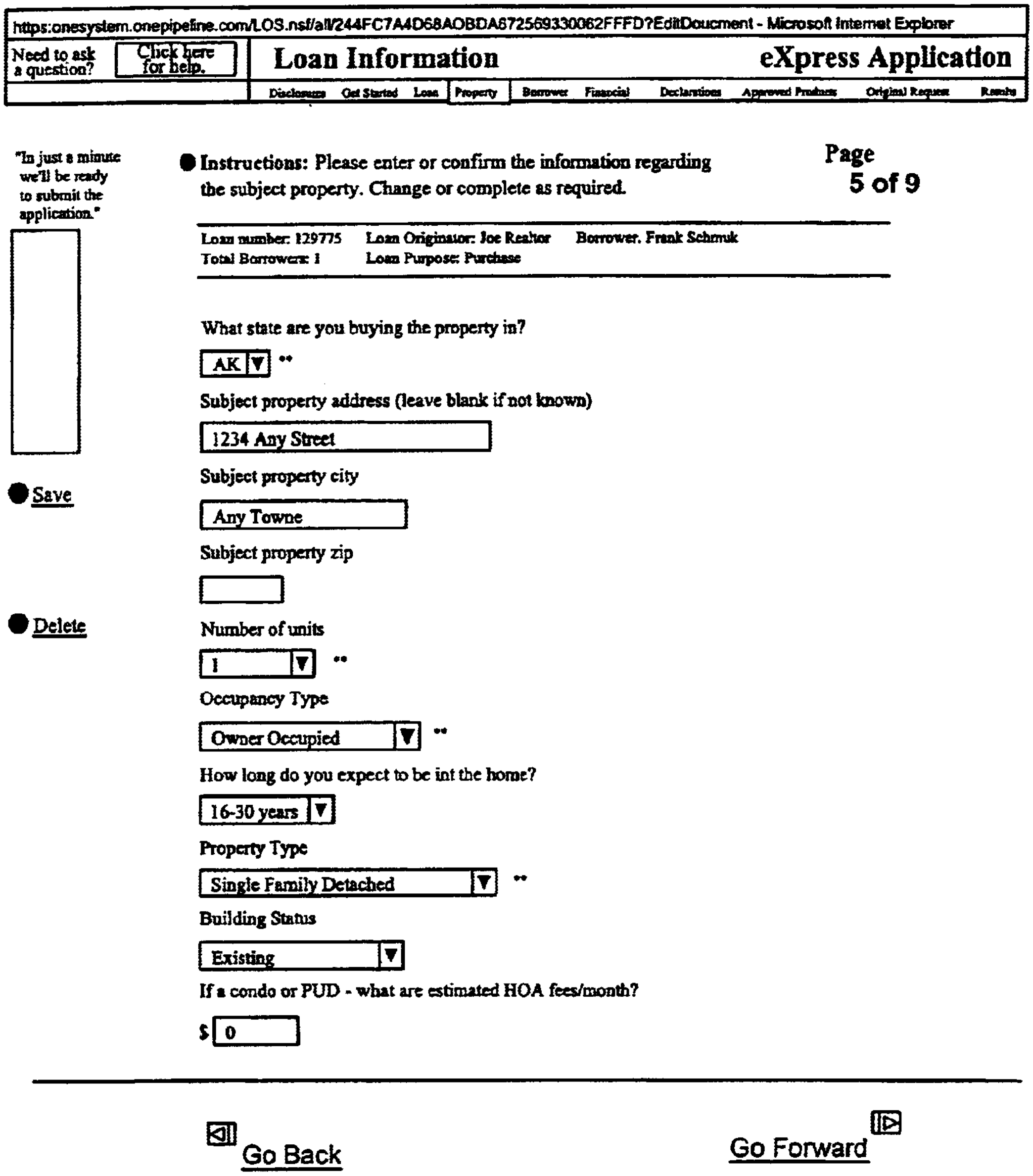
Figure 26:
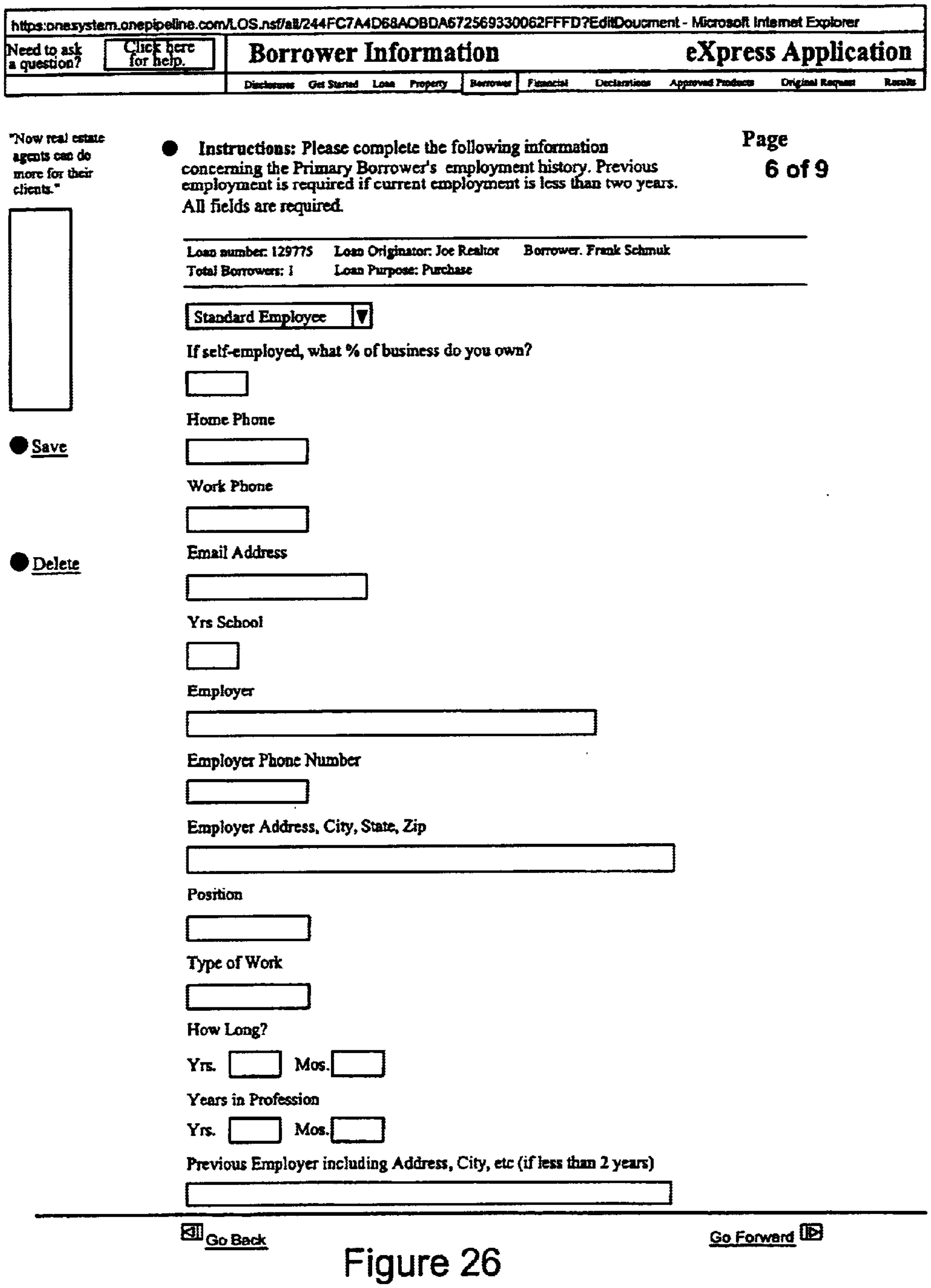
Figure 27:
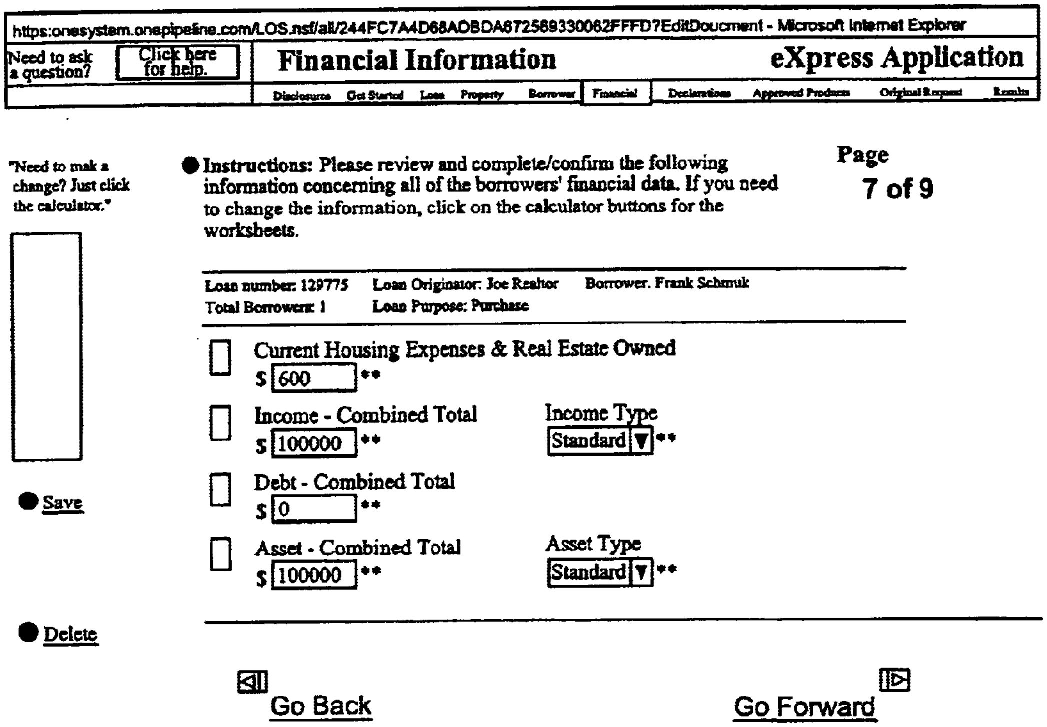
Figure 29:
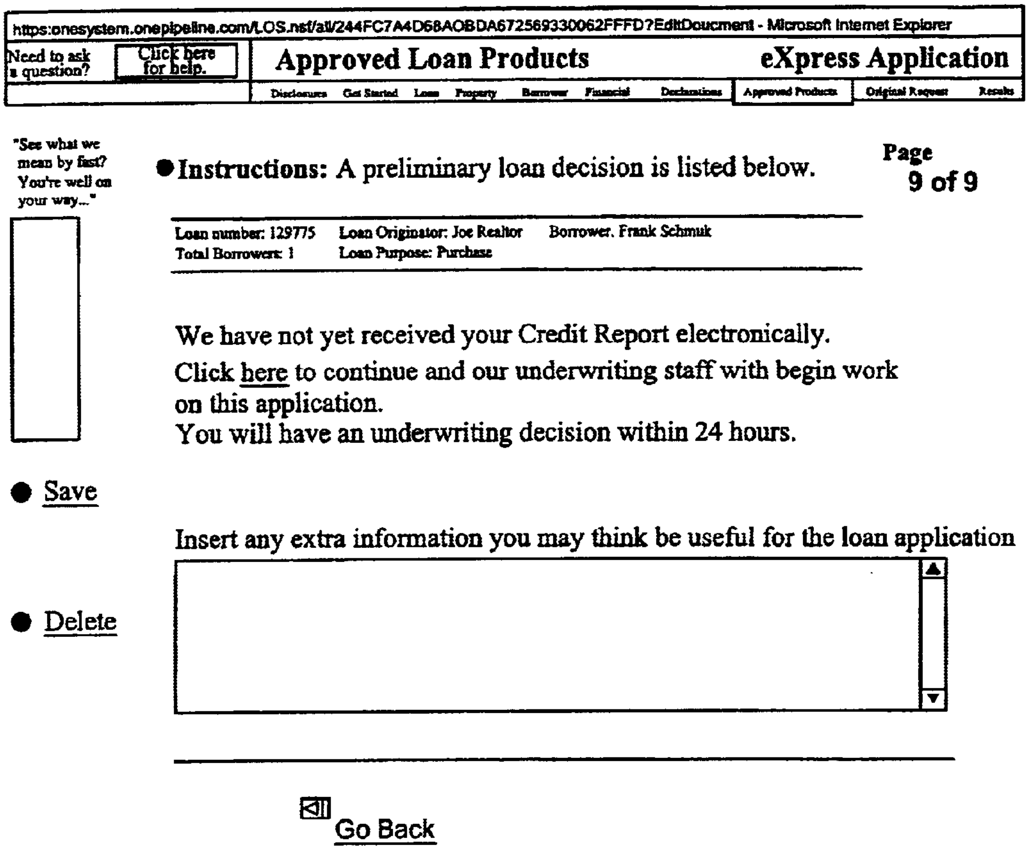
Figure 30:
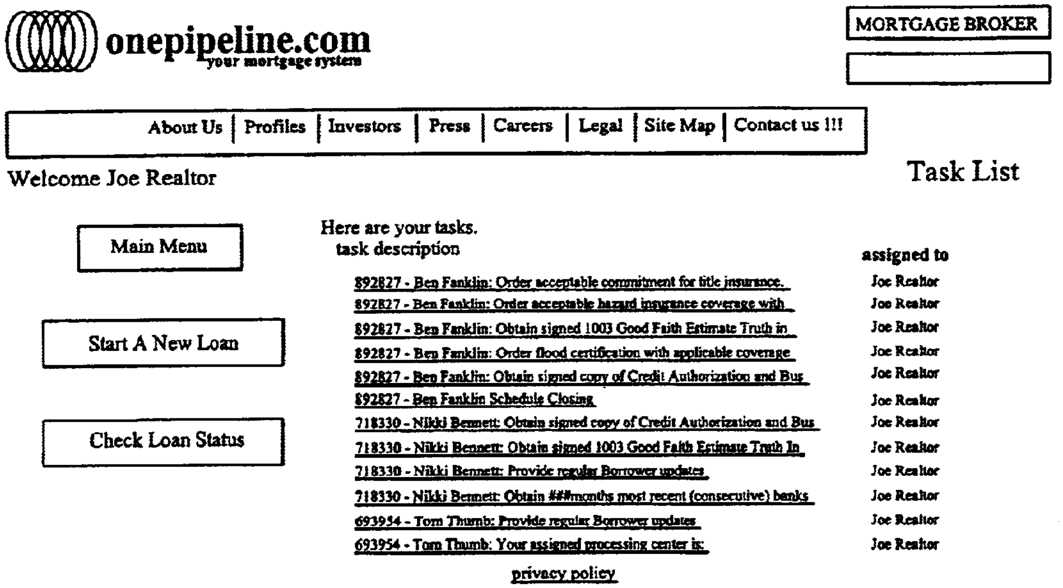

Referring to FIGS. 7–18, such data or information is required for originating and underwriting a loan, and typically includes the following: a subscribing loan originator's identification FIG. 7, pertinent information sufficient to identify the pending borrower FIG. 13, and information on the subject property FIG. 14. The subscribing loan originator's identification FIG. 7, in turn, provides the present invention with a profile of the originator and the location of the property in question thereby providing sufficient information to facilitate authentication of the originator's qualification, according to regulations, to originate a loan, and other such information as is deemed necessary to logically connect the originator with agents, workers, or services which have been associated with the originator as 'loan affiliates'.

These 'affiliates' constitute a variety of resources which may be called upon on a loan-by-loan basis to provide services common in the industry, to the originator in order to complete the loan.

The Authentication System

In a preferred embodiment of the system, a Lender may make use of the OnePipeline system merely to obtain the set of tasks required for a specific loan, including tasks required by applicable federal and/or state law, and to obtain a Completion Certificate, or he may originate a loan through OnePipeline's network of Loan Originators also obtaining a Completion Certificate based upon the systems monitored performance of the required tasks involved. In either case the Loan Originator's qualifications are not verified by the Compliance Engine. That is, the Compliance Engine does not check the lenderID and property location to determine whether this Loan Originator is qualified to represent this loan applicant.

In an alternative preferred embodiment, this authentication of the loan originator/lender is performed. This process will now be described. Upon completion of data entry by the loan originator, the OnePipeline system launches a validation or 'authentication' process 403 in FIGS. 4A and 503 in FIG. 5. The authentication module verifies the identity of the loan originator through the use of conventional means, a security 'login' typically requiring user names and passwords, which are programmatically verified as belonging to the loan originator. Various data security mechanisms may be incorporated in this sub-system as well, including the use of digital signatures as required. The completeness of the required input data is also verified. The Authentication module also authenticates the loan originator as being qualified to originate a loan for the property location specified. The module gets the loan originator and borrower input data 401 and calls the 'Compliance Engine' 405, to determine whether the loan originator can originate this loan. If the initial queries to the legal context databases (these are described in more detail below with respect to the compliance engine description) indicate that the loan originator is not qualified then this "not-qualified" data is returned to the loan originator. If the loan originator is found to be qualified to originate loans in the locality a "yes" is returned and the authentication module may instruct the Compliance Engine to complete a "worker profile" for this loan originator, borrower and property.

The Automatic Compliance Engine

The Automatic Compliance Engine (the "Compliance Engine"), (458 in FIGS. 4C and 520 in FIG. 5), is now described in a preferred embodiment. The Compliance Engine is called a number of times by several modules.

As described above, many government, professional, and business institutions impose requirements on land and mortgage lending transactions. A requirement can be the disclosure of specified information to the borrower, filling out a required form, or the gathering of specified information, to name a few. OnePipeline.com, Inc. retains the services of legal professionals throughout the country who continuously gather these requirements and organize them into a comprehensive rule base. The purpose of the Automated Compliance Engine is to apply these rules in an automated way to identify all requirements that apply to a specific loan and to track the completion of those tasks. The output of the engine is a task list comprised of all the tasks which the engine has determined need to be completed for a specific loan, augmented with task completion information for completed tasks.

In a preferred embodiment, the task list is prepared by selecting a subset of tasks from the list of all task definitions known by the Automated Compliance System. Tasks are selected by evaluating expressions written in a dynamically interpreted programming language that test facts pertaining to the specific loan information. If the expression evaluates to true, then all tasks associated with that expression are added to the task list. All of the expressions in the rule base are sequentially evaluated for each loan instance. The Automated Compliance Engine is thus a rule based system, where each expression represents the 'if' part of a rule, and the subset of tasks associated with the expression represents the 'then' part of a rule.

For example, the following is a set of tasks for a given context:

```
<context>
    <id>12</id>
    <name>Texas</name>
    <if>val('loan.property.address.state') == 'TX'</if>
    <then>
    <taskName>TX Mortgage Broker/Loan Officer Disclosure</taskName>
    <taskName>Property Disclosure--Seller to Buyer</taskName>
    <taskName>TIL</taskName>
    <taskName>URLA</taskName>
    <taskName>Right to Receive Appraisal Disclosure</taskName>
    <taskName>TX Residential Construction Contract Disclosure</taskName>
        </then>
      </context>
```

Once required tasks are identified, the engine applies lender task profiles in order to override task description, the URL to print a form, and other task information provided in the standard task definitions with more specific values from the Lender Task Profiles. This allows a high degree of flexibility in customizing the engine for specific lender requirements, including changing the wording of the description of the task or changing the form that must be filled out.

Once the task list has been initially prepared, it is presented to those persons responsible for completing the tasks. This may be as a simple task list transmission to a lender who is doing his own loan origination and/or processing and simply wants OnePipeline to monitor task completion, or it may be an automatic transmission to an automated workflow process engine. In a preferred embodiment, the automated workflow process engine may be Framework™ Inc.'s "Lendware™" program or a functional equivalent, such as one based on Forte Software™ Inc.'s Forte Conductor™ product. In this case the Workflow process engine presents the tasks to the persons identified as being responsible for doing the task.

As each task is completed, the Compliance Engine receives notice of the completion event and the task list is updated to include the identification of the person completing the task and the date and time of completion. The task list is considered completed when all required tasks have a completion date. Compensation may be issued to those who performed specified tasks with assurance that all required tasks have been completed and that the compensation is within the bounds of the laws and policies of the participating institutions.

Data Representation

In the preferred embodiment, all Compliance Engine inputs and outputs are in represented externally in Extended Markup Language format (XML) which is described in the document found at www.w3.org/TR/1998/REC-xml-19980210 which is incorporated fully herein by reference. XML provides an extensible hierarchical data structure where each element of information is labeled with a tag and optionally contains a value and any number of child elements. Internally, the same information is represented and manipulated in a standard tree format using the Document Object Model tree (DOM) which is described in the document at www.w3.org/TR/REC-DOM-Level-1/level-one-core.html#ID-1590626202 and which is incorporated fully herein by reference. Conversion between internal and external representation is provided by output methods of the DOM tree implementation and input methods of the Java API for XML Parsing (JAXP) which is described in the document at the URL java.sun.com/xml/docs/api/ which is incorporated fully herein by reference.

For convenience in referring to DOM tree elements, but not of necessity, the tree implementation is extended to provide easier tree traversal using a simple "get(String path)" method that takes a path argument such as 'task.name'. The tags between the dots '.' are parsed out of this path and used to search for corresponding elements in the tree. In this example, the get method searches for the first-occurring element of the tree with tag "task". Once found, the get method then searches for the 'name' tag among the child elements of the 'task' element, and so on for all the tags listed in the path. Further descriptions herein will use this path notation to refer to specific data elements in the data model trees defined below.

Alternative ways to represent and access the information could include files, objects, database records, arrays, structs, TCP/IP socket streams, 'if-then-else' statements in a programming language, or other ordinary means for representing structured information.

Data Mode

In recognition of the need to automate as many of these activities as possible, to the mutual advantage of the real estate and mortgage loan community, the Mortgage Bankers Association of America (MBAA) recently originated an effort to develop data structure standards to provide standardization of common business transactions in the mortgage industry. This effort is coordinated by a workgroup of mortgage industry representatives and is called the Mortgage Industry Standards Maintenance Organization (MISMO). Initial deliverables of MISMO include 1) an XML Transaction Architecture to encompass data exchanges from loan origination, the secondary market and servicing; 2) a data dictionary to provide business definitions and corresponding tag names of each of the data elements included in the architecture; and 3) a data model to provide relationships between the elements in the business data. The current versions of these deliverables are contained at www.mismo.org and are fully incorporated herein by reference.

This description refers to the detailed data model in the MISMO web site mentioned above (www.mismo.org). The Data Model is described therein as follows:

"The Data Model is a tool used to understand the relationships between the data elements in the data dictionary. It is a reference to aid in building the XML DTD's. This is not the XML implementation of the MISMO Standard."

MISMO Data Model Documentation

- Address
- Address Definitions
- Agreement
- Agreement Definitions
- Entities Attributes Entity Listing
MBA Data Model
Credit Report
Party
Party Credit Definitions
Party Declarations Definitions
Party Finance
Party Finance Item Definitions
Party Person Definitions
Product
Product Definitions
Property
Property Definitions
MBADataModel v1.ER1

The Compliance Engine XML/HTTP Transaction API described below includes Example values for clarification.

The core knowledge of compliance requirements is represented in the 'rules' structure, consisting of 'rules.contexts' and 'rules.operations'. Each 'rules.contexts.context' represents an if/then rule, where the 'context.if' part describes a specified loan situation (context), and the 'context.then' part is a list of 'taskname' references to the tasks that are required in that context. Each 'context.if' definition is expressed in a programming language statement that examines the facts of a specific loan and evaluates to true or false, as described in the algorithm description below.

Each 'rules.operations.task' defines detailed information about a specific task, independent of the contexts in which it may be required. This information includes a description of the task, a URL link to any forms that may be required for the task, a time period within which the task is expected to be completed, and potentially other information pertinent to a task. References from the context structure in each 'rules.contexts.context.then.taskname' are matched with the corresponding name in 'rules.operations.task.name'. In this manner, a detailed task definition is associated with one or more specific contexts, by task name reference.

This separation between tasks and contexts is a convenience that allows a task to be defined in a single place yet be associated with multiple contexts. Alternatively, the 'rules.operations' list could be eliminated by replacing every 'rules.contexts.context.then.taskname' with an equivalent 'task' structure as presently defined in 'rules.operations.task', although many of the tasks would need to be defined and maintained redundantly in this mode.

Elements of a 'rules.operations.task' definition may be overridden by a corresponding element in an 'override.tasks.task' definition whose 'rules.operations.task.name' matches the 'override.tasks.task.name'. This allows customization by supplying customer-specific information in the task definition, such as a customer-specific form, description in more familiar language, or any other task definition element. Any number of 'override' structures may be applied in sequence, each overriding the result from the previous 'override' application. This allows overrides from customers, and their brokers, agents, and other affiliates to be applied in any desired priority ordering that ultimately determines which override changes will be final. The method of applying the override information is described in the algorithm below.

The 'loan' structure contains all the information pertaining to a specific loan application. The loan application contains information about the borrower, the property to be mortgaged, its location, the loan amount, and the type of loan applied for. This is the information that is evaluated by the 'rules.contexts.context.if' expression to determine whether the conditions specified in the context definitions are true in the case of a specific loan.

Compliance Engine XML/HTTP Transaction API

The Compliance Engine Application Program Interface (API) defines structures for communication between the Automated Compliance Engine and the external environment. The request is initiated by an external agent with accompanying request parameters described below, and the response is a complete Task Status Report consisting of the 'tasks' list output of the engine plus the completion information of completed tasks. Each output 'tasks.task' defines a task that the engine has determined is required in the case of the specified loan. The list will typically be a subset of all defined tasks. Each task includes the detailed task definition information from 'rules.operations.task', with some elements possibly overridden by corresponding task override information from 'override.tasks.task'.

Data is exchanged via pre-authenticated HTTP in XML format (DTD available). It is presented in indented format for readability. All XML elements are required.

The lender must provide, for each loan product, a description containing the product attributes that are required for compliance analysis, such as whether ARM, fixed, balloon, index, etc. Each loan application is linked to this information via the loanProductId compliance parameter, described below. This must be updated whenever the product attributes change.

The MISMO standard mentioned above contains most of the information required by the Compliance Engine to perform its work, but not all. The key missing pieces are the type of loan product the borrower is applying for, and the lender and agent identification.

Loan products differ from each other in terms of whether they are adjustable rate (ARM) or fixed, whether the rate is tied to T-bills or some other index, whether there is a Balloon payment, whether the property will be owner occupied or rented out, whether there is cash out or not, etc.

The loan product information is complex, and there are several compliance rules that arise out of different characteristics of the lender's loan product. In a preferred embodiment, rather than try to identify all facets of the loan product in a structured way and apply rules each time those facets are examined, instead, the loan product information is analyzed by hand, one time, up front, and a decision is made as to what compliance tasks are required for that type of loan. Then when it's time to generate a task list, there is a single rule that indicates if you have loan product type XYZ then you must do tasks 1, 2, and 3. The main piece of information that is not provided by MISMO is the loan product ID, which is the id given the loan product by a lender.

Besides the loan product ID, the compliance API also requires the lender id, which is used in conjunction with the loan product id to fully identify the loan product, and it also tells us where the loan originator's pay will come from, which lender profile to apply, the lender to send notifications to, etc. The API also requires the loan originator agent id, which identifies who the loan originator is so he/she can be paid appropriately when that time comes. The loan originator id is assigned by OnePipeline.

The lender may also provide a task list profile that defines override values for task.description and task.form for any task. These values override the OnePipeline default values for these fields, if present. This allows lenders to describe tasks in their preferred terminology and to use their own forms, subject to compliance requirements.

These data provided via the Loan Application Gateway 3400 (described above) include the following exemplary type data:

New Task List Transaction

This transaction creates a new loan compliance record in the OnePipeline compliance database, and creates the task list.

Input:

```
complianceRequest
    requestType newTaskList     //same as HTTP Request-line URI resource
    lender (loan)
        lenderId                //onepipeline assigned
        lenderLoanId            //lender assigned
    agentId                     //loan originator, onepipeline-assigned agentId
loan                            //loan compliance parameters.
        loanOriginationFee      //$. Requires review if over 1% of loanAmount.
        loanProductId           //must match id in lender-provided product
                                  spec.
        loanAmount
        propertyType            //single, multiple, occupied, etc., from list
        financingOptions        //cash out, refinance, purchase, etc., from list
        state                   //property location, 2-letter state code
```

Output: Task Status Report (see below)

Update Transaction

This transaction updates the loan compliance record when one or more tasks are completed, or when loan compliance parameters are changed. If loan compliance parameters are changed, a new task list is generated, and the old one is moved to the taskListArchive section. Task completion information is retained in both the current task list and in the archived task lists.

Input:

```
complianceRequest
    requestType update
    lender (loan)
        lenderId
        lenderLoanId
    tasks
        task
            taskId              //matches taskId from task in task list
            agentId             //onepipeline agent id
        completeDate            //date and time in SQL format
        task
            taskId
            agentId
            completedDate
        . . .
    loan
        loanOriginationFee      //$. Requires review if over 1% of
                                  loanAmount.
                loanProductId   //must match id in lender-provided product
                                    spec.
loanAmount
        propertyType            //single, multiple, occupied, etc., from list
        financingOptions        //cash out, refinance, purchase, etc., from list
        state                   //2-letter postal state code: NY, CA, TX, etc.
        selfEmployed            //Y or N
```

Output: Task Status Report (see below)

Task Status Report Transaction

Output:

Format and structure is the same for all transaction types. When changed loan compliance parameters require regenerating the task list, old task lists are preserved in the taskListArchive section. Completion information is present only for completed tasks, in both tasks and taskListArchive sections.

```
complianceResponse
    requestType taskStatusReport
    httpStatus                      //Same as HTTP response code. Success: 200 OK
    lender (loan)
        lenderId
        lenderLoanId
    date                            //status report date and time in SQL format
    tasks
        task
            taskId                  //onepipeline unique task id number
            taskName                //onepipeline unique task name
            displaySequence
            lenderTaskName
            description             //may be overridden via lender profile
            form                    //.PDF printable form URL. May be overridden.
            stepNumber              //HUD step 1, 2, 3, 4, or 5
            completion              //Present only for completed tasks
                agentId             //onepipeline agent id
                completedDate       //date and time in SQL format
        task                        //same as above
        . . .
    taskListArchive
        archiveDate (date)          //date moved into taskListArchive
            date                    //task list creation date and time, in SQL
format
            lender (loan)           //same as lender structure above, as of date
                . . .
            tasks                   //same as tasks structure above, as of date
                . . .
            loan (loanProductData)  //same as request, with replaced loanProductId
information
            . . .
        archiveDate (date)
            . . .
    stepCompletion (completion)
        step (stepNumber x)
        stepNumber                  //HUD steps 1, 2, 3, 4, and 5
        complete                    //Y or N
        feePercent                  //percentage to be paid for this step
        fee                         //feePercent * loanOriginationFee, $
        agentId                     //onepipeline agent id if agent completed
        agentPayable                //fee $ if agent completed, else zero
    step                            //same structure as above
        . . .
    step
        . . .
    step
        . . .
    step
        . . .
```

Algorithm

Refer to the description of XML, JAXP, and DOM in the data representation description above, and to the data model description and detail data model elements also described above.

At startup, the Automated Compliance Engine reads the XML-formatted 'rules' from external storage into memory. This XML stream is parsed by the JAXP parser into a DOM internal tree. For each 'rules.operations.task', the 'task.name' is used as a key in adding task detail definition elements to a java.util.Hashtable to enable looking up a task definition by 'task.name'. Similarly, an array is loaded with each 'task' indexed by 'task.id', to enable looking up each task by the unique 'task.id' integer value. A separate hash-table is loaded with task override information for each lender, again using the 'task.name' as the key. Also, a socket connection to a network is opened by a web server or other HTTP service to enable Compliance Engine users to submit requests to the Compliance Engine server and to return responses. HTTP socket connections are describer described in the document found at www.w3.org/Protocols/rfc2616/rfc2616.html and which is incorporated fully herein by reference.

Once initialized, the Compliance Engine server operates in a stateless request-response fashion, similar to a web server, following the HTTP protocol. Alternative protocols could be used. The request and response are both formatted externally in XML format, and internally in DOM trees, as described in the data representation description above.

The Compliance Engine API provides for three different request types: New Task List, Task Completion, and Task Status Report. These are described below. The response in all cases is a Task Status Report containing a 'tasks.task' list. The remainder of this algorithm section describes how the task list is created or updated in response to these requests.

The Compliance Engine also incorporates an 'event generation mechanism', the purpose of which is to trigger actions upon the occurrence of specified events. These events may include a 'pushed' report where a task list is periodically updated according to specified parameters and delivered.

New Task List

The New Task List request consists of a 'loan' structure that contains information about a specific loan sufficient to determine which compliance tasks are required.

The 'tasks.task' list is prepared as follows. Each 'rules-.contexts.context.if' expression is evaluated, one at a time, in a loop from first to last. The 'if' expression is written in the JPython programming language, which is an interpretive scripting language that can evaluate string expressions at runtime. The Python Programming Language is described in the book "Internet Programming with Python" by Aaron Waters, Guido van Rossum and James C. Ahlstrum, M & T Books (Div. of Henry Holt & Co.) 1996, which is incorporated herein by reference. Other languages could be used. The expressions typically reference a specific element in the 'loan' structure to see if the element contains a specific value.

For example, to determine if the loan property is in the state of Utah, the expression could be "val ('loan.property.address.state')=='UT'". The "val( ) method takes a string describing a path into a DOM tree, and returns the first value of the first DOM node found on that path. If the actual value of the 'loan.property.address.state' node of a specific loan was 'UT', the expression evaluates to true, otherwise false. When such an 'if' expression evaluates to true, all of the associated 'rules.contexts.context.then-.taskname' references are followed by using the 'taskname' value as a key to look up the referenced task detail definition through a java.util.Hashtable populated at startup.

After finding the task detail in the hashtable, the 'rules-.operations.task.name' task detail definition structure could be copied directly to an output task list; however, for convenience in the preferred embodiment, the integer value of the included 'rules.operations.task.id' element is used to set a corresponding bit in a java.util.BitSet. This 'id' integer value is unique for each task in the 'rules' set. After all rules have been evaluated and all applicable bits are set, the resultant BitSet contains a true bit for every task with a true 'if expression. The BitSet thus represents the subset of all tasks which the Compliance Engine has determined to be required in the case of the specified loan. The purpose of this BitSet representation is to allow, in the future, rapid and simple boolean operations (and, or, or not operations on the BitSet) to combine task lists from different rule sets to improve flexibility and/or increase performance. One way to increase performance, for example, is to create a BitSet at startup time from a rule set that contains contexts that are always true for every loan. This initially created BitSet can be combined with the dynamically created BitSet using a bitwise 'and' operation in a manner that avoids unnecessary re-evaluation of some rules.

Once a final BitSet is constructed, the program loops through each bit in the BitSet, and where a true bit is found in a particular bit position, the bit position is used as the index to retrieve the corresponding 'task' definition structure from the array that was indexed at startup time using the matching 'task.id' integer value. This 'task' detail definition structure is then copied and the copy appended to the DOM output tree containing the output task list.

After constructing the list of task detail definitions for all required tasks, the task override information is applied. This is accomplished by iterating through each task on the output task list, and looking up the task override information for the lender specified in the request. If a task override structure is present in the table, then the program loops through each element in the override structure task definition and replaces the corresponding element in the output task definition. For example, if the override task structure includes a lender-provided task description, then the value of that description is copied over the top of the more generic description from the original rules structure.

Exemplary Task List

An exemplary task list generated by the Compliance Engine in a preferred embodiment is as follows:

```
<?xml version="1.0" encoding="UTF-8"?>
<rules>
    <contexts>
        <context>
            <id>1</id>
            <name>all loans</name>
            <if>true</if>
            <then>
        <taskName>GFE</taskName>
        <taskName>Transfer of Servicing Disclosure</taskName>
        <taskName>FLN</taskName>
        <taskName>ECOA</taskName>
        <taskName>Flood Insurance Disclosure</taskName>
            </then>
            <phase />
        </context>
        <context>
            <id>57</id>
            <name>Wyoming</name>
            <if>state('WY')</if>
            <then>
    <taskName>TIL</taskName>
    <taskName>URLA</taskName>
    <taskName>Right to Receive Appraisal Disclosure</taskName>
    <taskName>Finance/Lock-in Disclosure</taskName>
            </then>
        </context>
        <context>
            <id>12</id>
            <name>Texas</name>
            <if>val('loan.property.address.state') == 'TX'</if>
            <then>
        <taskName>TX Mortgage Broker/Loan Officer Disclosure</taskName>
        <taskName>Property Disclosure- -Seller to Buyer</taskName>
```

-continued

```
            <taskName>TIL</taskName>
            <taskName>URLA</taskName>
            <taskName>Right to Receive Appraisal Disclosure</taskName>
            <taskName>TX Residential Construction Contract
Disclosure</taskName>
            </then>
        </context>
        <context>
            <id>103</id>
            <name>Texas and Loan Amount > 50000</name>
            <if>((val('loan.property.address.state') == 'TX') &
(ival('loan.loanAmount') > 50000))</if>
            <then>
            <taskName>TX Commitment/Lock-in Disclosure</taskName>
            </then>
        </context>
    </contexts>
    <operations>
        <task>
            <id>56</id>
            <name>TX Commitment/Lock-in Disclosure</name>
            <description>The borrower must receive a Commitment/Lock-in
Disclosure form.</discription>
            <form>http://forms.onePipeline.com/TX_Commitment_Lock-
in_Disclosure.pdf</form>
            <role>originator</role>
            <feePercent>15</feePercent>
        </task>
        <task>
            <id>3</id>
            <name>TIL</name>
            <description>The borrower must receive the Truth In Lending
disclosure.</description>
            <form></form>
            <feePercent>15</feePercent>
            <role>originator</role>
        </task>
        <task>
            <id>1</id>
            <name>URLA</name>
            <description>The borrower(s) must sign and return the
completed Uniform Residentional Loan Application.</description>
            <form>http://forms.onePipeline.com/FNMA_1003.pdf</form>
            <role>originator</role>
            <feePercent>10</feePercent>
        </task>
        <task>
            <id>2</id>
            <name>GFE</name>
            <description>The borrower must receive the Good Faith
Estimate.</description>
<form>http://forms.onePipeline.com/Good_Faith_Estimate.pdf</form>
            <feePercent>10</feePercent>
            <role>originator</role>
        </task>
        <task>
            <id>4</id>
            <name>Transfer of Servicing Disclosure</name>
            <description>The borrower must complete, sing, and return
the Transfer of Servicing Disclosure Statement prior to
closing.</description>
<form>http://forms.onePipeline.com/Servicing_Disclosure_552R.pdf</
form>
            <role>originator</role>
            <feePercent>5</feePercent>
        </task>
        <task>
            <id>6</id>
            <name>FLN</name>
            <description>The borrower must receive the Fair Lending
Notice.</description>
<form>http://forms.onePipeline.com/Fair_Lending_Notice.pdf</form>
            <feePercent>5</feePercent>
            <role>originator</role>
        </task>
        <task>
            <id>7</id>
            <name>ECOA</name>
            <description>The borrower must receive the Equal Credit
```

-continued

```
Opportunity Act disclosure.</description>
<form>http://forms.onePipeline.com/Equal__Credit__Opportunity__Act__
Disclosure.pdf</form>
            <feePercent>5</feePercent>
            <role>originator</role>
        </task>
        <task>
            <id>9</id>
            <name>Flood Insurance Disclosure</name>
            <description>The borrower must receive the Flood Insurance
Disclosure.</description>
<form>http://forms.onePipeline.com/Flood__Insurance__Disclosure.pdf<
/form>
            <role>originator</role>
            <feePercent>10</feePercent>
            <originatorDays>30</originatorDays>
        </task>
        <task>
            <id>5</id>
            <name>Right to Recieve Appraisal Disclosure</name>
            <description>The borrower must receive the Right to Receive
Appraisal Disclosure.</description>
<form>http://forms.onePipeline.com/Right__To__Receive__Appraisal.pdf<
/form>
            <role>originator</role>
            <feePercent>0</feePercent>
        </task>
        <task>
            <id>10</id>
            <name>Finance/Lock-in Disclosure</name>
            <description>The borrower must receive the Finance/Lock-in
Disclosure.</description>
<form>http://forms.onePipeline.com/Finance__Lock__in__Disclosure.pdf<
/form>
            <role>originator</role>
            <feePercent>0</feePercent>
        </task>
        <task>
            <id>55</id>
            <name>TX Mortgage Broker/Loan Officer Disclosure</name>
            <description>The borrower must receive a Mortgage
Broker/Loan Officer Disclosure.</description>
<form>http://forms.onePipeline.com/TX__Mortgage__Broker__Loan__
Officer__Disclosure__1048TX.pdf</form>
            <feePercent>5</feePercent>
            <role />
        </task>
        <task>
            <id>54</id>
            <name>Property Disclosure- -Seller to Buyer</name>
            <description>The property disclosure must be completed and
kept with loan documents.</description>
<form>http://forms.onePipeline.com/Property__Disclosure__Seller__to__
Buyer.pdf</form>
            <role>originator</role>
            <feePercent>0</feePercent>
        </task>
        <task>
            <id>211</id>
            <name>TX Residential Construction Contract Disclosure</name>
            <description>The borrower must receive the TX Residential
Construction Contract Disclosure, which is to be provided by the
contractor for new construction.</description>
<form>http://forms.onePipeline.com/TX__Residential__Costruction__
Contract__Disclosure.pdf.</form>
            <role>originator</role>
            <feePercent>0</feePercent>
        </task>
    </operations>
</rules>
</overrides>
    <tasks>
        <task>
            <name>TX Mortgage Broker/Loan officer Disclosure</name>
            <description>Execute ABC Company Loan Officer
Disclosure.</description>
<form>http://forms.ABC.com/ABS__Loan__Officer__Disclosure.pdf</form>
        <role>Loan Originator</role>
    </task>
```

-continued

```
    <task>
        <name>TX Residential Construction Contract Disclosure</name>
        <description>The borrower must receive the ABC Company
Residential Construction Contract Disclosure.</description>
<form>http://forms.ABC.com/ABC__Residential__Construction__Contract__
Disclosure.pdf</form>
        </task>
    </tasks>
            </override>
```

In a preferred embodiment, the original compliance task list for a specific loan is transmitted to the lender for Compliance Management or passed to an automated workflow engine to initiate the dynamic workflow process. FIGS. 37–41 contain a set of system screen shots showing an exemplary list of tasks required to complete a sample loan.

AN ALTERNATIVE EMBODIMENT

In an alternative embodiment, a more general compliance system may be used, and is now described with reference to FIG. 5. Referring now to FIG. 5, the 'Originator and Processor Compliance Engine' 520 is comprised of two principle elements—the 'Worker Description' 521 and the 'Legal Context' 523.

These elements are described in their preferred embodiments as follows:

The 'Worker Description' 521 comprises an assemblage of data sources which define the types 525, roles 527 and locations 529 of the workers or agents which may participate in the mortgage origination process. The participation decision for a worker or agent is based upon the combination of features which the worker embodies and which make them unique when combined one with another. In the preferred embodiment, the worker provides a data profile representative of the worker's type—that is, the type of service the worker may provide. The worker is typically representative of only one 'type' for example, either a 'Real estate sales professional', 'mortgage broker', 'banker', etc. The specific 'role(s)' that a particular worker or agent has in the process is/are also defined. The 'role(s)' that a worker assumes are aligned with the tasks requiring completion which a worker of that type can legitimately perform, according to the governing rule base for that specific worker type. These 'roles' may include such tasks as surveys, inspections, credit worthiness checks, employment verification, etc. Orchestrating the interrelationship of these information sources is a 'Role Sequencing' definition or data table which assures a meaningful, orderly, and legal application of the available data. Those skilled in these arts will understand that various methods similar to those described above in a preferred embodiment could be used for such sequencing activities. In an exemplary process the data passed from the Authentication module includes the loan originator used ID. This user ID is used as an argument to find the recorded worker type in the Worker's description databases where a user ID1, for example, would produce a Type ID1. This type ID1 would then be used to find the corresponding roles for this type of user and to determine the locations where this user id is licensed/qualified to do business. These data are written into a 'worker's profile' structure.

Referring again to FIG. 5, the 'Legal Context' 523 could comprise an assemblage of data sources which would contain the regulatory elements pertinent to the compliance and underwriting process as required by the 'Originator and Processor Compliance Engine' 520. Included in this element would be tables and other data sources which are typically comprised of state and county regulations 531 similar to those described above with reference to the preferred embodiment, licensing regulations 533, federal regulations 535, and professional organizational rules 539, all of which may govern or otherwise influence the underwriting process. Orchestrating the interrelationship of these information sources would be a 'Rule Sequencing' engine 541 which assures a meaningful, orderly, and legal application of the available data. When the 'Role Sequencing' data table and 'Rule Sequencing' 541 engines have completed the required processing, a profile 543 or a composite of the borrower requirements and property profile with applicable worker attributes is made available to the other modules as required (i.e. the Authentication module, Loan Origination module, workflow engine, and Task maintenance & status reporting gateway module).

The 'Loan Application & Program Matching System'

Referring again to FIG. 4C, the 'Loan Origination & Program Matching System' 456, (also see 505 in FIG. 5) is comprised of a multiplicity of sub-systems, to be later described. After this loan originator has been 'authenticated' as described above, this system serves as an infrastructure to identify various loan products or instruments suitable for this unique combination of borrower and property, and further offering a preferred recommendation of loan products and participating workers or agents to effect the loan. The system communicates with the loan originator and requires him to complete the actions and provide the additional borrower data and instructions shown in FIGS. 12–17.

Figure 34:
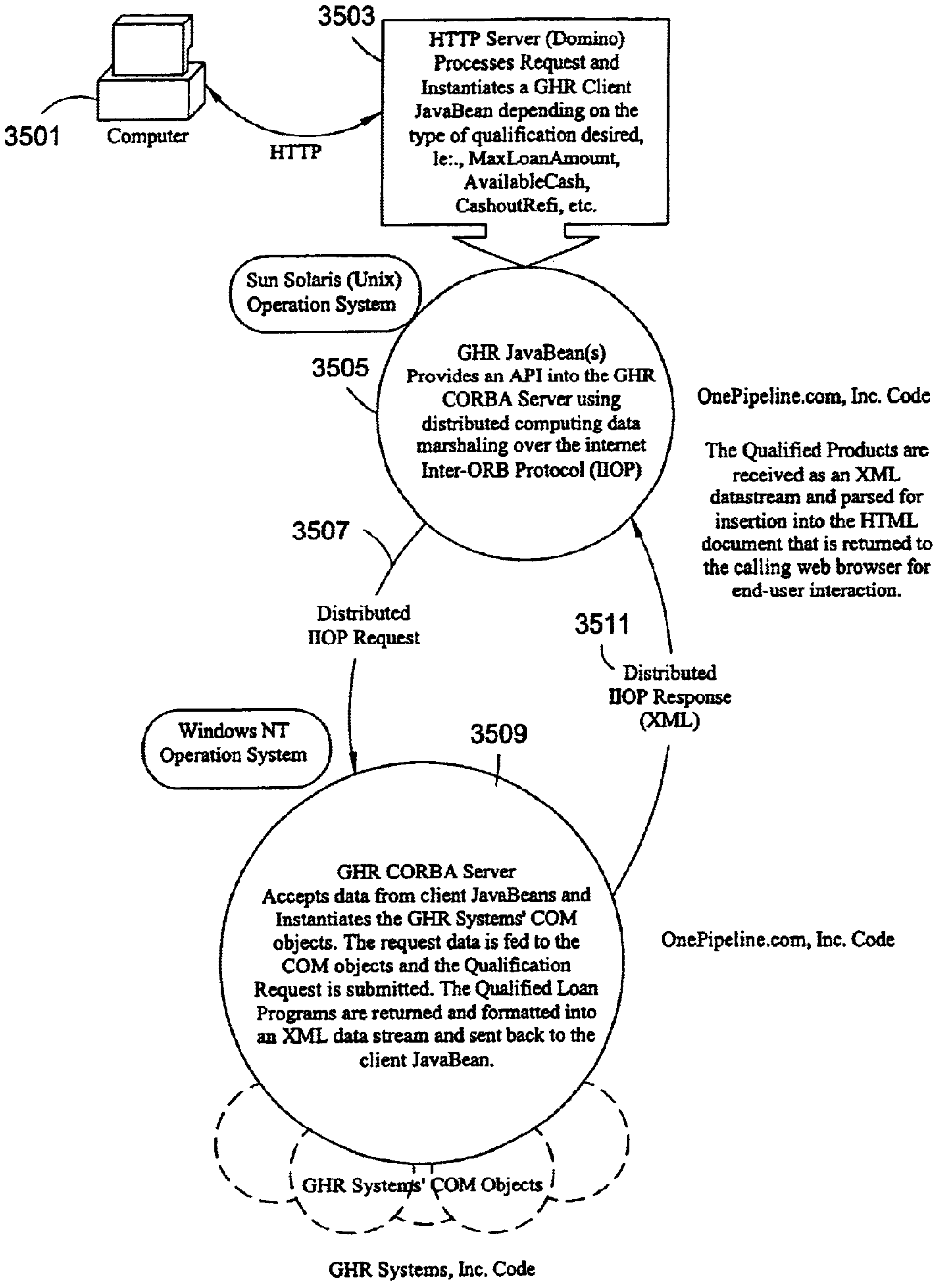
FIG. 34 illustrates an exemplary relationship of various system elements with the GHR sub-system.
Figure 35:
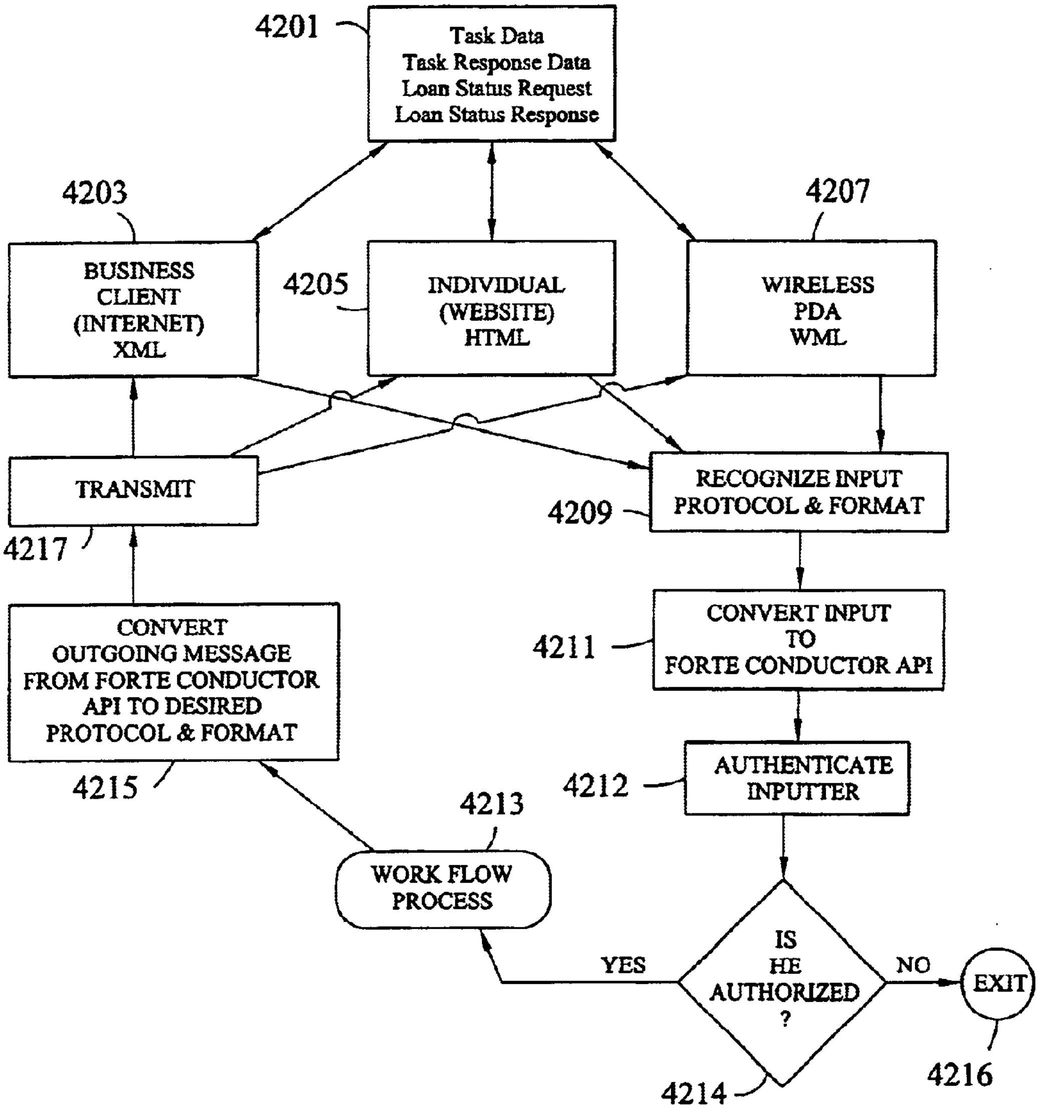
FIG. 35 illustrates an exemplary embodiment of the "task maintenance & status reporting" gateway.

As indicated above, in the preferred embodiment of the invention, this Loan Application & Program Matching System' is preferably performed by a system such as GHR Systems™ making use of their PremierWare™ product. This GHR product is also an object oriented product, however the objects employed are Microsoft COM™ objects which require Windows NT™. The web server architecture of applicants system is UNIX based which necessitates using Java and the Common Object Request Broker (CORBA) system to communicate between the UNIX and COM based object systems. The architecture of this communications interface is described below with reference to FIG. 34.

With reference to Onepipeline's use of this PremierWare™ product, the following description pertains. The input and output data elements that play a role in OnePipeline.com, Inc.'s use of the GHR Underwriting Framework known as PremierWare are now described. OnePipeline implemented the framework within a distributed architecture encompassing several technologies including Java, CORBA, COM, and Delphi (Object Pascal). First, how the GHR components interact with each other are described, followed by the OnePipeline implementation around that interaction.

GHR Systems' PremierWare framework is a set of software components that adhere to the component object model (COM) sponsored by Microsoft. Inc. The framework is provided to facilitate the qualification of borrower credentials, i.e., income, debts, etc., against mortgage loan programs. The desired result being to locate a loan program for which the borrower is qualified. The framework is functionally divided internally representative of three primary operations:

Product Filtration: Narrowing the number of programs available for qualification processing.

Qualification: Extracting the programs for which the borrower is qualified to apply.

Ancillary Utilities (Helping): Packaging and unpacking data as it moves in and out of the GHR API.

Product Fileration

If no product filtering is performed before qualification, then qualification processing is completed on all products in the GHR products database. Filter criteria can be set using any or all of the data elements below:

| GHR Term | Date Type |
|---|---|
| LenderID | String (bstr) |
| MaxReturnedProducts | Integer |
| Modbits | Integer |
| PropertyState | String i.e., 'UT' |
| PropertyCounty | String |
| PropertyZip | String |
| LockType | Integer |
| LockDays | Integer |
| PricePreference | Integer |
| SpecificRate | Integer |
| SpecificPoints | Integer |
| AllLoans | Boolean |
| FHALoans | Boolean |
| VALoans | Boolean |
| ConventionalLoans | Boolean |
| FixedRateMortgages | Boolean |
| AdjustableMortgages | Boolean |
| BaloonMortgages | Boolean |

The result of a Product Filtering operation is a set of loan programs that serve as the input to a Qualification operation. Within the framework, the Pricer object's GetProductsForQualification method is used to perform a filtering operation. Once a set of loan programs is received from GetProductsForQualification, then qualification can commence.

Qualification

The first step in qualification is selecting a Qualification Method. There are fourteen methods in total, which are grouped into four Modes. The four Modes are:

a Buyer/Purchase

Cash out Refinance

No Cash out Refinance

Shopper

| Buyer/Purchase | Cash out Refinance | No Cash out Refinance | Shopper |
|---|---|---|---|
| BuyerBaseLoan | CashoutRefiMaxCashout | NoCashRefiInclFee | Shopper |
| BuyerAvailableCash | CashoutRefiSpecifyCashout | NoCashRefiSpecifyLoan | |
| BuyerMaxLoan | CashoutRefiSpecifyLoanAmt | NoCashRefiSpecifyLTV | |
| BuyerBaseLTV | CashoutRefiSpecifyLTV | NoCashRefiNoCostRefi | |
| BuyerDesiredPITI | | | |

The grids below and on the following pages outline these modes and the various methods available in each Mode with each method's input parameters. There is a core set of input parameters that are used for all methods, and then under each method, there are one or more variations that are indicated in context.

Buyer/Purchase Mode
BuyerBaseLoan Qualification Method
Qualifies a borrower for a specific property (i.e. sale price is known).

| GHR Term | Date Type |
|---|---|
| ProgramID | String |
| PGC (Product Group Code) | String |
| RequestedRate | Integer 8125 = 8.125% |
| RequestedPoints | Integer 1250 = 1.250 pts |
| RequestedCeiling | Integer 8125 = 8.125% |
| RequestedMargin | Integer 8125 = 8.125% |
| BaseLoan | Integer |
| Income | Integer |
| MonthlyDebt | Integer |
| CurrentHsgExpense | Integer |
| YearsExpectedinHouse | Integer |
| EstimatedCloseDate | String |
| IgnoreIncomeRatios | Boolean |
| OverrideRations | Boolean |
| FrontRatioOverride | Boolean |
| BackRatioOverride | Boolean |
| EstimatedTaxDollars | Integer |
| EstimatedHazInsDollars | Integer |
| VAStatus | Integer |
| AssociationFee | Integer |
| FICOScore | Integer |
| FICORejectCode1 | String |
| FICORejectCode2 | String |
| FICORejectCode3 | String |
| State | String |
| County | String |
| Zip | String |
| Modbits | Integer |
| SalePrice | Integer |

Buyer/Purchase Mode
BuyerAvailableCash Qualification Method
Qualifies a borrower based on his/her cash available for closing.
All items are the same as the BuyerBaseLoan except
'BaseLoan' is replaced by 'AvailableCash'.

| GHR Term | Date Type |
|---|---|
| AvailableCash | Integer |

-continued

| Buyer/Purchase Mode |
| --- |
| BuyerMaxLoan Qualification Method<br>Qualifies a borrower for the maximum loan amount.<br>All Properties are the same as the BuyerBaseLoan except BaseLoan is removed. |

Buyer/Purchase Mode
BuyerBaseLTV Qualification Method
Qualifies a borrower based on the percentage of download payment.
All Properties are the same as the BuyerBaseLoan except BaseLoan is replaced by BaseLTV.

| GHR Term | Date Type |
| --- | --- |
| BaseLTV | Integer |

Buyer/Purchase Mode
BuyerDesiredPITI Qualification Method
Qualifies a borrower based on his/her desired monthly combined principle, interest, taxes, and insurance payment.
All Properties are the same as the BuyerBaseLoan except BaseLoan is replaced by DesiredPITI.

| GHR Term | Date Type |
| --- | --- |
| DesiredPITI | Integer |

Shopper Mode
Shopper Qualification Method
Qualifies a borrower who is shopping for a house and does not have a specific property. Also known as "affordability analysis."
All Properties are the same as the BuyerBaseLoan except BaseLoan is removed but MaxLTV, MaxPITI, and AvailableCash are added as well as two percentage fields: EstimatedTaxesPercent and EstimatedHazInsPercent and a MaxPointsAsGift field.

| GHR Term | Date Type |
| --- | --- |
| AvailableCash | Integer |
| MaxPITI | Integer |
| MaxLTV | Integer |
| EstimatedTaxesPercent | Integer |
| EstimatedHazInsPercent | Integer |
| MaxPointsAsGift | Integer |

No Cash Out Refi Mode
NoCashRefiInclFee Qualification Method
Qualifies a borrower with a loan amount that includes the original mortgage balance and closing costs.

| GHR Term | Date Type | |
| --- | --- | --- |
| ProgramID | String | Defined in Buyer Mode |
| PGC | String | Defined in Buyer Mode |
| RequestedRate | Integer | Defined in Buyer Mode |
| RequestedPoints | Integer | Defined in Buyer Mode |
| RequestedCeiling | Integer | Defined in Buyer Mode |
| RequestedMargin | Integer | Defined in Buyer Mode |
| Income | Integer | Defined in Buyer Mode |
| MonthlyDebt | Integer | Defined in Buyer Mode |
| CurrentHsgExpense | Integer | Defined in Buyer Mode |
| YearsExpectedinHouse | Integer | Defined in Buyer Mode |
| EstimatedCloseDate | String | Defined in Buyer Mode |
| IgnoreIncomeRatios | Boolean | Defined in Buyer Mode |
| OverrideRatios | Boolean | Defined in Buyer Mode |
| FrontRatioOverride | Boolean | Defined in Buyer Mode |
| BackRatioOverride | Boolean | Defined in Buyer Mode |
| EstimatedTaxDollars | Integer | Defined in Buyer Mode |
| EstimatedHazInsDollars | Integer | Defined in Buyer Mode |
| VAStatus | Integer | Defined in Buyer Mode |
| AssociationFee | Integer | Defined in Buyer Mode |
| FICOScore | Integer | Defined in Buyer Mode |
| FICORejectCode1 | String | Defined in Buyer Mode |
| FICORejectCode2 | String | Defined in Buyer Mode |
| FICORejectCode3 | String | Defined in Buyer Mode |
| CurrentMtgBalance1 | Integer | |
| CurrentMtgBalance2 | Integer | |
| CurrentMtgBalance3 | Integer | |
| CurrentMtgRate1 | Integer | |

-continued

| | | |
| --- | --- | --- |
| CurrentMtgRate2 | Integer | |
| CurrentMtgRate3 | Integer | |
| CurrentMtgPITI1 | Integer | |
| CurrentMtgPITI2 | Integer | |
| CurrentMtgPITI3 | Integer | |
| CurrentMtgRemainingTerm1 | Integer | |
| CurrentMtgRemainingTerm2 | Integer | |
| CurrentMtgRemainingTerm3 | Integer | |
| CurrentMtgELOC_2nd | Boolean | |
| CurrentMtgELOC_3rd | Boolean | |
| CurrentMtgToBePaidOff1 | Boolean | |
| CurrentMtgToBePaidOff2 | Boolean | |
| CurrentMtgToBePaidOff3 | Boolean | |
| InvestmentRate | Integer | |
| OrigLastWithdrawal_2nd | String | |
| OrigLastWithdrawal_3rd | String | |
| State | String | Defined in Buyer Mode |
| County | String | Defined in Buyer Mode |
| Zip | String | Defined in Buyer Mode |
| Modbits | Integer | Defined in Buyer Mode |
| SalePrice | Integer | Defined in Buyer Mode |

No Cash Out Refi Mode
NoCashRefiSpecifyLoan Qualification Method
Qualifies a borrower with a specified refinance loan amount.
All properties from NoCashRefIncludeFee remain in addition to BaseLoan.

| GHR Term | Date Type |
| --- | --- |
| BaseLoan | Integer |

NoCash Out Refi Mode
NoCashRefiSpecifyLTV Qualification Method
Qualifies a borrower with a specified percentage of existing loan balance.
All properties from NoCashRefIncludeFee remain in addition to BaseLTV.

| GHR Term | Date Type |
| --- | --- |
| BaseLTV | Integer |

No Cash Out Refi Mode
NoCashRefiNoCost Qualification Method
Qualifies a borrower with a rate-points combination that allows the closing cost to be insulated from the borrower. In general, negative points are awarded to provide "cash-back" to the borrower, which is applied toward the closing costs.
All properties from NoCashRefIncludeFee remain in addition to BaseLoan.

| GHR Term | Date Type |
| --- | --- |
| BaseLoan | Integer |

| Cash Out Refi Mode |
| --- |
| CashoutRefiMaxCashout Qualification Method<br>Qualifies a borrower with the maximum possible cash out amount.<br>Properties are the same as the NoCashRefIncludeFee qualification method. |

Cash Out Refi Mode
CashoutRefiSpecifyCashout Qualification Method
Qualifies a borrower with an amount that will pay off the existing loan balance with a specified cash out to the borrower at closing.
Properties are the same as the NoCashRefIncludeFee qualification method plus as AvailableCash field.

| GHR Term | Date Type |
| --- | --- |
| AvailableCash | Integer |

-continued

Cash Out Refi Mode
CashoutRefiSpecifyLoanAmount Qualification Method
Qualifies a borrower with a specified loan amount and cash out amount. Properties are the same as the NoCashRefIncludeFee qualification method plus AvailableCash and BaseLoan fields.

| GHR Term | Date Type |
|---|---|
| AvailableCash | Integer |
| BaseLoan | Integer |

Cash Out Refi Mode
CashoutRefiSpecifyLTV Qualification Method
Qualifies a borrower with a specified loan to value ratio.
Example: 70% LTV for an existing loan balance of $70,000 will result in a loan amount of $100,000.
Properties are the same as the NoCashRefIncludeFee qualification method plus AvailableCash and BaseLTV fields.

| GHR Term | Date Type |
|---|---|
| AvailableCash | Integer |
| BaseLTV | Integer |

Credit Profile Inputs

Each of the qualification methods also accept two input arrays for specifying aspects of the borrower's credit profile. These elements improve the accuracy of the Qualification Results. A Credit Report is retrieved electronically from a certified credit-reporting agency and prepared for use by the GHR interfaces. The two array elements are:

Liabilities

Public Records

The data elements for setting these arrays are provided below:

Liabilities

SetNumberOfRecords(Integer);

BorrowerNumber

LateDaysLiabilityTypeMonthsFromDateReported

Public Records

SetNumberOfRecords(integer);

BorrowerNumber

MonthsRecordClosed

MonthsRecordOpened

RecordType

Amount

GHR Qualification Results

Two sets of records are returned from each qualification request. A set of products (Loan Programs) and a corresponding set of closing costs. There is a one-to-many relationship from each Loan Program to the array of Closing Cost Records. The layout of these fields is depicted below:

| GHR Term | Date Type |
|---|---|
| PreQualOutput Record (Loan Programs) | |
| RejectionFlags | Integer |
| TotalLoanAmount | Integer |
| BaseLoanAmount | Integer |
| SalePrice | Integer |
| ClosingCosts | Integer |
| StartingPITI | Integer |
| APR | Integer |
| ReturnRate | Integer |
| SizeLTVPointsAdjustment | Integer |

-continued

| GHR Term | Date Type |
|---|---|
| Factor | Integer |
| HER | Integer |
| TER | Integer |
| LTV | Integer |
| PI | Integer |
| MI | Integer |
| Taxes | Integer |
| HazIns | Integer |
| RequiredCash | Integer |
| PITIInCash | Boolean |
| PITIReserves | Integer |
| OriginationFee | Integer |
| UpfrontMI | Integer |
| MIFinanced | Boolean |
| TBDFee | Integer |
| QualRate | Integer |
| Arm | Boolean |
| Index | Integer |
| Margin | Integer |
| Cap | Integer |
| Ceiling | Integer |
| ClosingCostsUsed | Integer |
| Term | Integer |
| BreakEvenMonthNoReinvest | Integer |
| BreakEvenMonthReinvest | Integer |
| BreakEvenMonthNoReinvestWC | Integer |
| BreakEvenMonthReinvestWC | Integer |
| AIR | Integer |
| ARMIndex | String |
| Prepaid | Integer |
| Miapboob | Boolean |
| MIRenewal1 | Float |
| CashFinanceDMI | Float |
| ProgramID | String |
| PGC | String |
| ReturnPoints | Integer |
| Closing Cost Record | |
| ComputeImpounds | Boolean |
| Apr | Boolean |
| PaidOutsideClosing | Boolean |
| VHAAllowable | Boolean |
| AppliesToMods | Boolean |
| Financed | Boolean |
| Points | Boolean |
| InitialPremiumFinanced | Boolean |
| State | String |
| County | String |
| FromZip | String |
| ToZip | String |
| MortgageType | String |
| Description | String |
| Type | String |
| TableId | String |
| Name | String |
| PerUnitAmount | Float |
| Percent | Float |
| Fee | Float |
| Seller | Float |
| Lender | Float |
| Relo | Float |
| InitialPremium | Float |
| RenewalPremium | Float |
| Premium | Float |
| BuyerID | Integer |
| Mods | Integer |
| HUDNumber | Integer |
| ImpoundType | Integer |
| Unit | Integer |
| MonthsToEscrow | Integer |
| AssocHUD | Integer |

OnePipeline Implementation

In OnePipeline's architecture, the GHR components are wrapped with a CORBA interface using Borland's Delphi development tool (Object Pascal). This interface exposes a single method 'Qualify' that accepts five input parameters:

Qualification Method

Filter Parameters

Qualifications (Borrower Data)

Borrower Liability Data (From Credit Report)

Borrower Public Record Data (From Credit Report)

With the exception of 'Mode', which is an integer value, all the other parameters are Strings. The Strings are formatted (delimited) with structures to be easily disassembled for use against the GHR COM interfaces. The format makes use of industry standards such as XML and XMLT. Data is sent to and from the CORBA interfaces utilizing IIOP over TCP/IP.

Any CORBA client can tie directly into the GHR CORBA server once the input parameters are satisfied. In our implementation, a set of JavaBeans comprise the client side of our architecture. There is a JavaBean representing each of the Qualification Methods expressed by GHR. The JavaBeans expose mutater methods for setting each element of the input parameters for Filter Parameters, Borrower Liability Data, Borrower Public Record Data, and Qualifications. The Qualification Mode is encapsulated within the JavaBean corresponding to the GHR qualification method. All of the JavaBeans expose a Qualify( ) method through inheritance that performs all of the CORBA location and marshalling functions necessary to interact with the GHR CORBA Server. The result of the Qualify( ) method call is a delimited String representing the 'PreQualOutput Records' and 'Closing Cost Records' described above. Navigating the output is facilitated by a special IqualifiedProducts JavaBean which receives the formatted return String, parses the records, and exposes methods for accessing individual elements of semantic importance as also outlined in Qualification Results section above. These JavaBeans are dependent on the visibility of the GHR CORBA Server via an IIOP channel and are not well suited for integration with the outside world.

To expose the functionality of the Qualification features of the OnePipeline system to the outside world, the JavaBeans encapsulation of the GHR CORBA Server's API is further abstracted to facilitate clients via the HTTP protocol. A Java enabled HTTP server is positioned to intercept function calls via the outside world and pass them into the JavaBeans which in turn make their normal CORBA requests to the GHR CORBA Server.

Referring now to 34, with reference to the descriptions above, this OnePipeline—GHR Systems communications interface is defined in functional overview. An HTTP server receives inputs from applicants' system, wherein requests for data are processed and an instantiation of a GHR client JavaBean occurs based on type of qualification desired 3503. These GHR JavaBeans provide an API into the GHR CORBA Server using distributed computing data marshalling over the Internet Inter-ORB Protocol (IIOP) 3505. The IIOP request is transmitted to a GHR CORBA server 3509 where the data from the client JavaBeans are accepted, unmarshalled and used to trigger the instantiation of the GHR Systems COM objects. The GHR system using its COM objects, processes the request and returns qualified loan programs (if any). These data are formatted into an XML data stream and sent back to the client JavaBean. 3511. The OnePipeline system code receiving the XML datastream, parses the datastream and creates an HTML document for return to the calling web browser for end-used interaction.

In an alternative embodiment, subprograms for performing the functions equivalent to those of the GHR system would be developed internally to applicants system.

The 'Originator Task Menu and Origination Fee Assessment' Function

As indicated above, upon completion of the loan selection and formal loan request, the loan originator is given the screen shown in FIG. 28A and is asked to specify the loan origination fee and to choose the functions in steps 3, 4 and 5 which the loan originator will do. The 'Originator Task Menu and Origination Fee Assessment' function 519 in FIG. 5 uses these selections as well as the other non-selected required tasks to construct the inputs which are passed to the Compliance Engine as described above.

The 'Loan Fulfillment Workflow Process

The composite of information which is passed to the 'Loan Fulfillment Workflow Engine' 545 in FIG. 5 as a new 'context' or data embodiment, and by which a new, discrete, mortgage process is created comprises the summation of data or information supplied by the 'Compliance Engine' 520, the list of tasks related to the specific loan as described above. In a preferred embodiment, the list of tasks for the specific loan are delivered by the Compliance Engine to the Loan Fulfillment System (462 in FIG. 4C) which comprises a Loan Processing and Mortgage Workflow Engine such as Framework, Inc.'s Lendware™ product. In an alternate embodiment the 'Loan Fulfillment Workflow Engine' 545 in FIG. 5 is contained within applicants' system and would be built around the Sun Microsystems™ Inc. Forte™ Conductor™ engine product to manage and control the related business processes and to provide a runtime shell to facilitate coordination of application services within the business process. The various business applications related to the steps to be processed in completing the mortgage loan closing are pre-defined to the Forte Conductor system (just as they are in the Lendware product) so that when the 'mortgage functions' and their designated 'actionees' (if any) are passed to the 'Loan Fulfillment Workflow Engine' and to its Forte Conductor engine, these 'functions' are executed in an integrated environment where both the function process definition and each of the supporting applications is pre-defined and will execute automatically. The supporting applications are a set of application proxies, each representing the business service provided by its application and the pre-defined actions to take are contained in an XSL rule base, consisting of rule documents. Specific rule documents are assigned to proxies so they can interpret and transform messages The 'Loan Fulfillment Workflow Engine' 545 and its Forte Conductor engine assures that processes happen in the correct sequence and in accordance with the (software controlled) pre-determined, programmatic branching conditions defined by the 'Worker Profile Attributes' 543 business process definition. The 'Loan Fulfillment Workflow Engine' 545 may call upon any combination of 'workers', heretofore described as computers, data tables, software, persons, organizations, companies, or other data sources, etc. to perform the required tasks. The 'worker' or 'agent' is typically manifested in one or more of the following ways: as an individual, an organization, one or more data tables, a data processing system, or the like.

Figure 6:
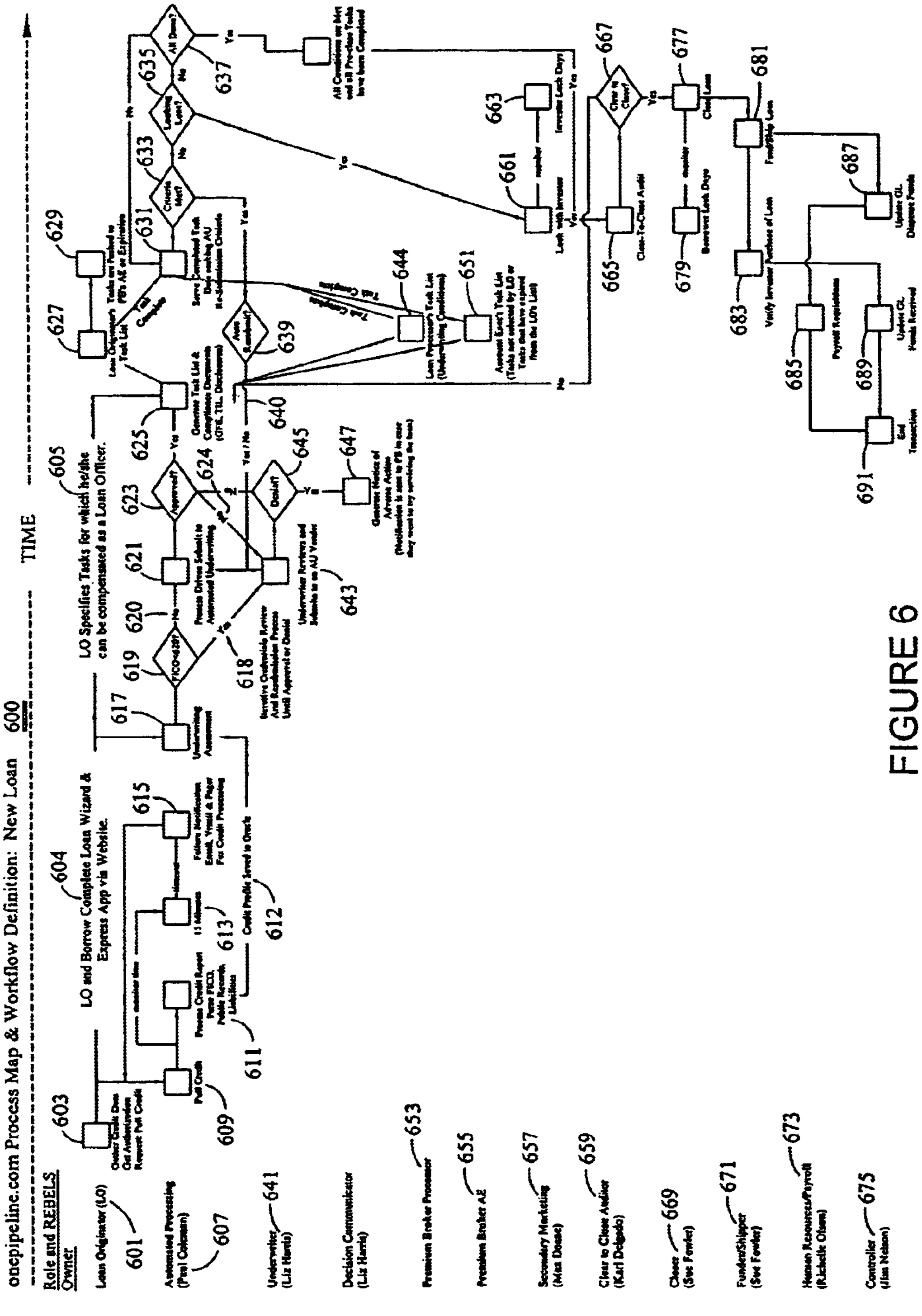
FIG. 6 is a flow chart depicting the process Map and Workflow Definition for a New Loan.

In this alternative embodiment the pre-programmed functional steps executed by the Forte Conductor system are shown in FIG. 6. The types of activities represented by the icons on FIG. 6 include the following;

| Icon | Description |
|---|---|
| Opening door | Beginning of a new process, in this case a new loan |
| Closing door | Ending of a process |
| Computer | Automated activity that does not require human interaction |
| Monitor | Manual or partly manual activity requiring human interaction |
| Alarm Clock | Timer activity which initiates the next activity based on passage of time |

The process definition drawing shown in FIG. 6 defines the process activities for the OnePipeline.com compliance workflow system. By performing the defined activities under the strict control of the Conductor workflow engine, the engine ensures that all required tasks are completed, and in the required sequence. The engine presents activities only to workers whose role designations match the role designations of the activity. The earlier system activities assigns roles in advance to workers only after verifying that the pre-requisite qualifications are satisfied. In this fashion, loan originators are assured that all applicable pre-qualifications are satisfied and that they actually performed all the services for which they were compensated. When a loan process is initiated in the workflow system a call is made to the Forte Conductor software to instantiate a new loan workflow process for the specific loan, as indicated by the parameters passed in the calling sequence.

This workflow process is better understood with reference to FIG. 6. Referring now to FIG. 6, the loan originator 601 gathers credit data, gets authorization and requests pull credit 603. The automated system 607 pulls credit 609, processes the credit report, parses FICO, public records and liabilities 611, and the credit profile is saved to the Oracle™ data base 612. If this credit clearing process exceeds 15 minutes a timeout occurs 615 and a message is sent to the user indicating a failure in the credit processing. When the credit profile is completed and saved to the Oracle™ data base 612 and the loan originator 601 has completed the loan wizard and Express app via the website 604 the system then begins the underwriting assessment 617. If the FICO previously determined in step 611 is not less than 620 the process driver submits the request to automated underwriting 621. If it is approved 623 the system generates task lists and compliance documents (GFE, TIL, Disclosures, etc.) 625 and submits them, to the loan originator 627, to the premium broker processor 649, to the premium broker account executive 651, for their individual completion of their respective tasks to complete the loan process. The loan originator 627, the premium broker processor 649, and the premium broker account executive 651, all electronically submit a task completion message to the system 631 and it compares the submissions against authorization criteria 633. If the criteria are met the system determines whether the user has requested that the loan rate be locked 635 and if so the loan is locked-in with the investor 661 and a message is passed to the clear-to-close auditor 665, 659 where a determination is made as to whether the transaction is clear-to-close 667. If so a message is passed to the closer 669 to close the loan 677. A message is then passed to the funder/shipper 671 to fund/ship the loan. The funder/shipper 671 does two things: first it verifies the investor purchase of the loan 683 and notifies the controller 675 to update the general ledger that funds have been received 689 and tells the end transaction mechanism 691; secondly the funder/shipper 671 tells the controller 675 to update the General Ledger to disburse the funds 687 which submits a requisition to payroll 685 who notifies the end transaction mechanism 691.

The system has capabilities to determine that the required criteria have not been met/completed 633 and determine whether to resubmit the loan request to automated underwriting 639, 640 or to notify the underwriter 641 to iterate on the credentials review process 643 and either deny 645, 647 the loan or approve it 645, 623 and generate the task lists again 625.

Thus the loan process in this alternate embodiment is driven through the required tasks by the Forte Conductor engine to assist in the complying with the various regulations and yet automate the process in a helpful and efficient manner. In the preferred embodiment the ASP system LendWare or its equivalent drives the loan process and the individual task workers in a manner similar to that described above. In the preferred embodiment the task completion data is passed to the Compliance Engine which monitors the list of tasks for each loan and which can also communicate directly with some task workers when certain critical events occur or timeouts are perceived.

The 'Task List Maintenance and Status Reporting Gateway"

The 'Task List Maintenance and Status Reporting Gateway" 550 in FIG. 5 or 463 in FIG. 4C serves as a portal to communicate to and from other agents and workers who are qualified to perform assigned tasks. These tasks are those which would be assigned by the 'Loan Fulfillment Workflow Engine' 545 or by the ASP workflow processor Lendware 463 to other agents or workers to complete prior to the closing of the loan and distribution of funds. While this gateway is similar to the 'loan origination gateway' it is significantly different in that the middleware layer must handle the conversion of data format and protocol of the Forte Conductor engine or the Lendware workflow engine to and from the formats and protocols of the agents/workers to which the workflow process is communicating. Accordingly, The 'Task List Maintenance and Status Reporting Gateway' 550 in FIG. 5 is used to transmit messages from the workflow engine to these other agents and to receive responses from authenticated agents. These agents would be performing tasks such as 'title search', 'survey', 'credit check', etc. The 'Task List Maintenance API and Status Reporting Gateway' 550 can also use the same interface modes as envisioned for The 'Loan Origination Gateway' 505. Envisioned are at least, three (3) ways by which the system may access and be accessed by a loan agent/worker: (1) via Internet website, (2) via custom-written software which connects in a data transmission-enabled manner to the present invention, and (3) via 'wireless' devices, as previously described for the 'Loan Origination Gateway' 505.

A loan originator or borrower may also come into the system via this gateway to check the status of the loan process, etc. As indicated below every entrant via this gateway must never-the-less be authenticated before entry is allowed. Conveyance of task lists to a loan originator and associated workers and reporting of borrower loan status are accomplished through a programmatic presentation 552 which embodies the following: 'borrower status report(s)', 'originator's task list', and 'other worker's task lists' (as described above)—said information exchanged through this 'task maintenance & status reporting Gateway' (the "TMSR gateway"). This 'TMSR gateway', functions in a manner similar to that used during the loan origination process. Reports may be conveyed by a variety of programmatically controlled means, such as web pages, PDF® files, word processing format files, etc. The TMSR gateway receives the direction messages from the 'Loan Fulfillment Workflow Engine' 553 in the standard Forte Conductor or Lendware API format, and using the middleware layer described before, converts the format and message protocol into that required to communicate with the desired agent/worker. Similarly, the TMSR gateway can receive messages from the various agents/workers in various formats and protocols (i.e. HTML, XML, WML, WAP, etc.) and converts these messages and protocols into the standard API formats used in the preferred embodiment.

Figure 36:
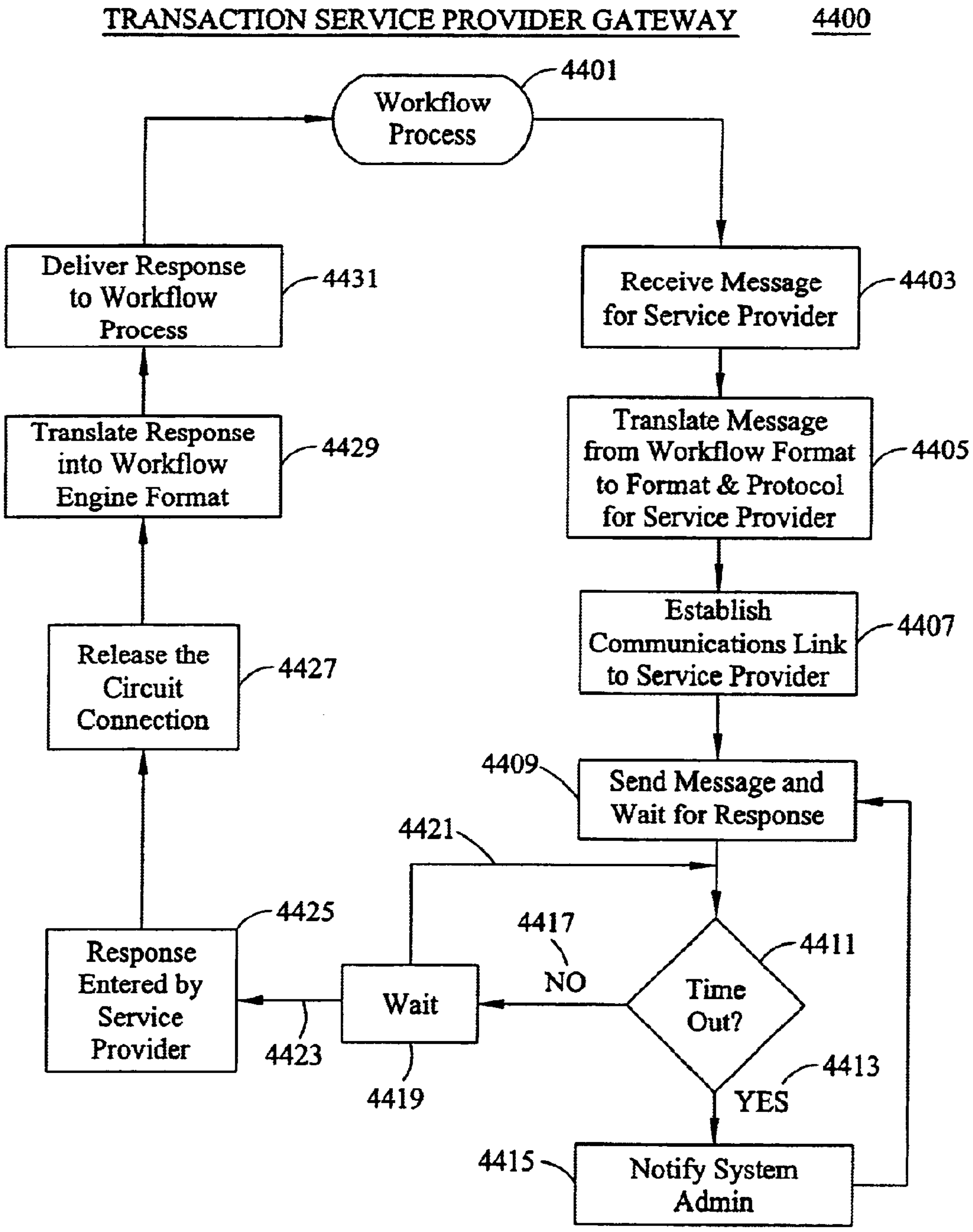
FIG. 36 illustrates a preferred embodiment of the "transaction service provider" gateway.

Referring now to FIG. 36 the principle purpose of the 'TMSR Gateway' 4200, in serving as a portal, is to provide a way for the loan originator and borrower to check the status of the loan process and for the 'loan process workflow engine' to communicate to and from the other agents/workers who are doing some task required by the process, without having to worry about what input method or output method is required to communicate with a given entity, and/or the related data formats and protocols. Consequently the major purpose of the TMSR gateway is to perform the middleware tasks of—recognizing the input channel and data format and protocol used 4209 and convert the data to the standard workflow engine Application Programming Interface (API) format 4211 which will be used by the workflow engine. Similarly, on receiving a message to be transmitted from the workflow engine, the TMSR gateway middleware structure is required to determine the format & protocol used by the addressee and convert the message from the workflow engine API format into the format and protocol of the addressee 4215 and then transmit the message 4217 to the addressee 4203 or 4205 or 4207. The input data originates from the input screens provided by the system, and from the output data pre-defined in the various task elements in a typical loan workflow process. The workflow engine will typically transmit a required message whenever an event occurs which requires a message be sent or resent (because of a timeout for example).

The TMSR gateway is required to pass the received data to a second authentication module 549 in FIG. 5 or 464 in FIG. 4C. This authentication module once again verifies the used ID and password of the inputting user. In the preferred embodiment this check does not verify the legal qualifications of the user. In an alternative embodiment, the user ID is checked to determine the worker Type, and the roles this type worker may perform for this location of the property and for his location are verified against the role he is attempting to play. Similarly the compliance engine checks to see if the various legal regulations allow this agent/worker to perform the role they are attempting to play. If so the authentication module 4212 in FIG. 36 will pass the data submitted to the aforementioned workflow engine 4213 for its processing of the incoming data in response to the task assigned.

Transaction Service Provider Gateway

Returning now to FIGS. 4C and 5, the 'Vendor Management API Gateway 467 in FIG. 4C or the 'Transaction Service Provider Gateway' 555 in FIG. 5 serves to manage 'tasks' assigned to external agents or workers or vendors with whom Applicants' have a special vendor relationship. That is, a vendor who supplies appraisals in a given locality, loan processing, credit checks, title searches, flood certification, mortgage insurance, etc. The 'Vendor management API Gateway' or the 'Loan Fulfillment Workflow Engine', (see FIG. 6 for example) in developing a task list for the loan originator (627 in FIG. 6), recognizes some tasks as falling under the responsibility of the loan originator as determined in the loan origination process, and some tasks which are to be automatically forwarded to certain service provider agents or vendors. The communication of these assignments, occurs in a different manner than those described above relative to the TMSR gateway. Since these tasks tend to be more routine and repetitively performed by the specific vendors, the workflow engine will send a message to the designated vendor and wait (i.e. maintain the telephonic or electronic connection) until the vendor supplies the desired response (which normally would be within a few minutes) or until a watchdog timer expires. If the timer expires the workflow engine will try the communications again as well as notify a system manager that the vendor has not responded.

For example referring now to FIG. 36 the 'transaction service provider gateway' (the "TSP gateway") 4400 is described. The functioning of the 'Vendor Management API gateway' under the control of Lendware, for example, would function similarly. Whenever the workflow process for this loan 4401 recognizes an event/task which requires a communication to a vendor/partner (service provider), the workflow process constructs the message and passes it to the TSP gateway 4403. The TSP gateway determines the format and protocol required to communicate with the indicated service provider and translates the message from the workflow process format into the required format and protocol for the service provider 4405. The TSP gateway then establishes a persistent communications link with the service provider 4407 and sends the message and waits for a response 4409. If the service provider does not respond in a given time a watchdog timer expires 4411, 4413 in which case the system administrator is notified 4415 and the message is resent 4409. If the service provider responds within the allotted time 4423, 4425 the circuit connection is released 4427 and the response is translated from the format and protocol of the service provider into the format required by the workflow process 4429 and the response is passed back to the workflow process 4431.

During the course of the workflow process execution of the various tasks as shown in FIG. 6, the workflow process engine records each transaction into an Oracle database in order to create and maintain an audit trail of tasks performed for this loan, when performed, by whom, etc. This database is used for certain reports triggered by other tasks in the workflow process as well as ad-hoc reports of tasks completed for various compliance and maintenance reasons.

Worker Compensation and Task Performance Report Module

The 'Worker Compensation and Task Performance Report' Module 468 in FIG. 4C or 557 in FIG. 5, provides a mechanism for producing reports to accounting to distribute funds to those agents/workers who have earned them in a particular loan transaction. These reports in a preferred embodiment are normally triggered by the Compliance Engine but may be triggered in an alternative embodiment by the loan workflow process for that loan at certain predefined points in the workflow. This module also provides the capability for generating regulatory completion reports and/or Completion Certificates as required for each loan.

The 'Secondary Banking Process' Module

The 'Secondary Banking Engine' module 469 in FIG. 4C or 561 in FIG. 5 serves to manage loan transactions as they are introduced to the secondary lending pool, and move them programmatically through the process of 'closing', 'funding', and 'shipping' the loan transaction. In one embodiment, 469 in FIG. 4C, is managed by Lendware via on on-site installation or equivalently by Framework ASP. In an alternative embodiment, the secondary banking functions would be managed and processed within applicants' system.561 in FIG. 5. In the alternative embodiment, the 'Secondary Banking Engine' 561 would also serve as the mechanism whereby the transactions and funds distributions involving the bundling and selling of loans to the secondary banking institutions are verified and reported in the following manner: (a) 'Locked Loan reports, tracking all loans locked by borrowers, and reported on a regular schedule, (b) Commitment report, tracking all unfulfilled loan commitments, (c) Funding report, which tracks and reports initial funding status (d) Funded, but not Shipped report, (e) Shipped but not Purchased report, and (f) Purchased Loan report.

In an alternative embodiment, a special task of the secondary banking module is to manage use of the funds in the warehouse credit line. The management objective is to optimize the financial return generated by the funds in the warehouse line of credit. If too much of the warehouse line is consumed in covering mortgage loans processed, the overall return on these funds is diminished. Accordingly the management task is to move mortgage loans from the warehouse line to secondary investors as quickly as possible. This may be done by selling individual loans to secondary investors, or by pooling multiple loans, according to various credit conditions and pooling rules for sale to other secondary investors.

DESCRIPTION OF THE BEST MODE

Figure 31:
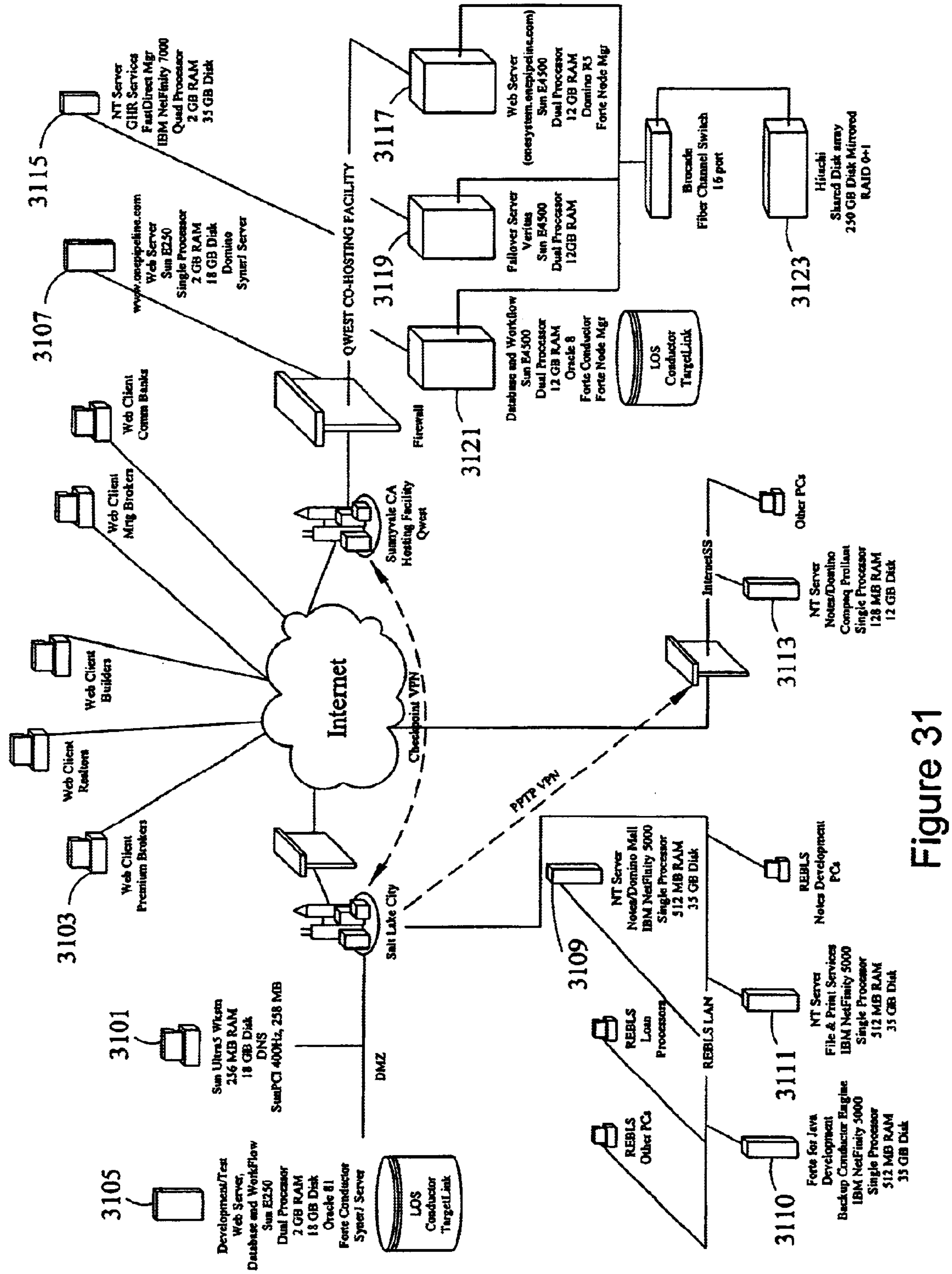
FIG. 31 illustrates an exemplary Internet configuration showing the hardware and software systems used in an embodiment at this time.
Figure 32:
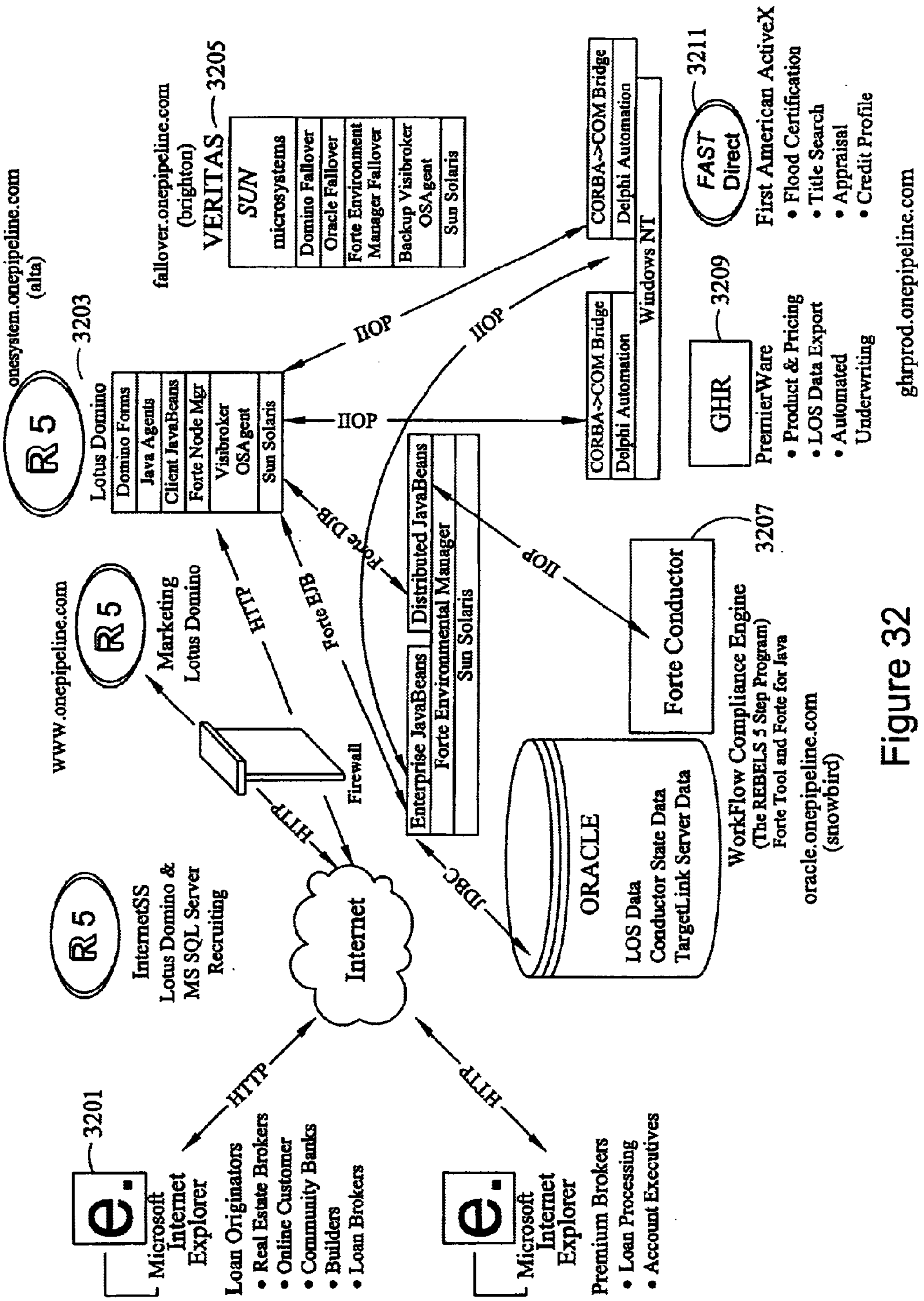
FIG. 32 illustrates another exemplary Internet configuration showing the hardware and software systems used in an embodiment at this time.

Referring now to FIGS. 31–32 the various types of computer hardware and computer software used in a preferred embodiment at the present time are depicted. In FIG. 31 it is clear that Sun® Ultra5™ workstations 3101 and general purpose Personal computers (PC) 3103 may be used as input devices to the system. A Sun E250™ dual processor server 3105 is used as a development/test system running the Sun® Solaris® operating environment, Oracle® 81, Forte® Conductor™ with a SynerJ™ server. A single processor Sun E250™ server 3107 is used in the Sunnyvale facility. Also in this facility are three Sun E4500™ dual processors 3117, 3119 and 3121, an IBM NetFinity 7000™ quad processor with a Microsoft® NT™ server 3115 and a Hitachi Shared Disk array 3123. There are also three IBM NetFinity 5000™ servers 3109, 3110 and 3111 located in the Salt Lake City facility.

In FIG. 32 it may be seen that loan originators interface to the applicants system using a standard Internet browser such as Internet Explorer™ 3201 with the initial interface in applicants' system being with Lotus® Domino™ 3203. The system then performs the Pre-qualification and Loan application & Approval using GHR® Systems PriemierWare™ 3209. The Sun Solaris® operating environment in the system server (at 3203 in FIG. 32) interfaces with the GHR system 3209 and to FastDirect™ 3211 via IIOP through a CORBA to COM bridge and a Delphi Automation interface to Windows NT™. Solaris™ interfaces in this configuration to the Oracle 8I® server via Forte® Conductor™ 3207 through Forte Enterprise JavaBeans, Forte Distributed JavaBeans and IIOP.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for performing the various features of the rules engine and flow management. It will be apparent to those skilled in the art that modifications and variations of the preferred embodiment are possible, such as different computer systems may be used, different communications media such as wireless communications, as well as different types of software may be used to perform equivalent functions, all of which fall within the true spirit and scope of the invention as measured by the following claims.

We claim:

1. A computer implemented method for generation of a set of required procedures for originating a mortgage loan comprising the acts of:

receiving a loan request at a server node, the loan request including loan application data;

accessing an electronic database, the electronic database including a comprehensive list of tasks required to comply with federal rules and regulations, state rules and regulations, and local rules and regulations;

applying appropriate jurisdictional, employee and lender criteria to the loan application data and to the electronic database to automatically determine a set of loan originating tasks applicable to each mortgage loan transaction;

generating a loan origination compliance task workflow at the server node, the loan origination compliance task workflow including an organized sequence of a plurality of task actions comprising a subset of the comprehensive list and disclosing all actions required by one or more of a third party loan originator, a lending institution, and a borrower so that lending institutions may legally compensate third party originators in compliance with applicable federal or state law; and distributing one or more task actions of the loan origination compliance task workflow from the server node to one or more systems associated with one or more of a third party loan originator, a lending institution, and a borrower capable of performing one or more of the task actions.

2. The computer implemented method of claim 1 comprising monitoring completion of the plurality of task actions whereby a report of completion of all required tasks can be generated.

3. The computer implemented method of claim 1 comprising the additional act of authenticating a person submitting the request to process a mortgage loan.

4. The computer implemented method of claim 1 comprising the additional act of electronically transferring the plurality of task actions to an electronic loan workflow engine for controlling and managing execution of the task actions.

5. The computer implemented method of claim 1 wherein the plurality of task actions is based upon mortgage loan related laws and regulations comprising Federal, State, local and professional regulations and requirements.

6. The computer implemented method of claim 1 comprising an additional step of producing a completion certificate.

7. A compliance engine for automated origination of a mortgage loan comprising:

a computer system having communications devices for receiving a loan request;

the computer system having an electronic database including a comprehensive list of tasks required to comply with federal rules and regulations, state rules and regulations, and local rules and regulations;

the computer system having logic mechanisms programmed to apply an updatable set of rules, logic and criteria to each transaction in order to generate a trackable loan origination compliance task workflow, the loan origination compliance task workflow including an organized sequence of a plurality of task actions comprising a subset of the comprehensive list and identifying actions required by one or more of a third party loan originator, a lending institution, and a borrower so that lending institutions may legally compensate third party originators in compliance with applicable federal or state law; and the computer system having additional logic mechanisms programmed to electronically distribute one or more task actions of the loan origination compliance task workflow to one or more systems associated with one or more of a third party loan originator, a lending institution, and a borrower capable of performing one or more of the task actions.

8. The compliance engine of claim 7 further comprising electronic logic devices programmed to monitor completion of the plurality of task actions and to generate a report of completion of all required tasks.

9. The compliance engine of claim 7 wherein selected vendors are automatically notified to perform a task and to report task completion.

10. The compliance engine of claim 7 wherein the plurality of task actions is based upon mortgage loan related laws and regulations comprising Federal, State, local and professional regulations and requirements.

11. An apparatus for automated origination of a mortgage loan comprising:

means for receiving a loan request;

means for storing a comprehensive list of tasks required to comply with federal rules and regulations, state rules and regulations, and local rules and regulations;

means for applying a set of rules, logic and criteria to the loan application data and to federal, state and local compliance data in order to determine an applicable subset of tasks required to originate a loan;

means, coupled to the means for receiving a loan request, for generating a trackable loan origination compliance task workflow, the loan origination compliance task workflow including an organized sequence of a plurality of task actions comprising a subset of the comprehensive list and identifying actions required by one or more of a third party loan originator, a lending institution and a borrower so that lending institutions may legally compensate third party originators in compliance with applicable federal or state law; and means, coupled to the means for generating a trackable loan origination compliance task workflow, for electronically distributing one or more of the task actions of the loan origination compliance task workflow to one or more systems associated with one or more of a third party loan originator, a lending institution, and a borrower capable of performing one or more of the task actions.

12. In a network having a user node including a browser program coupled to said network, said user node providing requests for information and providing mortgage loan application related commands on said network, a network node comprising:

a mortgage loan origination server node responsive to a loan request from said user node, whereby said mortgage loan origination server node provides a first mechanism for accessing an electronic database and for generating a trackable loan origination compliance task workflow, the electronic database including a comprehensive list of tasks required to comply with federal rules and regulations, state rules and regulations, and local rules and regulations, the loan origination compliance task workflow including an organized sequence of a plurality of task actions comprising a subset of the comprehensive list and identifying actions required by one or more of a third party loan originator, a lending institution, and a borrower so that lending institutions may legally compensate third parts originators in compliance with applicable federal or state law; and provides a second mechanism coupled to the first mechanism, for distributing one or more of the task actions of the loan origination compliance task workflow to one or more systems associated with one or more of a third party loan originator, a lending institution, and a borrower capable of performing one or more of the task actions.

13. The node of claim 12 wherein the loan origination server node provides a third mechanism to electronically monitor completion of the plurality of task actions whereby a certificate of completion of all required tasks can be generated.

14. The node of claim 12 wherein the actions required to process the mortgage loan are based upon mortgage loan related laws and regulations comprising Federal, State, local and professional regulations and requirements.

15. A computer program product stored on a computed usable medium, comprising:

a first computer readable program mechanism for receiving a loan request;

a second computer readable program mechanism for accessing an electronic database, applying a set of rules, logic and criteria to determine applicable tasks required for each mortgage loan transaction and for generating a trackable loan origination compliance task workflow, the electronic database including a comprehensive list of tasks required to comply with federal rules and regulations, state rules and regulations, and local rules and regulations, the loan origination compliance task workflow including an organized sequence of a plurality of tasks comprising a subset of the comprehensive list and identifying actions required by one or more of a third party loan originator, a lending institution, and a borrower so that lending institutions may legally compensate third party originators in compliance with applicable federal or state law; and a third computer readable code mechanism for distributing one or more of the task actions of the loan origination compliance task workflow to one or more systems associated with one or more of a third parts loan originator, a lending institution, and a borrower capable of performing one or more of the task actions.

16. The computer program product of claim 15 comprising a fourth computer readable code mechanism for monitoring completion of the plurality of task actions whereby a report of completion of all required tasks can be generated.

17. The computer program product of claim 15 wherein the plurality of tasks is based upon loan related laws and regulations comprising Federal, State, local and professional regulations and requirements.

* * * * *

UNITED STATES PATENT AND TRADEMARK OFFICE

CERTIFICATE OF CORRECTION

PATENT NO. : 6,904,412 B1
APPLICATION NO. : 09/645217
DATED : June 7, 2005
INVENTOR(S) : Broadbent et al.

It is certified that error appears in the above-identified patent and that said Letters Patent is hereby corrected as shown below:

Column 3, line 66, delete “Real” and replace therewith --real--.

Column 9, line 36, delete “typicallying” and replace therewith --typically--.

Column 10, line 49, delete “though” and replace therewith --through--.

Column 10, line 64, delete “c.” and replace therewith --(3) --.

Column 11, line 19, delete “d.” and replace therewith --(4) --.

Column 11, line 29, delete “e.” and replace therewith --(5) --.

Column 11, line 51, delete “f.” and replace therewith --(6) --.

Column 12, line 1, delete “g.” and replace therewith --(7) --.

Column 12, line 24, delete “i.” and replace therewith --(8) --.

Column 12, line 32, delete “and” and replace therewith --and/or--.

Column 12, line 59, delete “basic” and replace therewith --basics--.

Column 14, line 29, delete “an Real” and replace therewith --a Real--.

Column 14, line 66, delete “it’s” and replace therewith --its--.

Column 15, line 22, delete “it’s” and replace therewith --its--.

Column 15, line 43, delete “oriented” and replace therewith --Oriented--.

Column 16, line 37, delete “and or” and replace therewith --and/or--.

Column 17, line 18, delete “478” and replace therewith --478--.

Column 18, line 46, delete “banking” and replace therewith --Banking--.

Column 18, line 58, delete “A loan” and replace therewith --a loan--.

Column 19, line 10, delete “loan” and replace therewith --‘Loan--.

UNITED STATES PATENT AND TRADEMARK OFFICE

CERTIFICATE OF CORRECTION

PATENT NO. : 6,904,412 B1 
APPLICATION NO. : 09/645217
DATED : June 7, 2005
INVENTOR(S) : Broadbent et al.

It is certified that error appears in the above-identified patent and that said Letters Patent is hereby corrected as shown below:

Column 19, line 10, delete “with to the loan” and replace therewith --with the loan--.

Column 19, line 14, delete “of - recognizing” and replace therewith --of recognizing--.

Column 21, line 53, delete “are in” and replace therewith --are--.

Column 29, line 37, delete ““if” and replace therewith --‘if’--.

Column 31, line 23, delete “discription” and replace therewith --description--.

Column 31, line 42, delete “Residentional” and replace therewith --Residential--.

Column 31, line 59, delete “sing” and replace therewith --sign--.

Column 33, line 20, delete “Recieve” and replace therewith --Receive--.

Column 33, line 59, delete “Costruction” and replace therewith --Construction--.

Column 33, line 71, delete “ABS_Loan” and replace therewith --ABC_Loan--.

Column 35, line 56, delete “used ID” and replace therewith --user ID--.

Column 35, line 58, delete “type ID1” and replace therewith --Type ID1--.

Column 35, line 60, delete “user id” and replace therewith --user ID--.

Column 36, line 46, delete “this Loan” and replace therewith --this ‘Loan--.

Column 37, line 3, delete “Microsoft. Inc.” and replace therewith --Microsoft, Inc.--.

Column 37, line 24, delete “Date” and replace therewith --Data--.

Column 37, line 39, delete “BaloonMortgages” and replace therewith --BalloonMortgages--.

Column 37, line 56, insert --The methods of Qualification are listed below by Mode:--.

Column 38, line 13, delete “Date” and replace therewith --Data--.

Column 38, line 27, delete “OverrideRations” and replace therewith --OverrideRatios--.

UNITED STATES PATENT AND TRADEMARK OFFICE

CERTIFICATE OF CORRECTION

PATENT NO. : 6,904,412 B1
APPLICATION NO. : 09/645217
DATED : June 7, 2005
INVENTOR(S) : Broadbent et al.

It is certified that error appears in the above-identified patent and that said Letters Patent is hereby corrected as shown below:

Column 38, line 48, delete "Date" and replace therewith --Data--.

Column 39, line 14, delete "Date" and replace therewith --Data--.

Column 39, line 22, delete "Date" and replace therewith --Data--.

Column 39, line 33, delete "Date" and replace therewith --Data--.

Column 39, line 44, delete "Date" and replace therewith --Data--.

Column 40, line 27, delete "Date" and replace therewith --Data--.

Column 40, line 36, delete "Date" and replace therewith --Data--.

Column 40, line 47, delete "Date" and replace therewith --Data--.

Column 40, line 62, delete "as" and replace therewith --an--.

Column 40, line 63, delete "Date" and replace therewith --Data--.

Column 41, line 8, delete "Date" and replace therewith --Data--.

Column 41, line 19, delete "Date" and replace therewith --Data--.

Column 41, line 36, delete "integer" and replace therewith --Integer--.

Column 41, line 41, delete "Date" and replace therewith --Data--.

Column 42 line 1, delete "Date" and replace therewith --Data--.

Column 42, line 35, insert --GHR TERM DATA TYPE--.

Column 44, line 3, delete "applicants" and replace therewith --applicants'--.

Column 44, line 50, delete "messages" and replace therewith --messages.--.

Column 46, line 23-24, delete "Gateway" and replace therewith --Gateway'--.

Column 47, line 41, delete "used ID" and replace therewith --user ID--.

UNITED STATES PATENT AND TRADEMARK OFFICE

CERTIFICATE OF CORRECTION

PATENT NO. : 6,904,412 B1
APPLICATION NO. : 09/645217
DATED : June 7, 2005
INVENTOR(S) : Broadbent et al.

It is certified that error appears in the above-identified patent and that said Letters Patent is hereby corrected as shown below:

Column 47, line 56, delete “Gateway” and replace therewith --Gateway’--.

Column 49, line 7, delete “Loan” and replace therewith --Loan’--

Column 49, line 46, delete “applicants” and replace therewith --applicants’--.

Column 50, line 22, delete “a loan” and replace therewith --a trackable loan--.

Signed and Sealed this

Sixth Day of November, 2007

JON W. DUDAS

*Director of the United States Patent and Trademark Office*